US012800820B2

(12) United States Patent
Vasylyev

(10) Patent No.: US 12,800,820 B2
(45) **Date of Patent: *Nov. 17, 2026**

(54) BACKLIGHT UNIT FOR LCD DISPLAYS WITH WAVEGUIDE-INTEGRATED RIDGE STRUCTURES AND SIDE-EMITTING LEDs

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/906,152

(22) Filed: Oct. 3, 2024

(65) Prior Publication Data

US 2025/0028107 A1 Jan. 23, 2025

Related U.S. Application Data

(63) Continuation of application No. 18/092,184, filed on Dec. 30, 2022, now Pat. No. 11,846,794, which is a (Continued)

(51) Int. Cl.
*F21V 8/00* (2006.01)

(52) U.S. Cl.
CPC ......... *G02B 6/0028* (2013.01); *G02B 6/0068* (2013.01)

(58) Field of Classification Search
CPC .. G02B 6/0028; G02B 6/0068; G02B 6/0015; G02B 6/0076; G02B 6/0018; G02B 6/0073
See application file for complete search history.

(56) References Cited

U.S. PATENT DOCUMENTS 3,719,906 A 3/1973 Tournois
3,883,221 A 5/1975 Rigrod
(Continued)

FOREIGN PATENT DOCUMENTS

CN 202196197 4/2012
CN 102121639 3/2013
(Continued)

OTHER PUBLICATIONS

3M Company. Vikuiti Brightness Enhancement Films 2008.
(Continued)

*Primary Examiner* — Mary Ellen Bowman

(57) ABSTRACT

A backlight unit for LCD displays including a planar light transmissive sheet with first and second broad-area surfaces and parallel first and second edges. The sheet guides light from the first edge to the second edge using total internal reflection. A patterned light extraction area with microstructures is located at a distance from the first edge, with a light mixing area located in between. A reflector is positioned adjacent to one broad-area surface. A side-emitting LED strip, comprising a flexible printed circuit with a linear array of LED packages, is optically coupled to the first edge. The LED packages' light-emitting surfaces are oriented perpendicular to the circuit's major surface and have at least one dimension greater than the sheet's thickness. The circuit's major surface is parallel to and in contact with one of the sheet's broad-area surfaces.

20 Claims, 22 Drawing Sheets

Related U.S. Application Data continuation of application No. 17/875,375, filed on Jul. 27, 2022, now Pat. No. 11,550,093, which is a continuation of application No. 17/539,886, filed on Dec. 1, 2021, now Pat. No. 11,402,562, which is a continuation of application No. 17/343,734, filed on Jun. 10, 2021, now Pat. No. 11,194,085, which is a continuation of application No. 15/231,063, filed on Aug. 8, 2016, now Pat. No. 11,035,993, application No. 18/906,152 is a continuation of application No. 18/518,405, filed on Nov. 22, 2023.

(60) Provisional application No. 62/205,644, filed on Aug. 14, 2015, provisional application No. 62/235,918, filed on Oct. 1, 2015, provisional application No. 62/254,106, filed on Nov. 11, 2015, provisional application No. 62/304,291, filed on Mar. 6, 2016.

(56) References Cited

U.S. PATENT DOCUMENTS

| | | | | |
|---|---|---|---|---|
| 4,053,327 | A | 10/1977 | Meulenberg, Jr. | |
| 4,282,862 | A | 8/1981 | Soleau | |
| 4,379,202 | A | 4/1983 | Chalmers | |
| 4,711,972 | A | 12/1987 | O'Neill | |
| 4,877,301 | A | 10/1989 | Yokomori | |
| 4,906,070 | A | 3/1990 | Cobb, Jr. | |
| 4,989,972 | A | 2/1991 | Braun | |
| 5,005,108 | A | 4/1991 | Pristash | |
| 5,110,370 | A | 5/1992 | Vogeli | |
| 5,126,882 | A | 6/1992 | Oe | |
| 5,220,462 | A | 6/1993 | Feldman, Jr. | |
| 5,261,970 | A | 11/1993 | Landis | |
| 5,280,371 | A | 1/1994 | McCartney, Jr. | |
| 5,390,436 | A | 2/1995 | Ashall | |
| 5,396,350 | A | 3/1995 | Beeson | |
| 5,396,406 | A | 3/1995 | Ketchpel | |
| 5,598,280 | A | 1/1997 | Nishio | |
| 5,598,281 | A | 1/1997 | Zimmerman | |
| 5,631,750 | A | 5/1997 | Minoura | |
| 5,714,012 | A | 2/1998 | Murata | |
| 5,745,266 | A | 4/1998 | Smith | |
| 5,782,993 | A | 7/1998 | Ponewash | |
| 5,808,784 | A | 9/1998 | Ando | |
| 5,854,865 | A | 12/1998 | Goldberg | |
| 5,897,184 | A | 4/1999 | Eichenlaub | |
| 5,949,933 | A | 9/1999 | Steiner | |
| 6,008,449 | A | 12/1999 | Cole | |
| 6,139,162 | A | 10/2000 | Masaki | |
| 6,174,064 | B1 | 1/2001 | Kalantar | |
| 6,193,383 | B1 | 2/2001 | Onikiri et al. | |
| 6,231,200 | B1 | 5/2001 | Shinohara | |
| 6,247,826 | B1 | 6/2001 | Funamoto | |
| 6,274,860 | B1 | 8/2001 | Rosenberg | |
| 6,333,458 | B1 | 12/2001 | Forrest | |
| 6,354,709 | B1 | 3/2002 | Campbell | |
| 6,440,769 | B2 | 8/2002 | Peumans | |
| 6,474,827 | B2 | 11/2002 | Shinohara | |
| 6,501,091 | B1 | 12/2002 | Bawendi | |
| 6,522,794 | B1 | 2/2003 | Bischel | |
| 6,529,318 | B1 | 3/2003 | Kaneda et al. | |
| 6,594,420 | B1 | 7/2003 | Lange et al. | |
| 6,700,632 | B2 | 3/2004 | Taniguchi | |
| 6,724,508 | B2 | 4/2004 | Pierce et al. | |
| 6,744,960 | B2 | 6/2004 | Pelka | |
| 6,774,361 | B2 | 8/2004 | Bawendi | |
| 6,827,456 | B2 | 12/2004 | Parker | |
| 6,846,098 | B2 | 1/2005 | Bourdelais | |
| 6,854,857 | B2 | 2/2005 | Hara | |
| 6,883,919 | B2 | 4/2005 | Travis | |
| 6,891,530 | B2 | 5/2005 | Umemoto | |
| 7,046,905 | B1 | 5/2006 | Gardiner | |
| 7,102,824 | B2 | 9/2006 | Clark | |
| 7,113,342 | B2 | 9/2006 | Huang | |
| 7,131,764 | B2 | 11/2006 | Hsu | |
| 7,160,018 | B2 | 1/2007 | Chen | |
| 7,163,331 | B2 * | 1/2007 | Suzuki | G02F 1/133615 362/621 |
| 7,165,867 | B2 | 1/2007 | Long | |
| 7,199,932 | B2 | 4/2007 | Sugiura | |
| 7,228,050 | B1 | 6/2007 | Buretea | |
| 7,246,933 | B2 | 7/2007 | Kunimochi | |
| 7,252,399 | B2 | 8/2007 | Ferri et al. | |
| 7,287,892 | B1 | 10/2007 | Pang et al. | |
| 7,369,735 | B2 | 5/2008 | Nyhart, Jr. | |
| 7,391,939 | B1 | 6/2008 | Williams | |
| 7,394,841 | B1 | 7/2008 | Konttinen | |
| 7,432,893 | B2 | 10/2008 | Ma et al. | |
| 7,481,562 | B2 | 1/2009 | Chua | |
| 7,503,684 | B2 | 3/2009 | Ueno | |
| 7,518,799 | B2 | 4/2009 | Ha | |
| 7,524,098 | B2 | 4/2009 | Vennetier et al. | |
| 7,527,410 | B2 | 5/2009 | Yoshizawa | |
| 7,542,635 | B2 | 6/2009 | Coleman | |
| 7,606,456 | B2 | 10/2009 | Nyhart, Jr. | |
| 7,613,373 | B1 | 11/2009 | DeJong | |
| 7,614,776 | B2 | 11/2009 | Minobe | |
| 7,649,594 | B2 | 1/2010 | Kim | |
| 7,663,713 | B2 | 2/2010 | Saito | |
| 7,667,786 | B2 | 2/2010 | Nouchi | |
| 7,672,549 | B2 | 3/2010 | Ghosh | |
| 7,679,828 | B2 | 3/2010 | Munro | |
| 7,695,150 | B2 | 4/2010 | Dejima | |
| 7,706,073 | B2 | 4/2010 | Munro | |
| 7,708,451 | B2 | 5/2010 | Jang | |
| 7,736,045 | B2 | 6/2010 | Yamashita | |
| 7,817,885 | B1 | 10/2010 | Moore | |
| 7,819,539 | B2 | 10/2010 | Kim | |
| 7,845,826 | B2 | 12/2010 | Aylward | |
| 7,876,489 | B2 | 1/2011 | Gandhi | |
| 7,916,221 | B2 | 3/2011 | Daiku | |
| 7,918,597 | B2 | 4/2011 | Kunimochi | |
| 7,925,129 | B2 | 4/2011 | Ghosh | |
| 7,927,003 | B2 | 4/2011 | Chang | |
| 7,934,862 | B2 | 5/2011 | Anandan | |
| 7,936,420 | B2 | 5/2011 | Kim | |
| 7,939,837 | B2 | 5/2011 | Lynch | |
| 7,943,206 | B2 | 5/2011 | Jones | |
| 7,949,213 | B2 | 5/2011 | Mienko | |
| 7,957,082 | B2 | 6/2011 | Mi et al. | |
| 8,011,819 | B2 | 9/2011 | Yue | |
| 8,016,445 | B2 | 9/2011 | Sugita | |
| 8,017,972 | B2 | 9/2011 | Lee | |
| 8,033,706 | B1 | 10/2011 | Kelly | |
| 8,039,800 | B2 | 10/2011 | Soma | |
| 8,066,393 | B2 | 11/2011 | Takahashi | |
| 8,070,346 | B2 | 12/2011 | Maeda | |
| 8,075,148 | B2 | 12/2011 | Nada | |
| 8,118,467 | B2 | 2/2012 | Teng | |
| 8,128,271 | B2 | 3/2012 | Nichol | |
| 8,153,888 | B2 | 4/2012 | Smith | |
| 8,158,450 | B1 | 4/2012 | Sheats | |
| 8,189,135 | B2 | 5/2012 | Bae | |
| 8,235,573 | B2 | 8/2012 | Chang | |
| 8,317,352 | B2 | 11/2012 | Saccomanno | |
| 8,317,693 | B2 | 11/2012 | Grey | |
| 8,325,297 | B2 | 12/2012 | Uehara | |
| 8,343,575 | B2 | 1/2013 | Dubrow | |
| 8,346,048 | B2 | 1/2013 | Bita | |
| 8,360,593 | B2 | 1/2013 | Kim | |
| 8,405,063 | B2 | 3/2013 | Kazlas | |
| 8,427,747 | B2 | 4/2013 | Le et al. | |
| 8,436,964 | B2 | 5/2013 | Kim | |
| 8,459,855 | B2 | 6/2013 | Anandan | |
| 8,496,367 | B2 | 7/2013 | Anandan | |
| 8,498,505 | B2 | 7/2013 | Moore | |
| 8,619,363 | B1 | 12/2013 | Coleman | |
| 8,684,546 | B2 | 4/2014 | Ninan | |
| 8,718,437 | B2 | 5/2014 | Coe-Sullivan | |
| 8,721,149 | B2 | 5/2014 | Holman et al. | |
| 8,849,087 | B2 | 9/2014 | Breen | |
| 8,879,024 | B2 | 11/2014 | Suzuki | |
| 8,899,814 | B2 | 12/2014 | Kojima | |

(56) References Cited

U.S. PATENT DOCUMENTS 9,022,632 B2 5/2015 Kim
9,099,046 B2 8/2015 Whitehead
9,110,200 B2 8/2015 Nichol
9,164,215 B2 * 10/2015 Shinohara ............ G02B 6/0016
9,164,216 B2 10/2015 Yuki
9,207,386 B2 12/2015 Kim
9,274,266 B2 3/2016 Ford
9,464,769 B2 10/2016 Ninan
9,478,182 B2 10/2016 Whitehead
10,269,999 B2 4/2019 Vasylyev
10,444,423 B2 10/2019 Dubrow
11,035,993 B2 * 6/2021 Vasylyev ............ G02B 6/0068
11,194,085 B2 * 12/2021 Vasylyev ............ G02B 6/0028
11,402,562 B2 * 8/2022 Vasylyev ............ G02B 6/0068
11,550,093 B2 * 1/2023 Vasylyev ............ G02B 6/0018
11,616,157 B2 3/2023 Vasylyev
11,846,794 B2 12/2023 Vasylyev
2001/0007507 A1 7/2001 Iimura
2002/0018632 A1 2/2002 Pelka
2002/0079485 A1 6/2002 Stintz
2002/0094159 A1 7/2002 Goldberg
2003/0184499 A1 10/2003 Miyashita
2003/0210537 A1 11/2003 Engelmann
2004/0071437 A1 4/2004 Tamura
2004/0103938 A1 6/2004 Rider
2004/0130912 A1 7/2004 Miyashita
2004/0207995 A1 10/2004 Park
2004/0246697 A1 12/2004 Yamashita
2005/0001952 A1 1/2005 Han
2005/0011549 A1 1/2005 Miyoshi
2005/0166957 A1 8/2005 Imoto
2006/0001036 A1 1/2006 Jacob
2006/0056031 A1 3/2006 Capaldo
2006/0056166 A1 3/2006 Yeo
2006/0077687 A1 4/2006 Higashiyama
2006/0087840 A1 4/2006 Franklin et al.
2006/0103589 A1 5/2006 Chua
2006/0109682 A1 5/2006 Ko
2006/0115213 A1 6/2006 Maeda
2006/0215387 A1 9/2006 Wang et al.
2006/0221638 A1 * 10/2006 Chew .................... F21V 29/745
362/616
2006/0269213 A1 11/2006 Hwang
2006/0272698 A1 12/2006 Durvasula
2006/0279296 A1 12/2006 Lee
2007/0002452 A1 1/2007 Munro
2007/0002583 A1 1/2007 Lee
2007/0018558 A1 1/2007 Chua
2007/0057263 A1 3/2007 Kahen
2007/0069978 A1 3/2007 Daiku
2007/0070265 A1 3/2007 Jung
2007/0081329 A1 4/2007 Chua
2007/0081360 A1 * 4/2007 Bailey .................. G02B 6/0028
362/621
2007/0109764 A1 5/2007 Bienick
2007/0109811 A1 5/2007 Krijn
2007/0116424 A1 5/2007 Ting et al.
2007/0121342 A1 5/2007 Tamura et al.
2007/0125415 A1 6/2007 Sachs
2007/0126329 A1 6/2007 Chuang
2007/0146569 A1 6/2007 Nouchi
2007/0177486 A1 * 8/2007 Naoi .................... G02B 6/0028
369/112.19
2007/0183040 A1 * 8/2007 Sinyugin .............. G02B 6/0041
359/515
2007/0201234 A1 8/2007 Ottermann
2007/0227582 A1 10/2007 Chen
2007/0242334 A1 10/2007 Selbrede
2007/0274098 A1 11/2007 Wheatley
2007/0274099 A1 11/2007 Tai et al.
2007/0279727 A1 12/2007 Gandhi
2007/0279940 A1 12/2007 Kim
2008/0002431 A1 1/2008 Maeda
2008/0012031 A1 1/2008 Jang
2008/0025046 A1 * 1/2008 Tsuruta ................ G02B 6/0038
362/621
2008/0037131 A1 2/2008 Steenblik
2008/0048102 A1 2/2008 Kurtz
2008/0084706 A1 4/2008 Roshan
2008/0094854 A1 4/2008 Coleman et al.
2008/0101087 A1 5/2008 Hwang
2008/0158912 A1 7/2008 Chang
2008/0165308 A1 7/2008 Shiraishi
2008/0170414 A1 7/2008 Wang
2008/0191604 A1 8/2008 Morris
2008/0213508 A1 9/2008 Nagasawa
2008/0225526 A1 9/2008 Yoshizawa
2008/0230112 A1 9/2008 Barnham
2008/0232135 A1 9/2008 Kinder
2008/0232136 A1 9/2008 Yamashita
2008/0252986 A1 10/2008 Ijzerman
2008/0260328 A1 10/2008 Epstein
2008/0264483 A1 10/2008 Keshner
2008/0264486 A1 10/2008 Chen
2008/0271776 A1 11/2008 Morgan
2008/0291140 A1 11/2008 Kent
2008/0297697 A1 12/2008 Kim
2009/0027588 A1 1/2009 Medendorp, Jr. et al.
2009/0034292 A1 2/2009 Pokrovskiy
2009/0045420 A1 2/2009 Eng
2009/0059621 A1 3/2009 Takahashi
2009/0067170 A1 3/2009 Bloemen
2009/0067784 A1 3/2009 Ghosh
2009/0091681 A1 4/2009 Nishizawa
2009/0097100 A1 4/2009 Gally
2009/0097229 A1 4/2009 Wood
2009/0097273 A1 4/2009 Chang
2009/0112068 A1 4/2009 Grey
2009/0114280 A1 5/2009 Jensen
2009/0116107 A1 5/2009 Kindler
2009/0122533 A1 5/2009 Brukilacchio
2009/0126777 A1 5/2009 Khazeni
2009/0126792 A1 5/2009 Gruhlke
2009/0129726 A1 5/2009 Hyde
2009/0135623 A1 5/2009 Kunimochi
2009/0139571 A1 6/2009 Chen
2009/0161383 A1 6/2009 Meir
2009/0180191 A1 7/2009 Yamada
2009/0195729 A1 8/2009 Little
2009/0199900 A1 8/2009 Bita
2009/0214156 A1 8/2009 Okubo
2009/0215208 A1 8/2009 Coe-Sullivan
2009/0229652 A1 9/2009 Mapel
2009/0231831 A1 9/2009 Hsiao
2009/0250093 A1 10/2009 Chen
2009/0255567 A1 10/2009 Frolov
2009/0277496 A1 11/2009 Khazeni
2009/0296193 A1 12/2009 Bita
2010/0002414 A1 1/2010 Meir
2010/0002466 A1 1/2010 Kim
2010/0006139 A1 1/2010 Zahuranec
2010/0015738 A1 1/2010 Kim
2010/0026703 A1 2/2010 Parker
2010/0027293 A1 2/2010 Li
2010/0033989 A1 2/2010 Teng
2010/0051089 A1 3/2010 Khazeni
2010/0053992 A1 3/2010 Krijn
2010/0053997 A1 3/2010 Teng
2010/0108056 A1 5/2010 Lin
2010/0110728 A1 5/2010 Dubrow
2010/0111515 A1 5/2010 Saitoh et al.
2010/0116319 A1 5/2010 Martinez Anton
2010/0116336 A1 5/2010 Martinez Anton
2010/0123858 A1 5/2010 Han
2010/0124074 A1 5/2010 Brychell
2010/0139165 A1 6/2010 Oyama
2010/0139749 A1 6/2010 Mapel
2010/0155749 A1 6/2010 Chen
2010/0165245 A1 7/2010 Chang
2010/0180928 A1 7/2010 Raymond
2010/0180946 A1 7/2010 Gruhlke
2010/0182539 A1 7/2010 Ohyama
2010/0186798 A1 7/2010 Tormen

(56) References Cited

U.S. PATENT DOCUMENTS

| | | | |
|---|---|---|---|
| 2010/0193018 A1 | 8/2010 | Feist | |
| 2010/0195019 A1 | 8/2010 | Shinohara | |
| 2010/0200044 A1 | 8/2010 | Zaban | |
| 2010/0202128 A1 | 8/2010 | Saccomanno | |
| 2010/0208493 A1 | 8/2010 | Choi | |
| 2010/0214281 A1 | 8/2010 | Ueno et al. | |
| 2010/0214509 A1 | 8/2010 | Sasaki | |
| 2010/0214802 A1 | 8/2010 | Masuda et al. | |
| 2010/0220956 A1 | 9/2010 | Saarikko et al. | |
| 2010/0224242 A1 | 9/2010 | Chang | |
| 2010/0231613 A1 | 9/2010 | Hamada | |
| 2010/0259826 A1 | 10/2010 | Ji | |
| 2010/0277950 A1 | 11/2010 | Shchekin | |
| 2010/0278480 A1 | 11/2010 | Vasylyev | |
| 2010/0283072 A1 | 11/2010 | Kazlas | |
| 2010/0288352 A1 | 11/2010 | Ji | |
| 2010/0296025 A1 | 11/2010 | Gourlay | |
| 2010/0302218 A1 | 12/2010 | Bita | |
| 2010/0328654 A1 | 12/2010 | Verschuren | |
| 2011/0002143 A1 | 1/2011 | Saarikko | |
| 2011/0019436 A1 | 1/2011 | Van Den Berge | |
| 2011/0026273 A1 | 2/2011 | Bourdelais | |
| 2011/0048498 A1 | 3/2011 | Vaananen | |
| 2011/0061717 A1 | 3/2011 | Kwon | |
| 2011/0099864 A1 | 5/2011 | Bryan et al. | |
| 2011/0110204 A1 | 5/2011 | Hashizume | |
| 2011/0149391 A1 | 6/2011 | Brott | |
| 2011/0198026 A1 | 8/2011 | Gourlay | |
| 2011/0226332 A1 | 9/2011 | Ford | |
| 2011/0227487 A1 | 9/2011 | Nichol | |
| 2011/0267563 A1 | 11/2011 | Shimizu | |
| 2011/0273906 A1 | 11/2011 | Nichol | |
| 2011/0286237 A1 | 11/2011 | Tanoue et al. | |
| 2011/0308611 A1 | 12/2011 | Morgan | |
| 2012/0012741 A1 | 1/2012 | Vasylyev | |
| 2012/0067402 A1 | 3/2012 | Kitai | |
| 2012/0113671 A1 | 5/2012 | Sadasivan | |
| 2012/0113672 A1 | 5/2012 | Dubrow | |
| 2012/0182615 A1 | 7/2012 | Vasylyev | |
| 2012/0328242 A1 | 12/2012 | Hesse | |
| 2013/0028565 A1 | 1/2013 | Moore | |
| 2013/0033895 A1 | 2/2013 | Brown et al. | |
| 2013/0121001 A1 | 5/2013 | Shani et al. | |
| 2013/0155723 A1 | 6/2013 | Coleman | |
| 2013/0160820 A1 | 6/2013 | Lin | |
| 2013/0278611 A1 | 10/2013 | Holman | |
| 2014/0098558 A1 | 4/2014 | Vasylyev | |
| 2014/0299896 A1 | 10/2014 | Xu | |
| 2014/0321157 A1 | 10/2014 | Rhew | |
| 2015/0009687 A1 | 1/2015 | Lin | |
| 2015/0023056 A1 | 1/2015 | Fang | |
| 2015/0160396 A1 | 6/2015 | Wilcox | |
| 2015/0168631 A1 | 6/2015 | Umekawa | |
| 2015/0198757 A1 | 7/2015 | Comstock, II | |
| 2015/0234114 A1 | 8/2015 | Nakashima | |
| 2015/0293289 A1 | 10/2015 | Shinohara | |
| 2015/0346414 A1 | 12/2015 | Chang | |
| 2017/0036598 A1 | 2/2017 | Bombard | |
| 2017/0139113 A1 | 5/2017 | Peeters | |
| 2022/0365267 A1* | 11/2022 | Vasylyev | G02B 6/0068 |
| 2023/0231067 A1 | 7/2023 | Vasylyev | |

FOREIGN PATENT DOCUMENTS

| | | | |
|---|---|---|---|
| DE | 2628291 | A1 | 12/1977 |
| EP | 1998197 | A1 | 12/2008 |
| EP | 2023039 | A1 | 2/2009 |
| EP | 2061092 | A1 | 5/2009 |
| EP | 2157366 | A1 | 2/2010 |
| EP | 2202806 | A1 | 6/2010 |
| FR | 2843806 | | 2/2004 |
| JP | 2001289515 | A | 10/2001 |
| JP | 2002208306 | A | 7/2002 |
| JP | 2002208308 | A | 7/2002 |
| JP | 2003046103 | A | 2/2003 |
| JP | 2003069067 | A | 3/2003 |
| JP | 2003078156 | A | 3/2003 |
| JP | 2003101059 | A | 4/2003 |
| JP | 2003218378 | A | 7/2003 |
| JP | 2004111453 | A | 4/2004 |
| JP | 2004111742 | A | 4/2004 |
| JP | 08190095 | | 5/2004 |
| JP | 06265732 | | 11/2004 |
| JP | 2004311388 | A | 11/2004 |
| JP | 2005071928 | A | 3/2005 |
| JP | 2005353406 | A | 12/2005 |
| JP | 2006114239 | A | 4/2006 |
| JP | 2006261088 | A | 9/2006 |
| JP | 2007087647 | A | 4/2007 |
| JP | 2007240686 | A | 9/2007 |
| JP | 2007256575 | A | 10/2007 |
| JP | 2007305544 | A | 11/2007 |
| JP | 2008122977 | A | 5/2008 |
| JP | 2008198376 | A | 8/2008 |
| JP | 2008270222 | A | 11/2008 |
| JP | 2009043574 | A | 2/2009 |
| JP | 2009115924 | A | 5/2009 |
| JP | 2009277464 | A | 11/2009 |
| JP | 2009301805 | A | 12/2009 |
| JP | 2010250987 | A | 11/2010 |
| KR | 20000038594 | A | 7/2000 |
| KR | 20040045482 | A | 6/2004 |
| KR | 100671649 | B1 | 1/2007 |
| KR | 20080015999 | A | 2/2008 |
| KR | 100839776 | B1 | 6/2008 |
| KR | 20080113887 | A | 12/2008 |
| KR | 100933213 | B1 | 12/2009 |
| KR | 20110074101 | A | 6/2011 |
| KR | 20110096561 | A | 8/2011 |
| TW | 200941089 | A | 10/2009 |
| WO | 2006039315 | A2 | 4/2006 |
| WO | 2006104319 | A1 | 10/2006 |
| WO | 2006126155 | A2 | 11/2006 |
| WO | 2007111959 | A2 | 10/2007 |
| WO | 2007125803 | A1 | 11/2007 |
| WO | 2008045311 | A2 | 4/2008 |
| WO | 2008092038 | A1 | 7/2008 |
| WO | 2008099542 | A1 | 8/2008 |
| WO | 2009002512 | A1 | 12/2008 |
| WO | 2009007832 | A2 | 1/2009 |
| WO | 2009011922 | A1 | 1/2009 |
| WO | 2009014707 | A2 | 1/2009 |
| WO | 2009024509 | A2 | 2/2009 |
| WO | 2009031728 | A1 | 3/2009 |
| WO | 2009035986 | A2 | 3/2009 |
| WO | 2009064701 | A1 | 5/2009 |
| WO | 2009065069 | A1 | 5/2009 |
| WO | 2009066056 | A1 | 5/2009 |
| WO | 2009073470 | A1 | 6/2009 |
| WO | 2009134552 | A2 | 11/2009 |
| WO | 2009144650 | A1 | 12/2009 |
| WO | 2010033002 | A2 | 3/2010 |
| WO | 2010033859 | A2 | 3/2010 |
| WO | 2010062713 | A2 | 6/2010 |
| WO | 2011130718 | A2 | 10/2011 |
| WO | 2013036192 | A1 | 3/2013 |
| WO | 2013067288 | A1 | 5/2013 |

OTHER PUBLICATIONS

Agilent Technologies. Light Guide Techniques Using LED Lamps Application Brief I-003. Dec. 2001.
Apple Cinema Display. 2008.
ASUS Eee PC 900. May 2008.
ASUS Eee PC S1002HA Dec. 2008.
ASUS Eee PC S101. Dec. 2008.
ASUS Eee Top Nov. 2008.
ASUS MX279H. 2012-2013.
ASUS MX279H. Jan. 2013.
BriteView Technologies Inc. High Performance Backlight Systems for LCDs. 2010.
Cho K. et al. High-performance crosslinked colloidal quantum-dot light-emitting diodes. Nature Photonics Jun. 3, 2009.

(56) References Cited

OTHER PUBLICATIONS

Defendant Acer Inc. Preliminary Invalidity Contentions. May 5, 2025.
Defendant ASUSTek Computer Inc. Preliminary Invalidity Contentions Jul. 18, 2025.
Defendant Asustek Computer Inc.s Preliminary Invalidity Contentions dated Sep. 30 2022.
Dell Latitude E6400 2008.
Dell UltraSharp. 2008.
Fujikake H. Advanced flexible liquid-crystal display technologies. SPIE Newsroom 2008.
Fusion Optix DF series Film. 2007.
HP DreamColor LP2480zx. 2008.
Information DisplayDisplay Week—Newsletters and Directories 2008-2009.
Jang H. S. Cho M. W. Park D. S. Micro dot patterning on the light guide panel using powder blasting. Sensors 8 877-885 2008.
Jason H. Karp and Joseph E. Ford Planar micro-optic solar concentration using multiple imaging lenses into a common slab waveguide Proc. of SPIE vol. 7407 74070D-11. Aug. 20, 2009.
Kobayashi S. et al. LCD Backlights. John Wiley Sons 2009.
Kristofer Tvingstedt Massimo Tormen Luca Businaro Olle Inganas "Light confinement in thin film organic photovoltaic cells" Photonics for Solar Energy Systems Ed. Andreas Gombert Proc. of SPIE vol. 6197 2006.
Kristofer Tvingstedt Simone Dal Zilio Olle Inganas Massimo Tormen Trapping light with micro lenses in thin film organic photovoltaic cells Optics Express vol. 16 No. 26 Dec. 22, 2008.
Lenovo Thinkpad X300 Notebook 2008.
Lim S.K. LCD Backlights and Light Sources. Proceedings of ASID "Oct. 6, 2006.".
MultiSync LCD2180WG. 2005.
NEC CRV43 2009.
Ostendo CRVD 43 Curved Display 2008-2009.
Park S. et al. Grating micro-dot patterned light guide plates for LED backlights. Optical Society of America vol. 15 No. Jan. 6, 2007.
QD Vision. QD-LED Development. 2010.
Rao Surampudi et al. Solar Cell and Array Technology for Future Space Science Missions Final Report JPLNASA. Jun. 2002.
Samsung 600070008000. 2009.
Samsung Active-Matrix QLED display. 2011.
Samsung XL20 XL24 XL30 LED. 2007.
Sony Bravia KDL-46X3500. 2008.
Sony Bravia NX800. 2010.
Sony HX800 2010.
Sony KDL-XBR10. 2009.
Sony KLV-40ZX1M. 2009.
Sony Qualia. 2004.
Sony Vaio PCG-X505 2005.
Sony Vaio TZ 2007.
SwingFrame LED Edge-Lit Light Boxes. 2010.
Tec Art LED Edge-Lit Signs and EvenLit Light Panels. 2008.
VH198T LCD monitor Nov. 2010.
VK278Q LCD Monitor. Nov. 2010.
Wu et al. Fabrication of an LCD light guide plate using closed-die hot embossing. Journal of Micromechanics and Microengineering 18 035006 2008.
Yu M. Backlight Technology Overview. Denistron Technologies Feb. 2006.

* cited by examiner

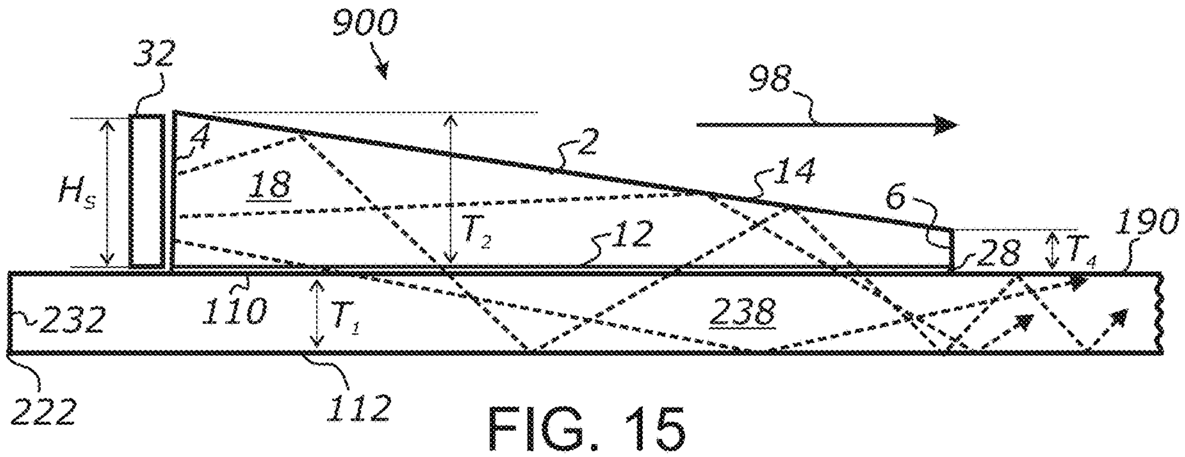
FIG. 15
FIG. 16
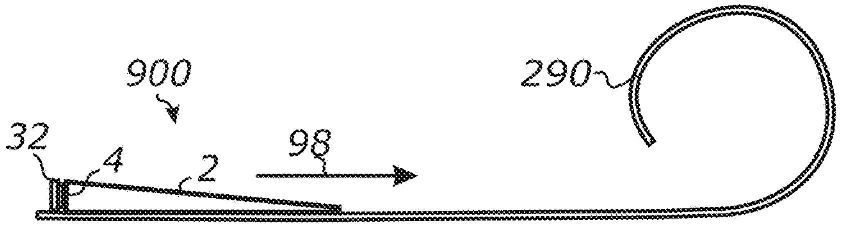
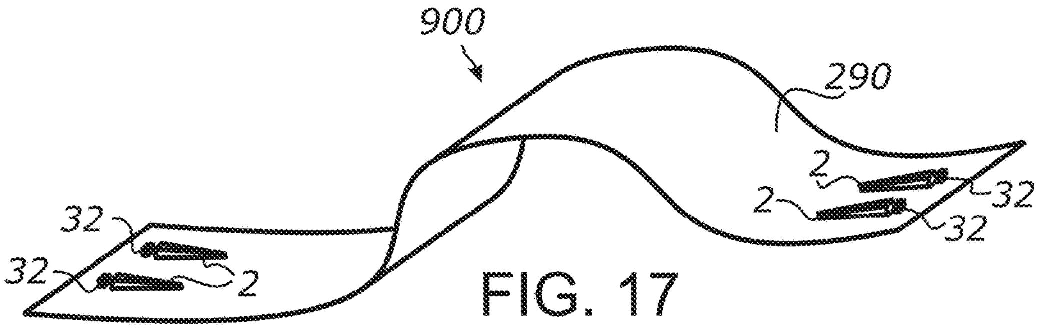
FIG. 17
FIG. 18
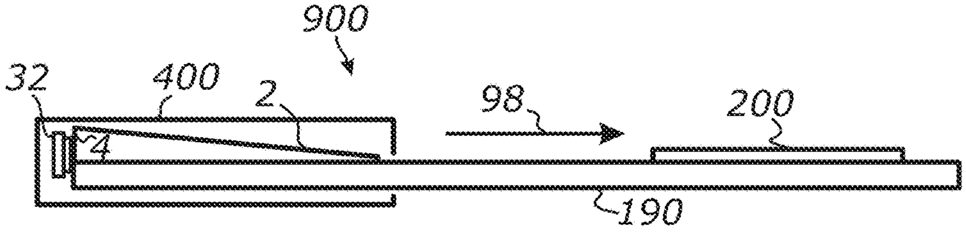

BACKLIGHT UNIT FOR LCD DISPLAYS WITH WAVEGUIDE-INTEGRATED RIDGE STRUCTURES AND SIDE-EMITTING LEDs

CROSS-REFERENCE TO RELATED APPLICATIONS

This application is a continuation of U.S. patent application Ser. No. 18/518,405 filed on Nov. 22, 2023, which is a continuation of U.S. patent application Ser. No. 18/092,184 filed on Dec. 30, 2022, which is a continuation of U.S. patent application Ser. No. 17/875,375 filed on Jul. 27, 2022, which is a continuation of U.S. patent application Ser. No. 17/539,886 filed on Dec. 1, 2021, which is a continuation of U.S. patent application Ser. No. 17/343,734 filed on Jun. 10, 2021, which is a continuation of U.S. patent application Ser. No. 15/231,063 filed on Aug. 8, 2016, which claims priority from U.S. provisional application Ser. No. 62/205,644 filed on Aug. 14, 2015, U.S. provisional application Ser. No. 62/235,918 filed on Oct. 1, 2015, U.S. provisional application Ser. No. 62/254,106 filed on Nov. 11, 2015, and U.S. provisional application Ser. No. 62/304,291 filed on Mar. 6, 2016, the disclosure of which is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to light emitting waveguides that distribute light over a broad-area surface of a waveguiding substrate and may be further configured to emit light from such broad-area surface. This invention also relates to an apparatus and method of inputting light into a waveguiding substrate through its face as opposed to edge-lit light guides where light is input though one or more edges. More particularly, this invention relates to wide-area luminaires, illuminated panel signs, illuminated window pane signs, front lights, backlights, lighting panels, LCD display backlights, computer screens, advertising displays, road signs, decorative broad-area lights, as well as to a method for redistributing light from a variety of light sources in such devices.

2. Description of Background Art

Conventionally, light emitting devices employing a planar waveguide include an optically transmissive plate, a light source coupled to the plate's edge and a series of optical features distributed along a major surface of the plate for extracting light at predetermined locations of the surface. The conventional edge-lit waveguide illumination systems may exhibit certain limitations such as such as difficulty to efficiently couple light into the waveguide from relatively large light sources and the need of the accessibility of the waveguide's edges for light input.

U.S. Patent Applications Publication No. 2014/0226361, the disclosure of which is incorporated herein by reference, discloses face-lit waveguide illumination systems formed by a planar waveguide and one or more elongated optical elements attached to a face of the waveguide.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

According to one embodiment, a face-lit waveguide illumination system is formed by a waveguiding substrate and one or more elongated light coupling elements attached to a broad-area surface of the substrate. One or more compact light sources, such as Light Emitting Diodes (LEDs), may be positioned to illuminate a terminal end of each elongated light coupling element. In different implementations, the elongated shape of at least one light coupling element may have a taper in one or more dimensions. According to one embodiment, multiple light coupling elements may be arranged into an array with spacing between individual elements selected so as to minimize premature light decoupling from the waveguiding substrate. According to some embodiments, the light coupling elements may be distributed over a surface and/or one or more edges of the waveguiding substrate according to various patterns. According to some embodiments, the waveguide illumination systems may be configured to receive light on one or more light coupling elements, one or more edges of the waveguiding substrate, or both.

A method of making a face-lit waveguide illumination system, consistent with the present invention, includes providing a substantially transparent waveguiding substrate, providing a plurality of elongated light coupling elements, and attaching the light coupling elements to a broad-area surface of the waveguiding substrate with a good optical contact. The method also includes forming light extraction features in a surface of the waveguiding substrate or within the bulk material of the substrate.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 15 is a schematic longitudinal section view of a face-lit waveguide illumination system portion, showing an LED light source coupled to a light input face of a light coupling element attached to a broad-area surface of a waveguiding substrate at a distance from edges defining the substrate, according to at least one embodiment of the present invention.

FIG. 16 is a schematic side view of longitudinal section view of a face-lit waveguide illumination system, showing a light coupling optical element attached to a surface of a thin flexible waveguiding substrate, according to at least one embodiment of the present invention.

FIG. 17 is a schematic perspective view of a flexible face-lit waveguide illumination system longitudinal section view a face-lit waveguide illumination system, showing light coupling elements distributed over a surface of an optically transmissive film according to an ordered two-dimensional pattern, according to at least one embodiment of the present invention.

FIG. 18 is a schematic longitudinal side or cross-section view of a face-lit waveguide illumination system employing an opaque housing that is at least partially encasing or enclosing a light coupling element, according to at least one embodiment of the present invention.

DETAILED DESCRIPTION OF THE INVENTION

Figure 1:
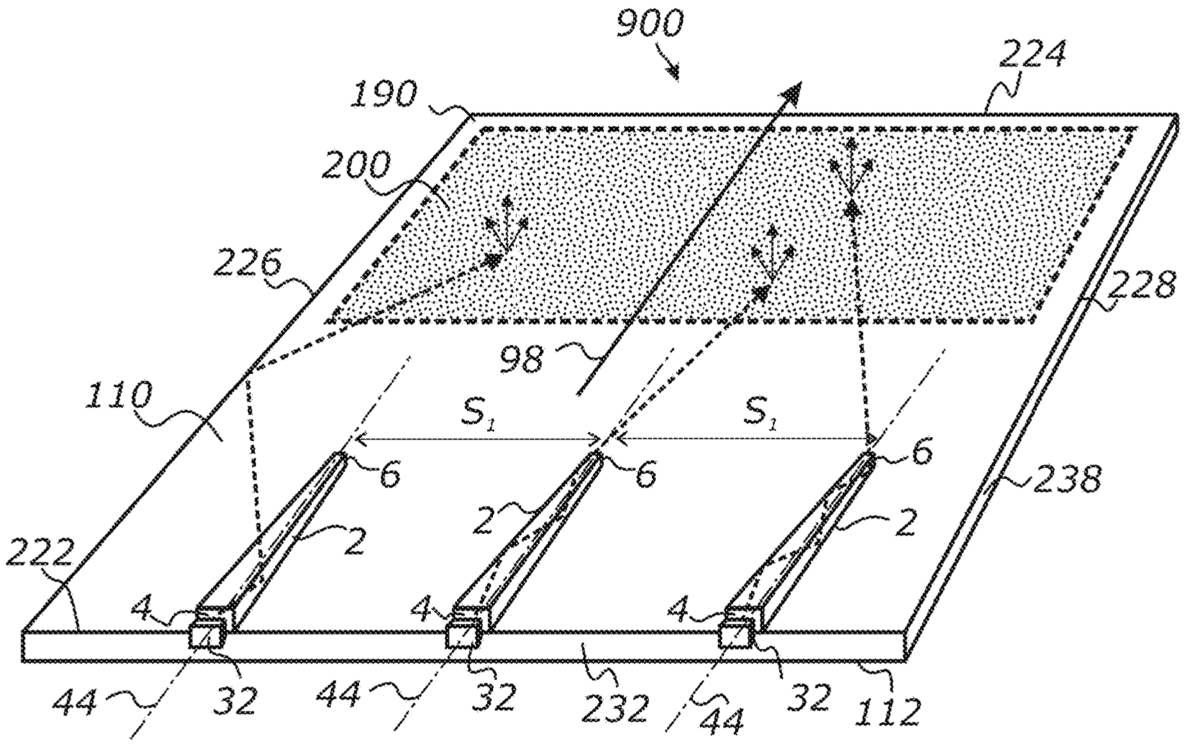
FIG. 1 is a schematic perspective view of a face-lit waveguide illumination system, according to at least one embodiment of the present invention.

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term “light” will be used herein although the general terms “electromagnetic energy”, “electromagnetic radiation”, “radiant energy” or exemplary terms like “visible light”, “infrared light”, or “ultraviolet light” would also be appropriate.

Furthermore, many applications exist for the present invention in relation to distributing light by means of a planar optical waveguide which hereinafter may also be referenced to as a planar light guide. The planar optical waveguide refers to a broad class of objects employing an optically transmissive material confined between two opposing broad surfaces which are substantially parallel to each other. The term substantially parallel generally includes cases when the opposing surfaces are parallel within a predetermined accuracy, particularly including the cases when the body of the material defined by the above surfaces has a slightly tapered shape or has a variable thickness across the surface.

It is also noted that terms such as “top”, “bottom”, “side”, “front” and “back” and similar directional terms are used herein with reference to the orientation of the Figures being described and should not be regarded as limiting this invention in any way. It should be understood that different elements of embodiments of the present invention can be positioned in a number of different orientations without departing from the scope of the present invention.

According to the present invention, the planar waveguide may be exemplified by a transparent plate, slab, panel, pane, light-transmitting substrate or any suitable sheetform of an optically transmissive material. This invention is also applicable to any two-dimensional shape variations of the sheetforms, including but not limited to a rectangle, a polygon, a circle, a strip, a freeform, or any combination therein. This invention is further applicable to any three-dimensional shapes that can be obtained by bending the sheetforms accordingly, including but not limited to cylindrical or semi-cylindrical shapes, conical shapes, corrugated shapes, tubular shapes, and the like.

The present invention will now be described by way of example with reference to the accompanying drawings.

FIG. 1 schematically depicts an embodiment of a face-lit waveguide illumination system 900 in accordance with the invention. System 900 includes a waveguiding substrate 190 having a rectangular sheet-form structure. By way of example and not limitation, such sheet-form waveguiding structure may exemplify a planar waveguide of a wide-area lighting panel or a backlight of an LCD display.

Waveguiding substrate 190 is defined by a first broad-area surface 110 and an opposing second broad-area surface 112 extending substantially parallel to first surface 10. Substrate 190 also has four edges 222, 224, 226, and 228, as well as four side surfaces 232, 234 (not shown in FIG. 1), 236 (not shown in FIG. 1), and 238 at those edges, respectively.

Waveguiding substrate 190 should preferably be made from a highly transmissive optical material. Suitable materials for waveguiding substrate 190 include optically clear polymers, such as for example, poly (methyl methacrylate) (PMMA, acrylic), polycarbonate (PC), polystyrene (PS), polyethylene terephthalate (PET), and polyvinyl chloride (PVC). Water-clear glass may also be well suited for making waveguiding substrate 190.

System 900 further includes a plurality of highly elongated light coupling elements 2 attached to surface 110 with a good optical contact. Such highly elongated light coupling elements 2 are oriented parallel to each other and perpendicular to edge 222 of waveguiding substrate 190. Each light coupling elements 2 is shaped in the form of a tapered rectangular rod or bar having a wider first terminal end and an opposing narrower second terminal end. In one embodiment, light coupling element 2 has the shape of an irregular, oblique truncated pyramid with a rectangular base surface defining a light input face 4 at the first terminal end and an opposing rectangular end face 6 at the opposing tapered terminal end. The wider light input face 4 is ordinarily planar and extends transversely with respect a longitudinal axis 44 of light coupling element 2. In one embodiment, light input face 4 is generally perpendicular or near-perpendicular to longitudinal axis 44 and has a generally rectangular shape with either sharp or rounded corners. The opposing end face 6 may have any shape and any slope with respect to longitudinal axis 44 and/or surface 110. In one embodiment, end face 6 is perpendicular or near-perpendicular to longitudinal axis 44 and/or surface 110. In one embodiment, end face 6 is inclined at an angle with respect to longitudinal axis 44 and/or surface 110.

Light coupling elements 2 may have a taper in one or two dimensions along axis 44. For example, each coupling element 2 may have a taper in a dimension that is parallel to a prevailing plane of waveguiding substrate 190, in a dimension that is perpendicular to such plane, or in both such dimensions.

Light coupling elements 2 are arranged into a linear array in which individual elements 2 are spaced from each other by a predetermined constant spacing distance $S_1$, hereinafter also referred to as spacing $S_1$.

Each of light coupling elements 2 within the array is aligned with its longitudinal axis perpendicular to edge 222 so that it extends from edge 222 towards opposing edge 224 along surface 110. The uttermost light coupling elements 2 in the array are spaced from edges 226 and 228 by a spacing distance $S_W$, hereinafter also referred to as spacing $S_W$.

Depending on the configuration of the parallel array of light coupling elements 2 and the relative width of the elements 2 with respect to spacing between individual elements 2, it may be convenient to define the respective spacing distances differently. For example, for the case of a width of light coupling elements 2 being significantly greater than spacing between adjacent elements 2 (especially when the spacing is greater than the width by about ten times or more), spacing distance $S_1$ may be defined as a distance between longitudinal centerlines of the respective rods that form elements 2. For the case where the width is significant compared to the spacing, $S_1$ may be defined as a distance between bodies of light coupling elements 2 at a midpoint length. Likewise, spacing $S_W$ may be defined relatively to the centerlines of respective light coupling elements 2 (for narrow light coupling elements 2) or relatively to a surface facing the respective edge of waveguiding substrate 190 (for relatively wide light coupling elements 2).

Light coupling elements 2 are preferably made from a highly transmissive solid dielectric material that has a refractive index similar or substantially the same as that of waveguiding substrate 190. In one embodiment, light coupling elements 2 are made from the same material as waveguiding substrate 190. Suitable materials for waveguiding substrate 190 include but are not limited to water-clear glass, acrylic, polycarbonate, styrene, polyester, cured urethane, PVC, silicone, and the like. According to one embodiment, light coupling elements 2 can be made from a different material than waveguiding substrate 190 (e.g., different polymers or different grades of the same polymer). In this case, a difference in refractive indices of the materials of light coupling elements 2 and waveguiding substrate 190 should preferably be within 0.1, more preferably within 0.05 and even more preferably within 0.03

By way of example and not limitation, individual light coupling elements 2 may be made by extrusion or injection molding from bulk acrylic (PMMA) or polycarbonate material. In a further non-limiting example, light coupling elements 2 may be made by machining of a rectangular block, plate or slab of acrylic, polycarbonate or glass with the subsequent surface polishing to a high gloss. In a yet further example, light coupling elements 2 may be overmolded onto broad-area surface 110.

Light coupling elements 2 may be bonded to surface 110 with refractive index matching where an optical coupling layer, such as a highly transmissive optical adhesive. The optical adhesive should preferably have a refractive index that is within 0.05 of the refractive indices of waveguiding substrate 190 and light coupling elements 2. By way of example, the optical adhesive material may include an optically clear silicone, optically clear adhesive transfer tape, as well as adhesives or encapsulants that can be applied in a liquid form with the subsequent polymerization or curing by heat, moisture or UV light.

System 900 further includes a linear array of light emitting diode (LED) sources 32 having the same spacing as light coupling elements 2. Light emitting diode sources 32, hereinafter also referred to as LED sources 32 or LEDs 32, are further positioned in registration with light input faces 4 of the respective light coupling elements 2. LED sources 32 are preferably positioned in a very close proximity to faces 4 so that most (or at least a substantial part) of light emitting by the LEDs is received by the light input faces 4 and enters light coupling elements 2.

LED sources 32 may include but are not limited to surface mounted (SMD) LEDs, chip-on-board (COB) LEDs and or organic LEDs (OLEDs). LED sources 32 may also be formed by LED packages employing multiple LED chips or dies (e.g., multi-chip COB LEDs also referred to as MCOB LEDs).

LED sources 32 may be arranged on a common substrate such as, for example, a heat-conducting printed circuit board (PCB), aluminum plate or flexible copper foil. Such substrate may be further attached to a metal extrusion channel and/or a heat sink with a good thermal contact.

One or more LED sources 32 may have an integrated collimating lens of a refractive or reflective type which can be used to improve light extraction from the LED and/or narrow the angular distribution of light emitted by the respective LED chip.

Each LED source 32 has a light emitting aperture which preferably has a square, rectangular or quasi-rectangular shape with either sharp or slightly rounded corners. However, this invention is not limited to this and is amenable to various modifications and alternative shapes of the light emitting aperture (e.g., round, linear, or free-form shapes).

In the context of the preferred embodiments of the present invention, the term “light emitting aperture” generally refers to an area or opening of LED source 32 that actually emits light. According to an aspect of the present invention, when LED source 32 has a generally planar light emitting surface, such planar light emitting surface may form the light emitting aperture of LED source 32. When LED source 32 emits light though an opening, the light emitting aperture may be defined by such opening.

Depending on the design of an individual LED sources 32, the light emitting aperture of such source may include the area occupied by LED chips and may further include surrounding areas occupied by various components of the respective LED package, such as, for example, light-recycling cavity, encapsulant, phosphors, and beam-shaping optics (if any). A width of the light emitting aperture may be equal to, slightly larger, or considerably larger than that of an area of the surface of the actual LED chip(s) where the light emitting aperture is formed.

Considering that LEDs normally emit a highly divergent light beam which cross-sectional size rapidly increases with distance, LED sources 32 should be generally positioned in a close proximity to light input face 4 so that nearly all or at least a substantial part of the emitted light can freely enter into light coupling elements 2 without significant light spillage. According to one embodiment, the light emitting aperture of each LED source 32 is disposed in an immediately adjacent position with respect to face 4. According to one embodiment, a relatively small gap between the light emitting aperture of LED source 32 and light input face 4 may be allowed. One or more LED source 32 may also be provided with a collimating lens configured to intercept all or at least a substantial part of the divergent light beams emanated by individual LEDs and collimate said beams into narrower angular cones.

It should be understood that face-lit waveguide illumination system 2 may be adapted to utilize light sources other than light emitting diodes (LEDs). For example, any single LED source 32 or groups of LED sources 32 may be replaced with one or more light sources of a known type, including but not limited to fluorescent lamps, incandescent lamps, cold-cathode or compact fluorescent lamps, halogen, mercury-vapor, sodium-vapor, metal halide, electroluminescent lamps or sources, field emission devices, lasers, etc. Multiple such light sources may be incorporated into a linear or two-dimensional array which may have any suitable shape, including compact or extended two-dimensional or one-dimensional (elongated) shapes.

LED sources 32 may further include integrated or external optics such as collimating or light-redistributing lenses, mirrors, lens arrays, mirror arrays, light diffusers, waveguides, optical fibers and the like. When multiple light emitting elements (e.g., LEDs) are employed, each of such elements may be provided with individual optics. Alternatively, a single linear optic may be provided for the entire array to collimate light or otherwise shape the emitted beam in a plane which is perpendicular to the longitudinal axis of the array.

Waveguiding substrate 190 further includes a light emission area 200 having a plurality of light extraction features 20 distributed over such area. Light extraction features 20 can be any optical elements designed to disrupt the waveguide-mode light propagation in substrate 190 and progressively extract light from the substrate so that the light emission area 200 can emit light. Light extraction features 20 may be exemplified by dots of light-scattering white paint, pigment on ink randomly or quasi-randomly distributed over light emission area 200. In another example, light extraction features 20 may be formed by surface microstructures or light-scattering texture. The light scattering/extracting dots or pattern may be applied to surface 110, surface 112, or both. In a yet another example, light extraction features 20 may be formed by microscopic bulk-scattering particles embedded into the material of substrate 190 within boundaries of area 200.

In one embodiment, areas of waveguiding substrate 190 between light coupling elements 2 and/or areas adjacent to elements 2 along the optical path may be made free from any light extracting features. In one embodiment, light emission area 200 may be formed adjacently to the area occupied by light coupling elements 2. In one embodiment, light emission area 200 is formed at a distance from the area occupied by light coupling elements 2. Such distance may be selected based on the specific application. For example, certain applications may benefit from providing a certain minimum distance between light coupling elements 2 and light emission area 200, for example, to allow for light beam mixing and homogenization within waveguiding substrate 190 before any light can be extracted.

Light emitting area 200 may have any two-dimensional shape which, in turn, may include multiple smaller light emission areas arranged and shaped in any suitable manner. For example, light emitting area 200 may include any geometric shapes, symbols, characters, letters, words, indicia, images, and patterns. Light emitting area 200 may also be configured to represent no particular shape or visible pattern and may simply provide a uniform or non-uniform glow for illumination or visual effect function.

In one embodiment, light emitting area 200 may include a layer of photo luminescent or phosphor material. Such material can be configured to absorb light in a first wavelength and re-emit light in a second wavelength which is different than the first wavelength. In one embodiment, it is preferred that the second wavelength is greater than the first wavelength. By way of example, such material can be configured to absorb at least a portion of blue light emitted by some types of LEDs and re-emit the energy of such blue light in the form of perceptibly white light.

Face-lit waveguide illumination system 900 may further incorporate various color filters, inks, dyes or other devices or substances that change the color of the extracted light. It may also incorporate polarizing elements, fluorescent elements, fluorescent elements, light scattering or diffusing elements and the like, which may be provided as separate layers or incorporated into the bulk material of the optical elements of LED sources 32, the body of light coupling element 2, waveguiding substrate 4, or light emitting area 200.

In operation, LED sources 32 emit light towards respective light coupling elements 2 which assists in injecting said light into waveguiding substrate 190 while maintaining a prevailing light propagation direction 98 which is perpendicular to edge 222 of the substrate. Depending in the incidence angle and orientation of the light rays with respect to a normal to light input face 4 of a particular light coupling element 2, such rays may undergo single or multiple reflections from longitudinal walls of light coupling element 2 before being injected into waveguiding substrate 190.

In one embodiment, longitudinal side walls of light coupling element 2 have smooth, high-polish surfaces so that they can reflect light by means of a total internal reflection (TIR) in a specular mode. In one embodiment, longitudinal side walls of light coupling element are coated with a layer of a highly reflective material (such as, for example, aluminum or silver) and are configured to reflect light by means of a specular reflection.

Figure 2:
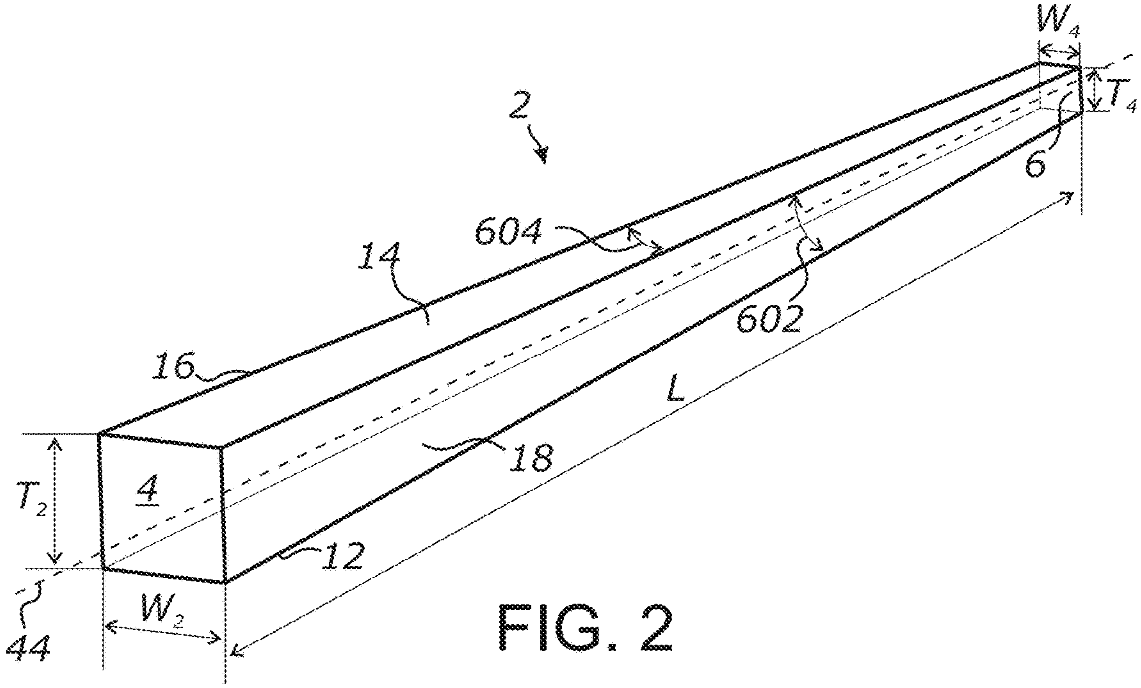
FIG. 2 is a schematic perspective view of a tapered light coupling element, according to at least one embodiment of the present invention.

FIG. 2 shows an embodiment of a highly elongated, double-tapered light coupling element optical 2 which has a light guiding function and can be advantageously selected for injecting light into relatively thin waveguide substrates. In particular, such configuration may be preferred when the thickness of waveguiding substrate 190 is considerably less than the respective dimension of LED sources 32 or their light emitting aperture. It may be particularly suited for the cases where the size of the light emitting aperture is greater than the substrate thickness by about two times or more.

Referring to FIG. 2, light coupling element 2 is represented by a solid, optically transparent body that has the shape of a highly elongated frustum or truncated pyramid. The body of light coupling element 2 is defined by a transversal light input face 4 (a base of the respective frustum or truncated pyramid), an opposing transversal end face 6, two longitudinal side faces 16 and 18, longitudinal top face 14 and opposing longitudinal bottom face 12.

The bottom face 12 is adapted for being attachable to planar surfaces, such as broad-area surface 110 of waveguiding substrate 190 (not shown). A portion of the highly elongated tapered light coupling element 2 that is located near light input face 4 may be referred to as a light input end of light coupling element 2 and the opposing portion may be referred to as an opposing terminal end of such element 2. Bottom face 12 is configured as a primary light output surface of light coupling element 2. In other words, system 900 in general and light coupling element in particular are designed such that the light energy received on light input edge 4 is primarily output from light coupling element 2 through bottom face 12. It is noted that, according to at least some embodiments, some light energy may be output from light coupling element 2 through other faces as well. For example, small portions of light rays may escape from light coupling element 2 through end face 6, longitudinal side faces 16 and 18, longitudinal top face 14, and even light input face 4. However, the amount of light energy escaping through any one of such surfaces should be considerably less than the amount of light energy output from light coupling element 2 through bottom face 12.

Light input face 4 extends perpendicular or near perpendicular to longitudinal axis 44 of light coupling element 2. Light output face 12 extends parallel or near parallel to longitudinal axis 44 and perpendicular or near perpendicular to light input face 4. Faces 14, 16, and 18 extend parallel or near parallel to longitudinal axis 44. It is generally preferred that, when any of the faces 14, 16, and 18 are not exactly parallel to longitudinal axis 44, such face forms a relatively low angle with respect to such axis. Such angle is preferably less than 5°, more preferably less than 4°, and still more preferably less than 3°. Faces 14, 16, and 18 are configured as TIR surfaces. A TIR surface is defined as a surface capable of internally reflecting light rays when such rays have incidence angles above the critical angle of TIR characterizing the surface. Each of faces 14, 16, and 18 should have a smooth surface finish and provide for good reflectance in the TIR mode when light is internally incident onto the respective face at angles below the critical TIR angle.

Light input face 4 has a rectangular shape having a width $W_2$ and a thickness $T_2$. Thickness $T_2$ also defines a height of light coupling element 2 above surface 110 at its wider terminal end. The opposing end face 6 has a width $W_4$ and a non-zero thickness $T_4$, respectively. The body of light coupling element 2 is double-tapered (tapered in both width and thickness dimensions) towards face 6 so that $W_2>W_4$ and $T_2>T_4$.

The extent of light coupling element 2 along its longitudinal axis 44 defines a length L of such element. When light coupling element 2 is used with thin light guiding (waveguiding) substrates, its length L should preferably be several times greater than a major dimension of the light input face 4, with a ratio of at least 5 and up to about 15. According to one embodiment, length L is at least 5 times and no more than 15 times greater than a largest transversal dimension of light coupling element 2 at its base. Such largest transversal dimension may be defined as the greater of the width $W_2$ and thickness $T_2$ dimensions characterizing light coupling element 2. According to one embodiment, length L is at least 10 times and no more than 15 times greater than the greater of width $W_2$ and thickness $T_2$. According to one embodiment, length L is at least 8 times greater than a transversal size of the rod-like body of light coupling element 2 at its base. According to one embodiment, L is at least 10 times greater than such transversal size. According to one embodiment, length L is at least 5 times and no more than 15 times greater than thickness $T_2$.

According to one embodiment, the solid body of light coupling element 2 is formed by a frustum of an oblique pyramid where face 4 is perpendicular to bottom face 12. Bottom face 12 also makes less-than-90° dihedral angles with faces 14, 16, 18. Longitudinal side faces 14 and 18 may be disposed symmetrically with respect to longitudinal axis 44 and may form identical angles with said axis. The term "dihedral angle", when applied to describing relative orientation of two surfaces or faces is directed to mean a dihedral angle between planes defined by such surfaces or faces. When one or both surfaces or faces have some curvature, the dihedral angles between such surfaces or faces is defined as a dihedral angle between prevailing planes characterizing such surfaces or faces.

A first taper angle 602 characterizes the taper of light coupling element 2 in a height (or thickness) dimension and a second taper angle 604 characterizes the taper of light coupling element 2 in an orthogonal width dimension. Accordingly, light coupling elements 2 may be tapered in at least two orthogonal dimensions.

According to one embodiment, end face 6 is planar and parallel to light input face 4. However, possible configurations of light coupling element 2 are not limited to this. End face 6 may also have a concave or convex curved shape and may also be disposed at an angle with respect to face 4.

Taper angles 602 and 604 should preferably be sufficiently low to minimize light rays reaching below-TIR angles with respect to a normal to faces 14, 16, and 18 even after multiple bounces from such faces and thus to minimize unwanted light leakage from light coupling element 2.

Both taper angles 602 and 604 are preferably less than 6° and even more preferably less than 5°. For the cases where light coupling element 2 is designed for injecting light into very thin waveguides ($T_2>>T_1$), both taper angles should preferably be less than 4°, even more preferably less than 3°,and can be even less than 2°. According to one embodiment, taper angle 602 is greater than taper angle 604. According to one embodiment, taper angle 604 is greater than taper angle 602.

According to one non-limiting example, optical element can have the following dimensions: $T_2 \approx W_2=3$ mm, L=44 mm, $T_4 \approx W_4=1$ mm. The respective taper angles 602 and 604 can be approximately 2.9°. Such configuration may be advantageously selected for injecting light from LED sources 32 having 2.5-3 mm light emitting aperture into planar light guiding plates or films having thicknesses between 0.3 mm and 3 mm.

According to another non-limiting example, optical element can have the following dimensions: $T_2 \approx 2$ mm, $W_1=3$ mm, L=40 mm, $T_4 \approx W_2 \approx 1.5$ mm. Such configuration may be advantageously selected for injecting light from LED sources 32 having a rectangular or square light emitting aperture with 2-3 mm dimensions into planar light guiding plates or films having thicknesses between 0.2 mm and 2 mm.

For larger LEDs, the respective dimensions of light coupling element 2 can be proportionally scaled in order to capture substantially all of the emitted light. Furthermore, the entrance aperture of light coupling element 2 (as defined by width $W_2$ and thickness $T_2$) can be made slightly larger than the light emitting aperture of the LEDs to minimize the energy spillage. For example, for a 4 mm LED sources 32, light coupling element 2 could have the following dimensions: can have the following dimensions: $T_2 \approx W_2=4.2$ mm, L=56 mm, $T_4 \approx W_4=1.4$ mm, with the taper angles 602 and 604 being similar to those of the above example.

The ratio between widths $W_2$ and $W_4$ can generally be greater than one and less than 10. According to one embodiment, a $W_4/W_2$ ratio is greater than 0.2 and less than 0.8. According to one embodiment, the $W_4/W_2$ ratio is between ¼ and ¾. According to one embodiment, such ratio is between ⅓ and ⅔.

For the cases where the space taken by optical element 50 should be minimized, length L can be shortened with or without increasing the taper angles 602 and 604, although this could also result in reducing the efficiency of light injection into the underlying waveguide. For some applications, some light loss may be tolerated and the dimensions of light coupling element 2 may be modified according to different criteria (e.g., percentage of the allowed light loss).

The basic principles of operation of elongated light coupling elements attached to a face of planar waveguide and illuminated by LED sources are disclosed in U.S. Patent Applications Publication No. 2014/0226361, the disclosure of which is incorporated herein by reference in its entirety.

Figure 3:
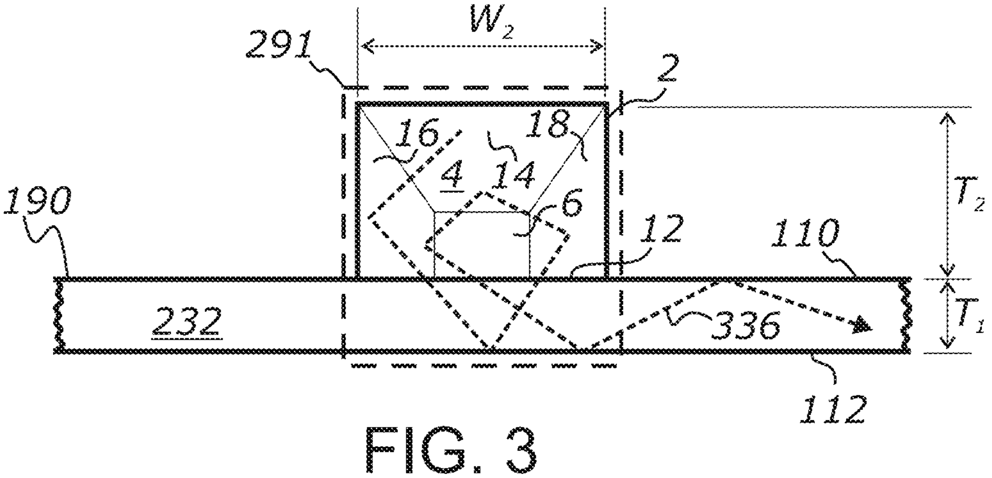
FIG. 3 is a schematic front view of a face-lit waveguide illumination system portion, illustrating light injection into a planar substrate using a light coupling element attached to a face of the waveguide, according to at least one embodiment of the present invention.

FIG. 3 schematically illustrates light injection into thin waveguiding substrate 190 using an individual light coupling element 2. The tapered end (end face 6) of light coupling element 2 shown in FIG. 3 is facing away from the viewer and light input face 4 is facing towards the viewer. Light coupling element 2 has the shape of an irregular truncated pyramid with a rectangular base surface formed by light input face 4 and a tapered top formed by opposing rectangular end face 6. Light input face 4 and end face 6 are connected by planar top and bottom planar faces 12 and 10, respectively, and by left and right planar side faces 14 and 16, respectively. Bottom planar face 10 of light coupling element 2 is disposed in a good optical contact with surface 110 of waveguiding substrate 190 with refractive index matching.

Waveguiding substrate 190 has a thickness $T_1$ and light coupling element 2 has thickness $T_2$. In the context of the present invention, thickness $T_2$ of light coupling element 2 may also be referred to as a height of such element above waveguiding substrate 190. In the illustrated embodiment, thickness $T_1$ is less than thickness $T_2$. In various further exemplary embodiments, the ratio of $T_2/T_1$ may be greater than 2, greater than 3, greater than 5 and greater than 10, respectively.

Width $W_2$ of light coupling element 2 is measured at a base of the respective truncated rectangular pyramid forming light coupling element 2 and is generally defined by the respective dimension of an effective light emitting aperture of LED source 32 (not shown in FIG. 3). In case of a rectangular light emitting aperture of LED source 32, light input face 4 may have a rectangular shape with width $W_2$ being approximately equal to the combined thicknesses of waveguiding substrate 190 and light coupling element 2: $W_2 \approx T_1 + T_2$.

A light ray 336 exemplifies light received by light coupling element 2 from LED source 32. Ray 336 enters light coupling element 2 through light input face 4 and is propagated towards opposing end face 6 in response to optical transmission and a total internal reflection (TIR) from side surfaces 10 and 14, top surface 12 and a portion of broad-area surface 112 disposed beneath the light coupling element 2.

It may be appreciated that the good optical contact and refractive index matching between bottom face 12 and broad-area surface 110 of waveguiding substrate 190 provide for a generally unimpeded light passage from light coupling element 2 to waveguiding substrate 190 and back. Thus, light coupling element 2 and a portion of waveguiding substrate 190 immediately below such element together form a combined leaky waveguide or TIR envelope (indicated by a dashed box area 291 in FIG. 1) where light can propagate towards end face 6 in a TIR mode but can also permanently escape from light coupling element 2 through spaces formed by the thickness of waveguiding substrate 190.

Such TIR envelope 291 confines ray 336 so that it can propagate along the longitudinal axis of element 2 undergoing multiple acts of TIR until it reaches an opening between bottom face 10 and broad-area surface 112. Ray 336 thus eventually escapes from TIR envelope 291 and continues its propagation through the body of waveguiding substrate 190 by means of TIR, which completes the injection of such ray into the substrate. The tapered shape of light coupling element 2 ensures that a transversal cross-section of the element progressively diminishes and that the propagation angles of light rays with respect to longitudinal axis 44 progressively increase along the optical path, thus increasing the rate of light injection into waveguiding substrate 190.

Figure 4:
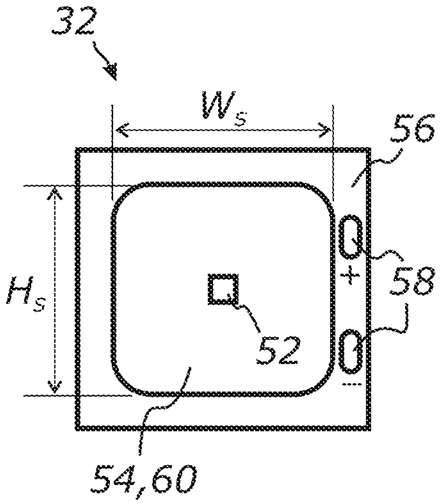
FIG. 4 is a schematic view of an LED source having a rectangular light emitting aperture, according to at least one embodiment of the present invention.

FIG. 4 shows a schematic view of an exemplary embodiment of LED source 32 that can be coupled to the waveguide structure depicted in FIG. 3.

LED source 32 of FIG. 4 is formed by an SMD LED package that includes a single LED chip 52 mounted on a substrate 56 and encapsulated with an encapsulation layer 54. It may further include electrical contacts 58 for connecting the LED source to a power supply and/or interconnecting with other LED sources 32. Encapsulation layer may include phosphor particles and also forms a light emitting aperture of LED source 32. In other words, light emanated by LED chip 52 is converted/scattered by encapsulation layer 54 and emitted from the entire area of layer 54.

LED source 32 may also have a layer of a highly reflective material disposed on the back of encapsulation layer 54. Such layer of highly reflective material may be configured to recycle light trapped by the material of encapsulation layer 54 and to result in extracting at least a portion of the trapped light from the encapsulation layer.

The light emitting area of LED source 32 defines a light emitting aperture 60 of the source. Light emitting aperture 60 has a width $W_s$ and a height $H_s$ which may be approximately equal to or smaller than the respective dimensions of substrate 56. On the other hand, light emitting aperture 60 may have dimensions substantially greater than those of LED chip 52.

Light emitting aperture 60 of LED source 32 may be defined differently depending on the design of the respective LED package. Some LED designs include a cavity that contains one or more LED chips. Such cavity is commonly made from or covered by a highly reflective material. Accordingly, for such designs, light emitting aperture 60 may be defined by an area of such reflective cavity. In other words, according to at least some embodiments, light emitting aperture 60 of LED source 32 may be defined as an area of such LED source that actually emits light.

Figure 5:
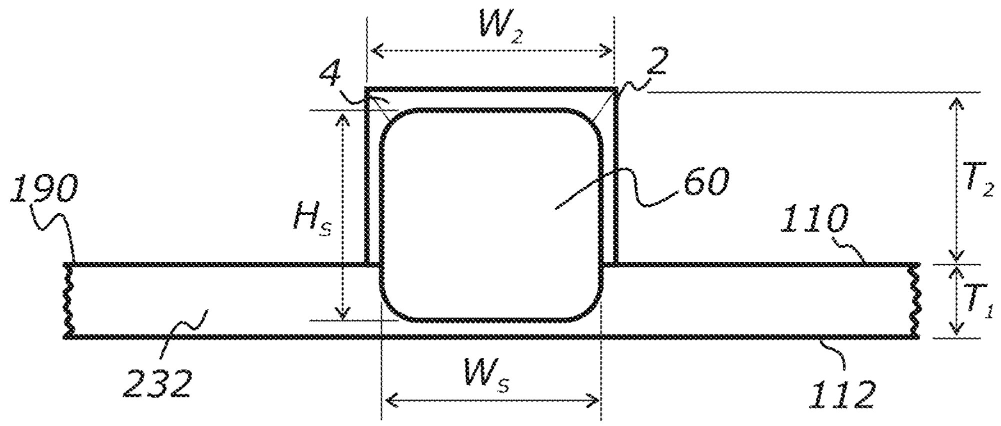
FIG. 5 is a schematic front view of a face-lit waveguide illumination system portion, illustrating relationships between dimensions of a light coupling element, a waveguiding substrate, and an LED light source, according to at least one embodiment of the present invention.

FIG. 5 schematically illustrates exemplary dimensioning of light coupling element 2 relatively to the thickness of waveguiding substrate 190 and dimensions of light emitting aperture 60 of LED source 32.

According to an embodiment illustrated in FIG. 5, LED source 32 may be positioned so that its light emitting aperture 60 partially covers light input face 4 of light coupling element 2 and further partially covers an area of side surface 232 of waveguiding substrate 190. In this case, light emitted by LED sources 32 via light emitting aperture 60 can be injected into waveguiding substrate 190 through light coupling element 2 and surface 232. In this case, surface 232 should be configured for a generally unimpeded light transmission and may be provided with a smooth, highly polished surface finish. According to one embodiment, a thickness of waveguiding substrate 190 may be less than at least one of the dimensions defining light emitting aperture 60.

Light coupling element 2 should be sized appropriately to accommodate the light emitting aperture 60. At the same time, width $W_2$ of light coupling element 2 should be low enough to minimize etendue and provide for an efficient light injection onto waveguiding substrate 190.

Width $W_2$ of light coupling element 2 should normally be at least equal to or greater than width $W_s$ of light emitting aperture 60. According to one embodiment, $0.5 < W_s/W_2 < 1$.

According to one embodiment, $0.75<W_s/W_2<1$. According to one embodiment, $0.9<W_s/W_2<1$.

According to one embodiment, dimensions of waveguiding substrate 190, light coupling element 2 and light emitting aperture 60 of LED source 32 are bounded by the following relationship: $0.5<H_s/(T_1+T_2)<1$. According to one embodiment, $0.75<H_s/(T_1+T_2)<1$. According to one embodiment, $0.9<H_s/(T_1+T_2)<1$.

In other words, it may be advantageous to provide a relatively small size gap or cushion between the width and height dimensions of light emitting aperture 60 and the respective dimensions of light coupling element 2, while taking into account the thickness of waveguiding substrate 190. It is generally preferred that such size gap or cushion is anywhere between $1/10^{th}$ to ½ of the size of light emitting aperture 60. For example, for a 3-mm round or square light emitting aperture 60 and 1-mm thickness of waveguiding substrate, light coupling element may be sized at $T_2 \approx 2.3$-3.5 mm and $W_2 \approx 3.3$-4.5 mm.

When it is desired to accommodate more relaxed manufacturing tolerances and/or less accurate positioning of LED sources 32 with respect to the edge of waveguiding substrate 190 and light coupling elements 2, a larger size gap or cushion may be provided, e.g., up to 1-2 times the size of light emitting aperture 60.

It was found that increasing the length of elongated light coupling element 2 generally increases the efficiency of light injection into waveguiding substrate 190. On the other hand, it was also found that allowing too small spacing between light coupling elements 2 may be detrimental for light coupling efficiency. Particularly, too close positioning of light coupling elements 2 relatively to each other and edges 226 and 228 may result in a re-entry of injected light into adjacent elements 2 and premature decoupling of the injected light from waveguiding substrate 190.

Accordingly, it may be preferred that spacing $S_1$ is not less than a certain minimum spacing $S_{min}$ which can be defined in view of the geometry of injected light propagation in waveguiding substrate 190 and the dimensions of light coupling elements 2. The divergence of light beam emitted by LED sources 32 should also be accounted for when selecting spacing $S_1$. Particularly, it may be preferred that such spacing is sufficient to generally prevent or minimize interference between the adjacent light coupling elements 2. For example, in some embodiments, it may be preferred that light injected into waveguiding substrate 190 through one light coupling element 2 does not enter into another one light coupling element 2, or at least the amount of such light is minimized, since it may cause premature decoupling of a portion of injected light and resulting loss of illumination efficiency.

The selection of appropriate relationships between the length and spacing of elongated light coupling elements 2 is further discussed below in reference to FIG. 6.

A fan of rays 500 exemplifies a light beam emitted by LED sources 32 and injected into waveguiding substrate 190 through surface 110 using light coupling elements 2. Angle Ω represents an angle between the uttermost rays in fan of rays 500 and defines the overall angular span of said fan of rays (as indicated by lines 444 and 446).

Spacing $S_1$ between light coupling elements 2 is selected such that the uttermost rays of fan of rays 500 that are injected into waveguiding substrate 190 in a vicinity of light input face 4 could freely propagate in waveguide 190 past the adjacent light coupling elements 2. It can be shown that such condition can be met when $S_1 \geq L \tan((\Omega/2)$.

According to one embodiment, angle Ω can be defined based on a Full Width Half Maximum (FWHM) angle of LED sources 32 as follows: $\sin\Omega=\sin(\mathrm{FWHM}/2)/n$, where n is a refractive index of the material of waveguiding substrate 190. For example, when FWHM of LED sources 32 is 120°, L=10 mm, and the material of waveguide 190 is PMMA ($n \approx 1.49$), angle Ω will be around 71.1° so that spacing $S_1$ may be allowed to be greater or equal to approximately 7 mm (0.7 minimum spacing to length ratio). For a 90° FWHM of LED sources 32, $S_1$ could be greater or equal to approximately 6 mm (0.6 minimum spacing to length ratio). When LED sources 32 are provided with collimating optics (such as a refractive lens, TIR lens, or a concave reflector) which further narrows FWHM of the beam that is input into light input face 92, the minimum spacing $S_{min}$ can be further decreased allowing for a denser packing of light coupling elements 2 and LED sources 32 along edge 222 of waveguiding substrate 190. According to one embodiment, the $S_1/L$ ratio is at least 0.6 or more. According to one embodiment, the $S_1/L$ ratio is at least 0.75 or more. According to one embodiment, spacing $S_1$ is approximately equal to or greater than length L.

According to one embodiment, angle Ω may be defined based on the full emission angle of LED sources 32 to avoid any light loss due to the secondary interactions of the injected light rays with light coupling elements 2. Accordingly, if each LED source 32 emits light into a full hemisphere (180° beam angle), angle Ω can be related to the refractive index n of waveguiding substrate 190 as follows: $\sin \Omega/2=1/n$. For example, angle Ω could be 77°-78° for polycarbonate waveguide 190 ($n \approx 1.59$) and approximately 84° for acrylic (PMMA) waveguide 190, respectively.

According to at least some embodiments, system 900 employing a densely packed array of light coupling elements 2 may be allowed to reject some of the peripheral rays propagating at angles with respect to the optical axis that are greater than a predetermined cutoff angle. This can be useful, for example, for maximizing the density of light coupling elements 2 (and LEDs 32), even at the expense of some light loss. Such light loss may occur, for example, due to decoupling from waveguiding substrate 190 troughs the tapered tips of light coupling elements 2.

Nevertheless, despite the potential light loss due to decoupling, such configurations may be advantageously selected for maximizing the light input into waveguiding substrate 190 by adding more LEDs compared to the case where light coupling elements 2 are distributed over surface 110 with lower density. According to one embodiment, $S_1 \geq 0.5L \tan(\Omega/2)$. According to one embodiment, $S_1 \geq 0.75L \tan(\Omega/2)$. According to one embodiment, $S_1 \geq 0.8L \tan(\Omega/2)$. According to one embodiment, $S_1 \geq 0.9L \tan(\Omega/2)$. According to one embodiment, $S_1 \geq 0.95L \tan(\Omega/2)$.

Figure 6:
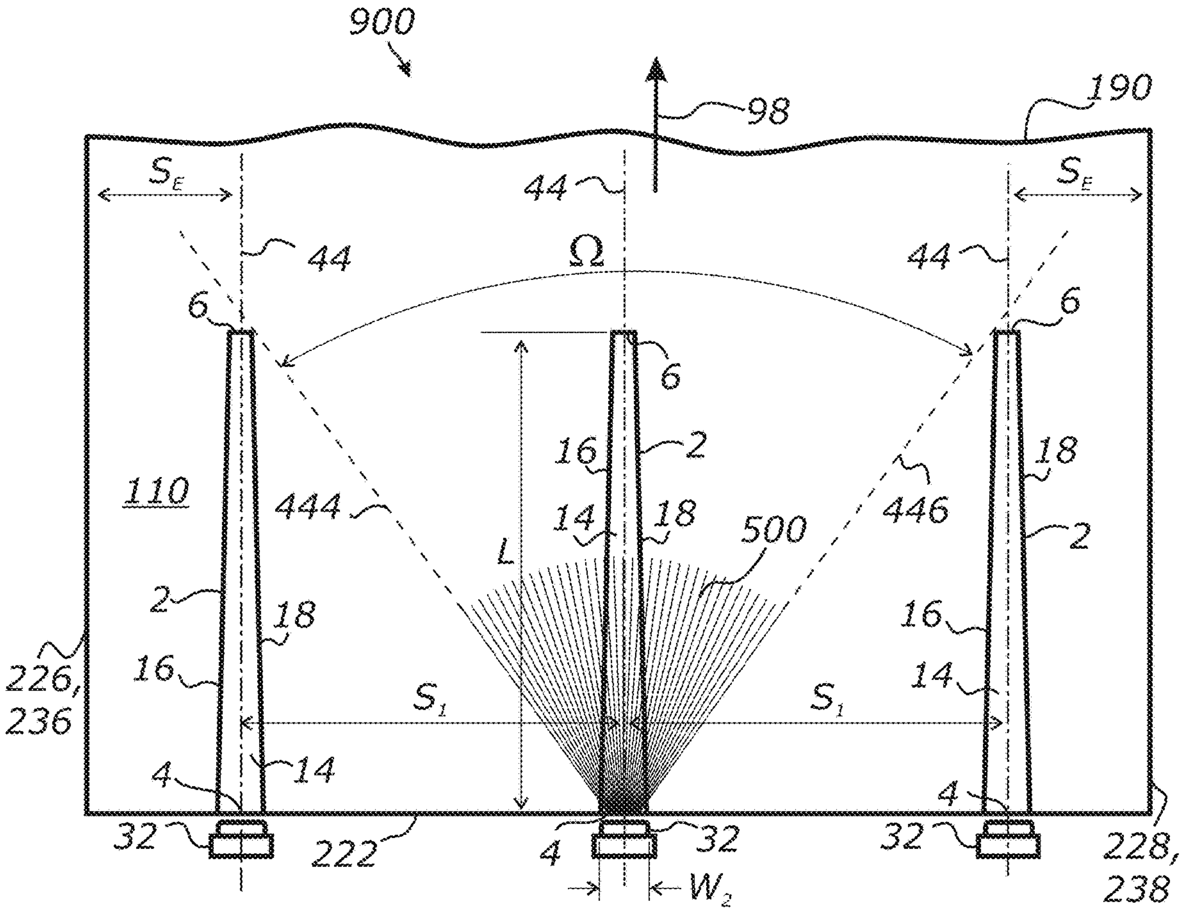
FIG. 6 is a schematic plan view of a face-lit waveguide illumination system portion, illustrating relationships between length and spacing of elongated optical elements attached to a major surface of a planar waveguide, according to at least one embodiment of the present invention.

Referring further to FIG. 6, a spacing distance $S_E$ between outermost light coupling elements 2 of the array and respective edges 226 and/or 228 of waveguiding substrate 190 should generally be equal to or greater than half the spacing $S_1$, which can be described by the following relationship: $S_E \geq S_1/2$. Such spacing of light coupling elements 2 from the edges may help prevent or minimize re-entering of light rays reflected from the respective side faces 236 and 238 into the same optical elements which, in turn, may result in premature decoupling of such rays from waveguiding substrate 190.

It is noted, that by using collimating optics in conjunction with LED sources 32, the beam divergence may be reduced even further due to the narrower effective FWHM of the light source.

By providing a highly collimated beam, spacing distance $S_1$ and $S_E$ may be reduced considerably even further without notable light loss due to decoupling. Furthermore, it is noted that spacing distances $S_1$ and $S_E$ may also be advantageously reduced when the contribution of the peripheral rays in ray bundle 500 into its total energy is relatively small. This may be the case, for example, for light beams that have a sharp on-axis intensity peak and relatively low intensities at high angles from the optical axis.

A highly collimated light beam may be provided by a refractive or reflective collimating optical element which size is substantially greater than the size of light emitting aperture 60 of LED source 32. Alternatively, a laser source may be used in place of LED source 32. Such collimated laser beam may also be directed into individual light coupling element 2 at an angle with respect to a normal to light input face 4 or at an angle with respect to longitudinal axis 44 of the respective light coupling element. According to one embodiment, such angle may be in the range between 0° and 45°.

According to one embodiment, the $S_1/L$ ratio is at least 0.35. According to one embodiment, the $S_1/L$ ratio is at least 0.4. According to one embodiment, the $S_1/L$ ratio is at least 0.45. According to one embodiment, the $S_1/L$ ratio is at least 0.5. According to one embodiment, the $S_1/L$ ratio is at least 0.55.

Various embodiments of system 900 may employ elongated light coupling elements 2 that have specific proportions between length L and width $W_2$ or thickness $T_2$. According to one embodiment, length L of rod-shaped light coupling elements 2 is at least 3 times greater than each of the other two orthogonal dimensions (e.g., width $W_2$ and thickness $T_2$). According to one embodiment, length L is at least 5 times greater than each of the other two orthogonal dimensions. According to one embodiment, length L is at least 6 times greater than width $W_2$ and thickness $T_2$. According to one embodiment, length L is at least 8 times greater than width $W_2$ and thickness $T_2$. According to one embodiment, length L is at least 10 times greater than width $W_2$ and thickness $T_2$.

It may be appreciated that the configuration of face-lit waveguide illumination system 900 described in reference to FIG. 6 may allow for employing extremely thin waveguides that have much lower thicknesses than the dimensions of light sources. Examples of applications that may benefit from such feature of system 2 include but are not limited to electronic display devices such as those used in mobile communication devices (e.g., smartphones), computer screens, television screens, advertising/information panels and displays, and the like. For example, waveguiding substrate 190 may be incorporated into a backlight unit (BLU) of an ultra-thin, large-area LCD display.

In one embodiment, system 900 may be configured to include waveguiding substrate 190 with thickness $T_1$ of less than 100 micrometers. It can be shown that, even if light emitting aperture 60 of LED sources 32 is 250-300 micrometers in height $H_S$ ($H_S/T_1$ ratio of 2.5-3), system 900 can be configured to inject more than 50% of light from the LEDs into the waveguiding substrate 190.

According to different embodiments, the thickness of waveguiding substrate 190 is at least 1.5 times, 2 times, 3 times, or 5 times less than a smallest dimension of light emitting aperture 60 of LED source 32. According to one embodiment, the thickness of waveguiding substrate 190 is approximately 10 times less than a smallest dimension of light emitting aperture 60.

A number of applications exist where it would be desirable to input a large amount of light into thin light guiding substrates using light sources that have sizes considerably larger than the substrate thickness. However, in traditional edge-lit systems, the efficiency of light coupling drops sharply when the size of a light source becomes greater than the substrate thickness. For example, is LED source 32 has height $H_S$ that is greater than thickness $T_1$ of waveguiding substrate 190 and if no light coupling element 2 is used, it can be shown that than efficiency E of light coupling into the substrate is proportional to a ratio of $T_1/H_S$. Such relationship may also be written in the following form: $E=E_0T_1/H_S$, where $E_0$ is a reference efficiency of light coupling through edge 222 when $T_1 \geq H_S$. In an exemplary case when $E_0$=90%, $T_1$=0.5 mm and $H_S$=3 mm, light coupling efficiency E of the edge-lit system is only about 15%. Thus, edge coupling is very inefficient for the cases when the source dimensions are greater than the thickness of the waveguiding substrate.

At the same time, it can be shown that, when light is injected into waveguiding substrate 190 using, for example, double-tapered light coupling element 2 having a 3-mm square entrance aperture ($T_2=W_2$=3 mm), more than half of light energy emitted by the 3-mm LED can be coupled into the waveguide (light coupling efficiency E of above 50%) even when no light enters any edges of waveguiding substrate 190. It can be shown that, when light coupling element 2 is mounted flush with edge 222 (surface 232) of waveguiding substrate 190 (FIG. 6) and both edge 222 and face 4 are configured for light input, even higher coupling efficiencies may be achieved.

Thus, light coupling element 2 of this invention can be adapted for such applications to inject more light into thin substrates than it would otherwise be possible by inputting light through an edge of the substrate or using other types of light coupling optics. According to one embodiment, waveguide illumination system 900 is configured to include LED sources 32 with height $H_S$ of respective apertures 60 of at least two times greater than thickness $T_1$ of waveguiding substrate 190 and light coupling element 2 is configured to couple more than 50% of light emitted by LED sources 32, more preferably to couple more than 60% of such light into waveguiding substrate 190, even more preferably to couple more than 65% of such light, and even more preferably to couple more than 70% of such light.

According to one embodiment, face-lit waveguide illumination system 900 is configured such that $E/E_0>T_1/H_S$, more preferably $E/E_0>1.5T_1/H_S$, even more preferably $E/E_0>2T_1/H_S$, and even more preferably $E/E_0>2.5T_1/H_S$.

Figure 7:
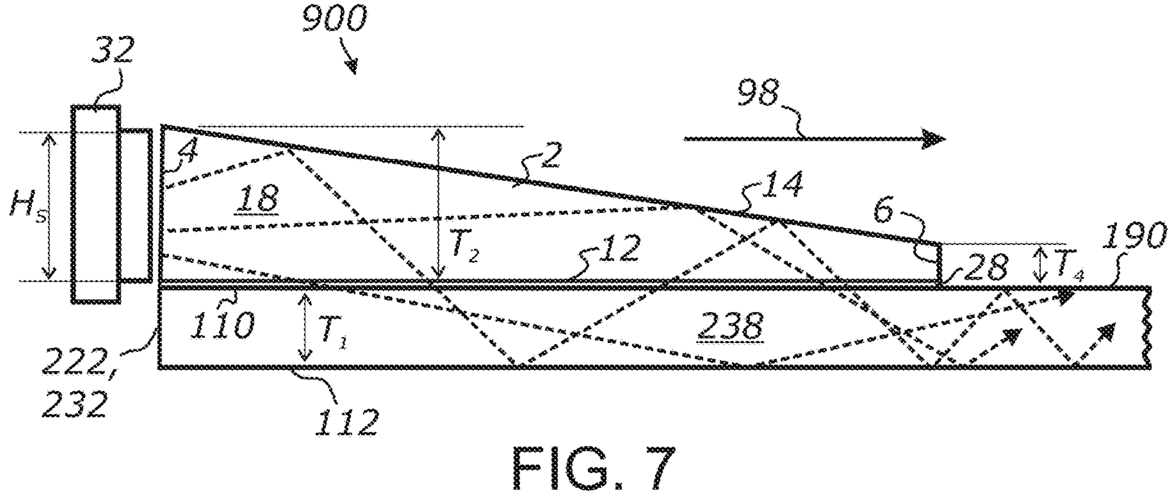
FIG. 7 is a schematic longitudinal section view a face-lit waveguide illumination system portion, showing an LED light source coupled to a light input face of a light coupling element, according to at least one embodiment of the present invention.

FIG. 7 schematically illustrates an exemplary configuration of face-lit illumination system 900 in which substantially all of the light is input into face 4 of light coupling element 2 and substantially no light is input into surface 232 of waveguiding substrate 190. Light coupling element 2 is formed by an irregular, oblique pyramid which is also truncated at its narrower end. Light coupling element 2 is sized such that $T_2 \approx H_S$. The shape and/or size of light input face 4 may be selected to approximate the respective shape and/or size of LED source 32 or its light emitting aperture 60.

FIG. 7 also shows a layer 28 of index-matched optical adhesive used for bonding light coupling element 2 to surface 110 of waveguiding substrate 190 and for providing a good optical contact between face 12 and surface 110.

Figure 8:
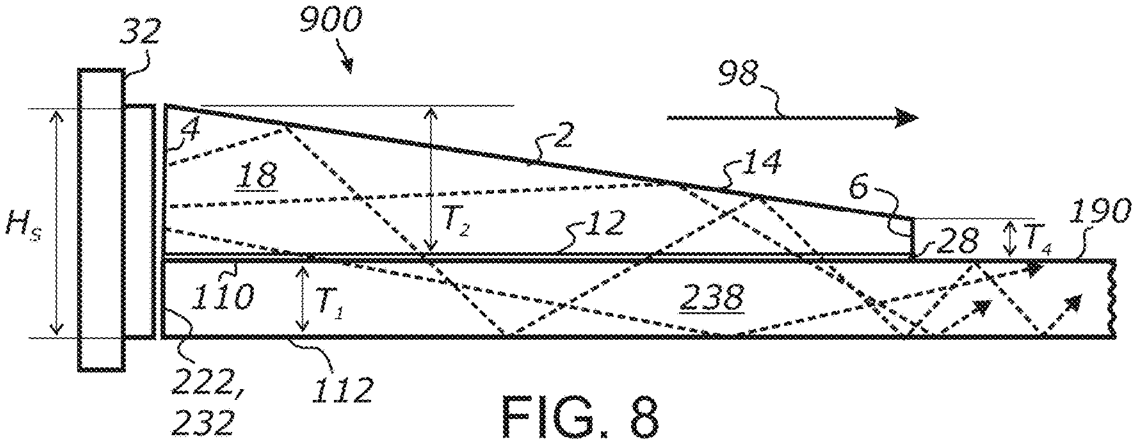
FIG. 8 is a schematic longitudinal section view a face-lit waveguide illumination system portion, showing an LED light source coupled to a light input face of a light coupling element and to a light input edge of a waveguiding substrate, according to at least one embodiment of the present invention.

FIG. 8 schematically illustrates an exemplary configuration of face-lit illumination system 900 in which light is input into both light input face 4 of light coupling element 2 and light input side surface 232 of waveguiding substrate 190. Light coupling element 2 is sized such that $T_1+T_2 \approx H_S$. The shape and size of light input face 4 may be selected such that the area formed by such light input face and a portion of edge surface 232 below the light coupling element 2 approximates light emitting aperture 60 of LED source 32.

Figure 9A:
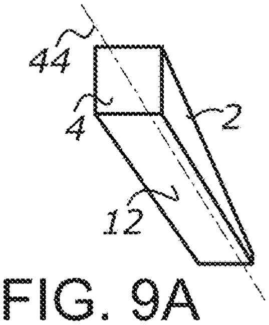
FIG. 9A through FIG. 9H illustrate various exemplary configurations of an elongated light coupling element, showing different shapes of a light input face, according to at least some embodiments of the present invention.
Figure 9B:
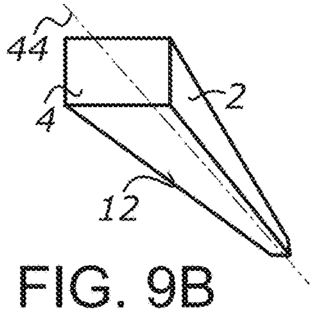
Figure 9C:
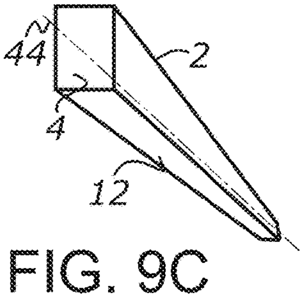

FIG. 9A through FIG. 9H illustrate various exemplary configurations of light coupling element 2. FIG. 9A particularly shows light coupling element 2 shaped in the form of a rod having a square cross-section and a taper in a plane perpendicular to bottom face 12. In FIG. 9B, light coupling element 2 has the shape of an irregular, double-tapered truncated pyramid having rectangular light input face 4 with a longer dimension being parallel to bottom face 12. In FIG. 9C, light coupling element 2 has the shape of an oblique, double-tapered truncated pyramid having rectangular light input face 4 with a longer dimension being perpendicular to bottom face 12.

Figure 9D:
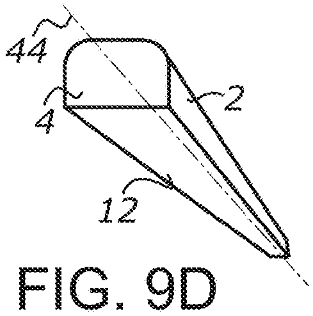
Figure 9E:
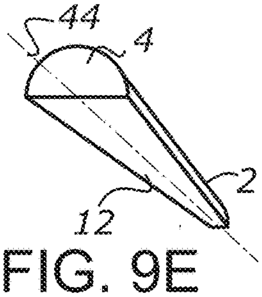

FIG. 9D shows light input face 4 of light coupling element 2 having a generally rectangular form with two rounded corners located on a side opposite to the intersection of light input face 4 with bottom surface 12. FIG. 9E, shows light coupling element 2 having the form of a half-round double-tapered rod or bar with a top longitudinal surface having an arc-shaped transversal cross-section.

Figure 9F:
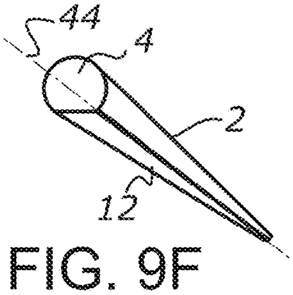
Figure 9G:
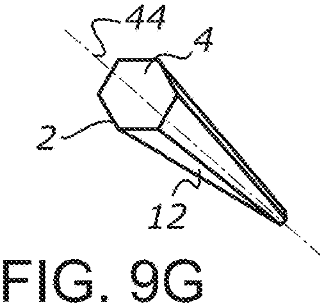
Figure 9H:
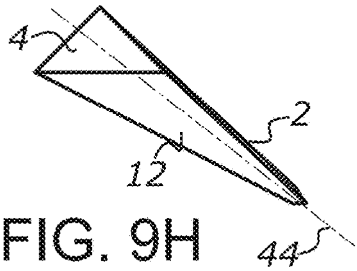

In FIG. 9F, light coupling element 2 is formed by a portion of a generally round, cylindrically tapered rod where said rod has a planar longitudinal surface portion which is configured as bottom face 12 attachable to planar surfaces. Light coupling element 2 having a hexagonal configuration is shown in FIG. 9G. In FIG. 9H, light coupling element 2 is formed by a highly elongated, triangular prism. By way of examples and not limitations, the respective transversal cross-section may have the shape of a right-angle isosceles triangle or an equilateral triangle. However, it should be understood that such cross-section may be represented by any other type of triangle.

It is further noted that possible variations of the shapes and transversal cross-sections of light coupling element 2 are not limited to the shapes illustrated in FIG. 9A through FIG. 9H or other preceding drawings. The cross-sectional shapes of light coupling element 2 may be formed by other common two-dimensional shapes, including but not limited to pentagons, octagons, trapezoids, circles, circular segments or sectors, ovals, or any combination thereof.

Figure 10:
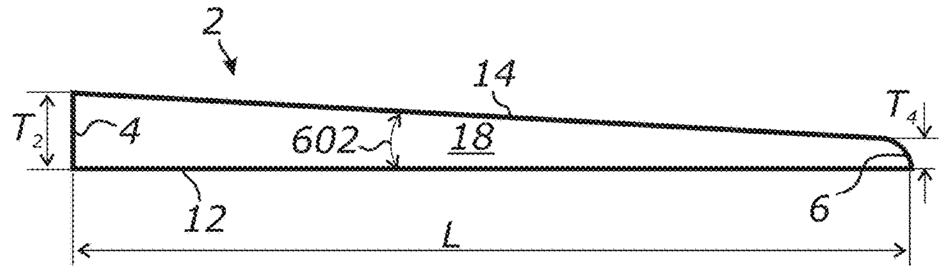
FIG. 10 is a schematic side view of a tapered light coupling optical element having a curved surface of a terminal end, according to at least one embodiment of the present invention.
Figure 11:
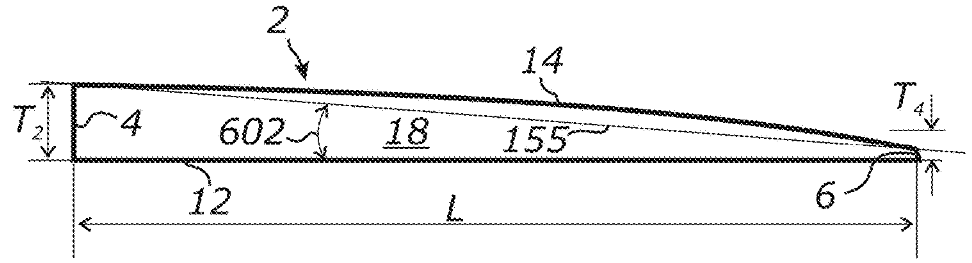
FIG. 11 is a schematic side view of a tapered light coupling optical element having a curved top surface, according to at least one embodiment of the present invention.

FIG. 10 schematically shows light coupling element 2 which end face 6 has a convex curved shape and is also disposed at an angle with respect to face 12. FIG. 11 schematically shows an embodiment of light coupling element 2 having curved face 14 such that the angle between faces 12 and 14 gradually increases along the intended light propagation path in the light coupling element. For such a case, taper angle 602 may be defined as an average taper angle defined by faces 12 and 14 or as an angle between face 12 and a line 155 which connect top portions of the respective faces 4 and 6.

Table 1 below shows, by way of example, that rod-shaped light coupling elements 2 of the present invention allow for coupling more light form a 3-mm LED having a 2.8 mm by 2.8 mm square light emitting aperture into a thin ($T_1$=0.5 mm) waveguiding substrate 190 through its face (e.g., major broad-area surface 110) in comparison to a reference case of coupling light through an edge of such substrate. The data of Table 1 have been calculated using raytracing of 10,000 rays evenly distributed over the light emitting aperture and having a full-hemisphere Lambertian angular distribution pattern of the emitted beam.

For edge coupling (without light coupling elements 2), the light emitting aperture of LED source 32 was centered with respect to the light input edge and disposed at a distance of 0.1 mm from edge 222. For face coupling using light coupling element 2, the light emitting aperture of LED source 32 was centered with respect to the light input face 4 of element 2 and disposed at a distance of 0.1 mm from such face.

Sample 1 represents a case where light coupling element 2 is shaped as a parallel-wall rectangular rod or bar having the following parameters: L=40 mm, $T_2=T_4=W_2=W_4$=3 mm. Sample 2 represents light coupling element 2 having the shape of a double-tapered rectangular rod with the following parameters: L=40 mm, $T_2=W_2$=3 mm, and $T_4=W_4$=1 mm. Sample 3 represents light coupling element 2 having the shape of a double-tapered rod with the following parameters: L=40 mm, $T_2$=2.55 mm, $W_2$=3 mm, $T_4$=0.85 mm, and $W_2$=1 mm.

The cases of Sample 1 and Sample 2 correspond to light coupling elements 2 being attached to a face of waveguiding substrate 190 and with no light entering of waveguiding substrate 190 through its edges (FIG. 7). The case of Sample 3 corresponds to light coupling elements 2 being attached to a face of waveguiding substrate 190 flush with edge 222 of the waveguide so that light enter waveguide 190 both through elements 2 and light input face 232 (FIG. 8). The materials for waveguiding substrate 190 and light coupling elements 2 are both acrylic (PMMA) with n=1.49.

TABLE 1

| Performance Parameter | Edge coupling (ref. case) | Face coupling: Sample #1 | Face coupling: Sample #2 | Face coupling: Sample #3 |
|---|---|---|---|---|
| Number of rays coupled into waveguiding substrate | 1644 | 5361 | 6351 | 6830 |
| Percentage of coupled vs emitted rays | 16% | 54% | 64% | 68% |
| Relative improvement | 1× | 3.3× | 3.9× | 4.2× |

As it can be seen, coupling light from a 3-mm light source into 0.5-mm film-thickness waveguiding substrate 190 can be significantly improved using rod-shaped light coupling elements 2 attached to a major surface of the substrate. More specifically, depending on the configuration of light coupling elements 2, the improvements are 3.3 to 4.2 times compared to the reference case, reaching the coupling efficiency of 68% despite the dimensions of LED's light emitting aperture are nearly six times greater than the thickness of waveguiding substrate 190.

Figure 12:
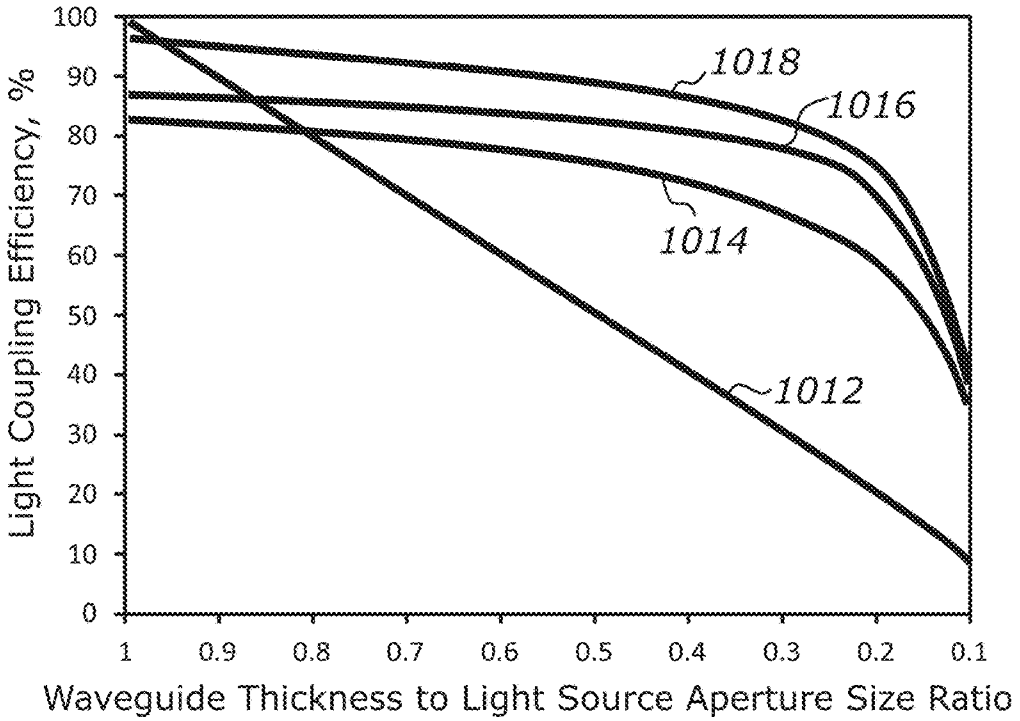
FIG. 12 is a graph showing calculated exemplary dependencies of light coupling efficiency from a ratio between a waveguiding substrate thickness and the size of a light emitting aperture of a light source, according to at least some embodiments of the present invention.

FIG. 12 shows calculated dependencies of light coupling efficiency from the ratio between the thickness of waveguiding substrate 190 and the size of light emitting aperture of LEDs 32 utilized for light input. A line 1012 corresponds to the reference case of light coupling through an edge of waveguiding substrate 190. Lines 1014, 1016 and 1018 correspond to the above Samples #1, #2 and #3, respectively.

Figure 13:
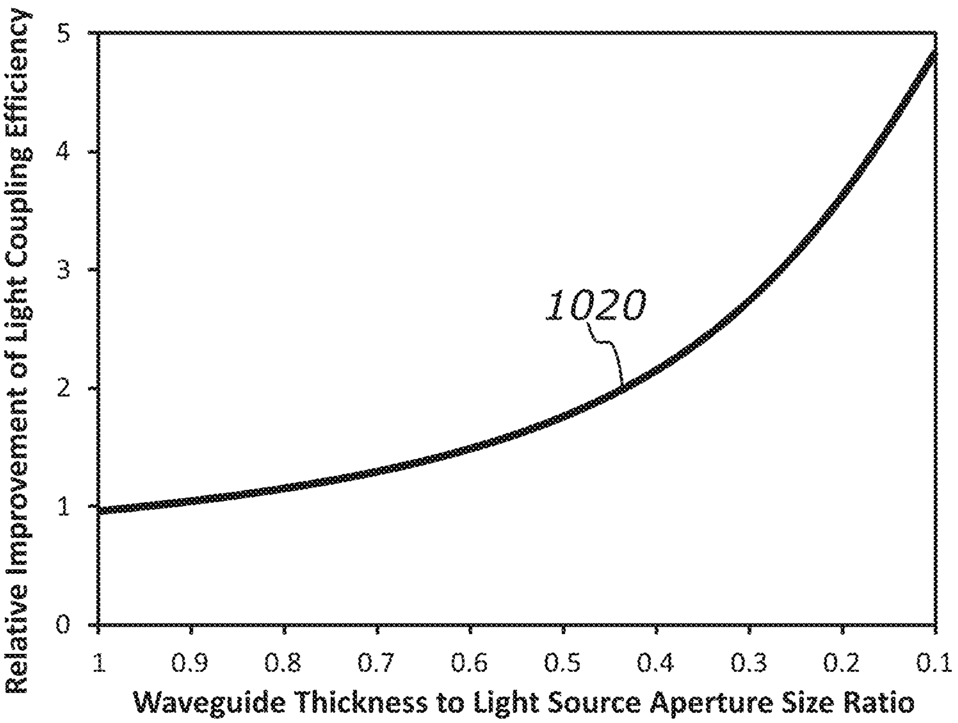
FIG. 13 is a graph showing a calculated exemplary dependency of light coupling efficiency improvement from a ratio between a waveguiding substrate thickness and the size of a light emitting aperture of a light source, according to at least one embodiment of the present invention.

FIG. 13 shows calculated dependence of the relative improvement in light coupling efficiency from the ratio between the waveguiding substrate thickness and the size of light emitting aperture of LEDs 32 for the case of Sample #3 above. The relative improvement was found to increase with the reduction of the waveguide thickness.

The graphs of FIG. 12 and FIG. 13 further illustrate that light coupling elements 2 can be effectively used for a wide range of thicknesses of waveguiding substrate 190 even without the need of adapting the substrate for a specific size of the light emitting aperture of a light source. It is noted however, that the above exemplified configurations and relative dimensions of light coupling elements 2, waveguiding substrate 190 and LED sources 32 have been described for illustrative purposes only and should not be limiting this invention in any way. The respective parameters may be varied in a broad range and optimized for specific cases and applications. For example, length L, taper angles 602 and 604 (if any), thicknesses T2 and T4 and widths W1 and W2, as applicable, can be adjusted for each specific ratio between the size of LEDs 32 and the thickness of waveguiding substrate 190 as well as for the specific types of the materials used for the substrate190 and light coupling elements 2.

For example, light coupling elements 2 having a thickness at its base (or height T2 of face 4 above waveguiding substrate 190) of 1-3 mm could be used to efficiently inject light into an optically transmissive film that has 0.1-0.5 mm thickness. At the height parameter T2 of light coupling elements 2 of 0.3-1 mm, light can be efficiently injected into waveguiding substrates that have thicknesses between 0.03 mm and 0.1 mm.

Figure 14:
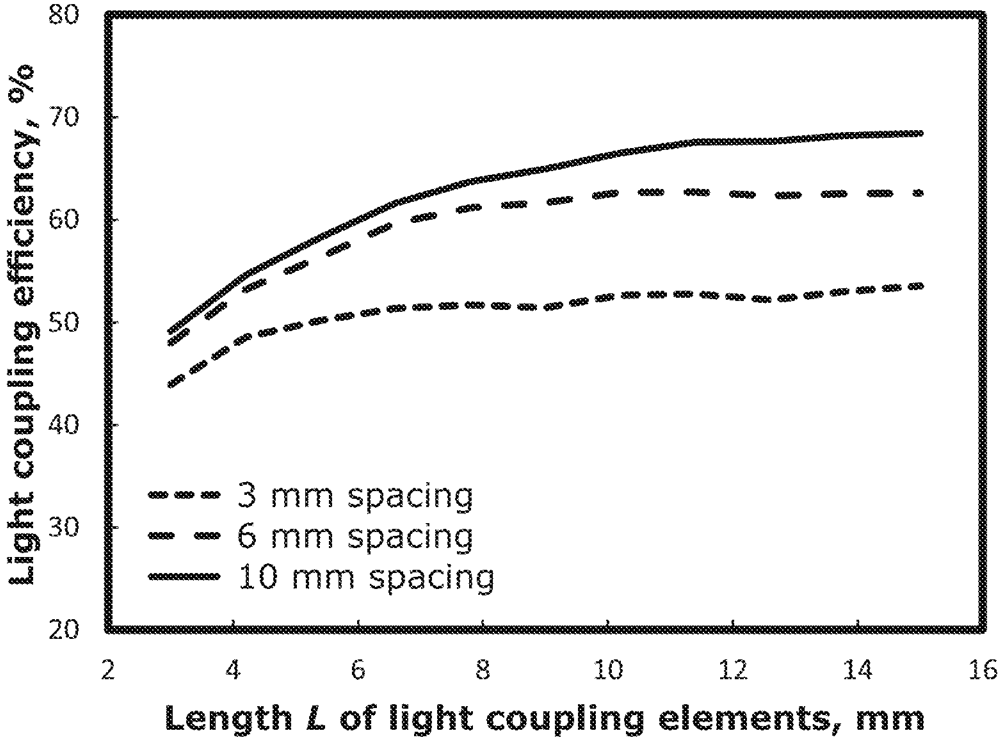
FIG. 14 is a graph showing calculated exemplary dependencies of light coupling efficiency from a length of light coupling elements for different spacing distances between light coupling elements, according to at least some embodiments of the present invention.

FIG. 14 shows calculated dependencies of light coupling efficiency E from length L of double-tapered light coupling elements 2 for a 1-mm square light emitting aperture of LED sources 32. Light emitted by LED sources 32 was considered injected into 0.25-mm waveguiding substrate 190 through both light coupling elements 2 and edge 222 (e.g., as illustrated in FIG. 8). Such dependencies are shown for various spacing S1 between individual elements 2 (and, hence, the spacing between centers of light emitting apertures 60 of LED sources 32) in a linear array of such elements. In this exemplary case, a combined light receiving aperture of individual light coupling elements 2 and respective portions of waveguiding substrate 190 was set to be equal to the size of the light emitting aperture of individual LED sources 32 (T1+T2=HS, and W2=Ws).

Since in the illustrated case, light coupling efficiency E for injecting light into waveguiding substrate 190 through any of its edges, with the absence of light coupling elements 2, would have been limited to only 25%. At the same time, the graph of FIG. 14 shows that injecting light into the substrate using light coupling elements 2 is capable of increasing the light coupling efficiency E up to about 70%, which corresponds to a 2.8× efficiency improvement. Even for a high-density array of LEDs (3 mm spacing), the improvement in efficiency E is about 2 times compared to the edge coupling. It may be appreciated that improved light coupling efficiency E should generally lead to increased brightness of light emitting area 200 since generally more light will be propagating in waveguiding substrate 190. Accordingly, various embodiments of the present invention may include configurations of face-lit waveguide illumination system 900 in which an average brightness of light emitting area 200 is at least 1.5 times, at least 2 times, and at least 2.5 times greater than the brightness of the same area in a reference case where light emitted by LED sources 32 is input only through an edge of waveguiding substrate 190.

As it can be further seen from FIG. 14, light coupling efficiency E generally grows with the increase of length L. On the other hand, for a relatively large spacing S1 of 10 mm (solid line), the rate of such growth drops considerably above lengths L of 8-10 mm (which corresponds to L/HS ratios of 8-10). For spacing S1 of 6 mm, the efficiency curve nearly reaches a saturation when length L approaches 8 mm. For spacing S1 of 3 mm, such saturation is nearly reached at length L of about 4 mm. Accordingly, it is shown that increasing length L of light coupling elements beyond a certain maximum length Lmax brings increasingly diminishing returns in terms of light coupling efficiency. This may allow for selecting an optimal length of the light coupling elements 2 to save the material costs and area of waveguiding substrate 190 that must be provided for such light coupling elements. The above example also shows that maximum length Lmax or optimum length of light coupling elements 2 may be determined at least based on spacing S1 between such elements.

The examples above illustrate that injecting light into thin substrates with high efficiency generally requires length L of light coupling elements 2 being substantially greater than the other two dimensions of such elements. Furthermore, light coupling elements 2 having a one-dimensional or two-dimensional taper have shown a generally higher efficiency compared to parallel-wall (non-tapered) light coupling elements 2. It was found that light coupling elements 2 can be further optimized by adjusting the taper angles, tilting an optical axis of the light source, with the shapes of light input face 4 and optionally the longitudinal faces 14, 16, and 18 may be optimized (e.g., curved) to even further enhance the light coupling efficiency.

Since properly designed light coupling elements 2 can be very efficient for injecting light through a face of waveguiding substrate 190, they can be used for light coupling at any locations of the substrate's surface. FIG. 15 schematically illustrates an embodiment of face-lit waveguide illumination system 900 in which light coupling element 2 is attached to broad-area surface 110 at a distance from all edges defining waveguiding substrate 190 (including edge 222). Such embodiment may be advantageously selected, for example, for the cases where edges of the waveguiding substrate are not easily accessible or for the cases where it is desired to inject light into the substrate at different locations of its area. The distance between edges of waveguiding substrate 190 to individual light coupling elements 2 may be selected based on the application. For example, one or more light coupling elements 2 may be positioned near an edge of waveguiding substrate 190. In another example, the distance between light coupling elements 2 and an edge of waveguiding substrate 190 may be considerable, also including a case where one or more light coupling elements 2 is positioned in the middle of the substrate.

FIG. 16 illustrates an embodiment of a flexible face-lit waveguide illumination system 900 employing a flexible waveguiding substrate exemplified by film 290 that is formed from a highly transmissive optical material such as, for example, PMMA, PC, or PET. An advantage of using film-thickness waveguide substrate can be a lower cost compared to thick, rigid substrates and that it can be rolled or more easily formed into complex shapes. One or more tapered light coupling elements 2 are attached to a broad-area surface of flexible film 290 at a distance from edges of the film. Film 290 may be further provided with light extraction features distributed along its surface or embedded into the bulk of its material. Alternatively, light extraction features may be provided in select areas of film 290. Such select areas may have any suitable shapes and may also include symbols, indicia, patterns or images.

Light coupling elements 2 and respective LED sources 32 may also be distributed across the surface of film 290 according to any ordered or random pattern, which may include one-dimensional or two-dimensional arrays or patterns. FIG. 17 schematically shows an exemplary embodiment of flexible face-lit waveguide illumination system 900 in which light coupling elements 2 and LED sources 32 form a two-dimensional array distributed over the film surface. LED sources 32 and elements 2 are grouped pairwise to create individual light emitting/coupling structures.

One group of light coupling elements 2 is attached to the surface near one of the edges of the light guiding film and another linear array of such elements is attached to the surface near an opposing edge. Light coupling elements 2 of the opposing edges are facing towards each other so that when their light input faces are illuminated by the respective LED sources 32, light is injected and propagated towards a central portion of film 290. At least the central portion or the entire area of film 290 between light coupling elements 2 may include light extracting elements for emitting light from the respective area of the film.

Film 290 may be configured for two-sided light emission and may also be made visually transparent at normal viewing angles when in non-illuminated state. Alternatively, one side of film 290 may be provided with a reflective layer so that substantially all of the light is emitted from an opposing surface of the film.

Such flexible, light emitting film 290 may bent to any suitable shape, wrapped around objects, or incorporated as a light emitting layer into various illumination devices or optical stacks. For example, film 290 may be used to make thin, flexible lighting panels. In another example, film 290 may be incorporated as a backlight or front light into flexible LCD displays.

It may be appreciated that some optical materials such as glass, for example, are fairly stiff at normal thicknesses (0.5-25 mm) commonly found in various products and devices. However, at thicknesses below 0.1 mm, glass sheets become flexible (can be bent or flexed with relative ease). Accordingly, film 290 may be formed from such low-thickness, flexible glass. According to one embodiment, flexible film 290 is formed from a sheet of glass having a thickness between 30 and 150 micrometers. According to one embodiment, flexible film 290 is formed from a sheet of glass having a thickness between 50 and 100 micrometers.

According to one embodiment of a method of making face-lit waveguide illumination system 900 employing flexible waveguiding film 290 includes selecting a suitable glass material having high optical transparency, receiving information on a range of thicknesses of such glass material at which it becomes flexible, providing a sheet of such material having a thickness within this range, attaching one or more light coupling elements 2 to the sheet, providing one or more light sources, and coupling such sources to said one or more light coupling elements for injecting light into film 290. The method may further include a step of forming a light extraction area in a surface of the glass sheet (such as, for example, light extraction area 200 of FIG. 1) configured to extract light from film 290.

Light coupling elements 2 that are used with flexible waveguiding substrates, such as film 290 of FIG. 17 for example, may also be flexible so that they can be bent to conform to the desired shape of the film. In one embodiment, such flexible light coupling elements 2 may be formed from plasticized PMMA or silicone which refractive index is similar to that of the material of film 290. Furthermore, if film 290 is to be used in a bent or curved shape, light coupling elements 2 may be formed (e.g., injection-molded or cast) with a curvature that approximates the curvature of such shape.

Light coupling elements 2 may also be formed directly in a broad-area surface of waveguiding substrate 190 or film 290 at any suitable location of the surface and can also be disposed at any angles with respect to each other.

FIG. 18 schematically shows an embodiment of face-lit waveguide illumination system 900 employing one or more LED sources 32, one or more light coupling elements 2 attached to planar waveguiding substrate 190, and an opaque housing 400 that is at least partially encasing, surrounding or enclosing light coupling element 2 and may also enclose LED sources 32. Housing 400 may be particularly configured to block stray light rays that may emerge from light coupling element 2 due to decoupling, thus helping to reduce glare and improve overall uniformity of light emitted from system 900. Housing 400 may be made from any suitable material such as plastic, metal, glass, or wood.

According to one embodiment, housing 400 is covering light coupling element 2 from at least one side (e.g., top side). According to one embodiment, housing 400 is covering light coupling element 2 from at least two sides (e.g., top and bottom or top and rear sides). According to one embodiment, housing 400 is covering light coupling element 2 from at least three sides. According to one embodiment, housing 400 is covering light coupling element 2 from at least four sides. According to one embodiment, housing 400 is covering light coupling element 2 from at least five sides. According to one embodiment, housing 400 is covering light coupling element 2 from all six sides (e.g., top, bottom, front, rear, left, and right). At the same time, housing 400 should be designed to provide for a generally unimpeded light passage outwardly from light emitting area 200.

According to one embodiment, at least a part of housing 400 is made from a heat spreading material (preferably a metal such as aluminum) and is disposed in thermal contact with LED sources 32 so that housing 400 could also dissipate heat generated by the LEDs. A portion of heat-dissipating housing 400 may also be configured as a heat sink and may include fins or protrusions to maximize its surface area and enhance heat exchange with the environment.

According to one embodiment, housing 400 is made from a material that at least partially transmits and diffuses light. Such light diffusing housing 400 may be configured to intercept stray light emerging from light coupling element 2 and diffuse such light resulting in a soft glow from the outer area of the housing.

Figure 19:
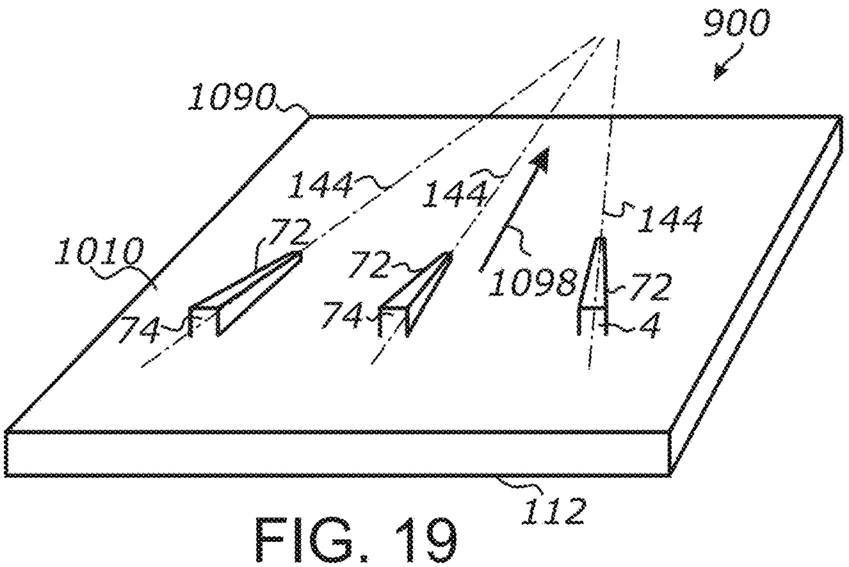
FIG. 19 is a schematic perspective view of a face-lit waveguide illumination system portion, showing a plurality of elongated protrusions or ridges formed in a major surface of a planar waveguide, according to at least one embodiment of the present invention.

FIG. 19 shows an embodiment of face-lit waveguide illumination system 900 in a planar configuration where light coupling optical elements 72 are formed by elongated rod-like protrusions or ridges in a broad-area surface 1010 of a planar waveguide 1090. Such protrusions or ridges may be formed together with the waveguide 1090, for example, by molding from acrylic or polycarbonate material using a negative replica that includes the respective features. The molded structure may be advantageously selected for applications where an extra step of attaching separately-fabricated light coupling optical elements 72 is unwanted.

Each light coupling optical element 72 has the shape of an oblique, tapered pyramid with a base forming a light input face 74 and an opposing tapered end. Such light coupling optical element 72 are configured to receive light on respective light input faces 74 which can be illuminated by various sources including, for example, LEDs or laser sources (not shown).

Referring further to FIG. 19, light coupling optical elements 72 are tilted towards each other so that their longitudinal axes 144 are converging to a common apex point or small area. Accordingly, when illuminated by light sources, light coupling optical elements 72 will inject light into waveguide 1090 and direct the injected light towards converging directions to concentrate the respective light beam on a target located at a distance from the light coupling optical elements. In one embodiment, such target may include a compact light extraction area configured to decouple light from waveguide 1090. In an alternative embodiment, light coupling optical elements 72 may be positioned to point towards divergent directions for more efficient spreading out of the injected light so it could be extracted by a broad light extraction area.

According to one embodiment, a method of manufacturing face-lit waveguide illumination system 900 includes providing or forming waveguiding substrate 190, providing or forming a plurality of light coupling elements 2, attaching the plurality of light coupling elements 2 to a broad-area surface of waveguiding substrate 190 (e.g., surface 110) with a good optical contact (preferably with index matching), providing a plurality of LED sources 32, and coupling the plurality of LED sources 32 to at least terminal ends of light coupling elements 2. At least some of light coupling elements 2 may also be disposed so that their light input edges are positioned about an edge of the waveguiding substrate 190 (e.g., edge 222). The respective LED sources 32 may be optically coupled to both light input faces 4 of light coupling elements 2 and edge surface 232 of waveguiding substrate 190. Light coupling elements 2 may be attached to surface 110 using a broad variety of methods and techniques.

Figure 20:
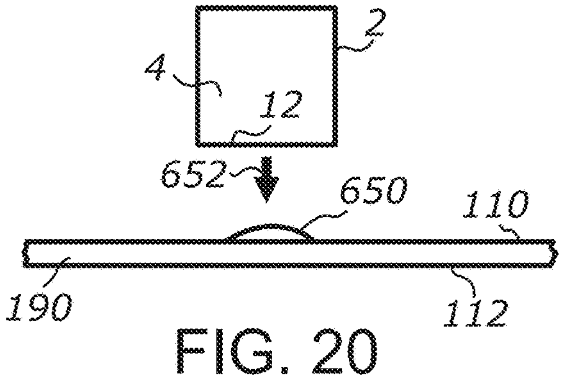
FIG. 20 is a schematic section view illustrating a step of a method of attaching a light coupling optical element to a surface of a waveguiding substrate, showing uncured liquid adhesive material deposited on the waveguide surface, according to at least one embodiment of the present invention.
Figure 21:
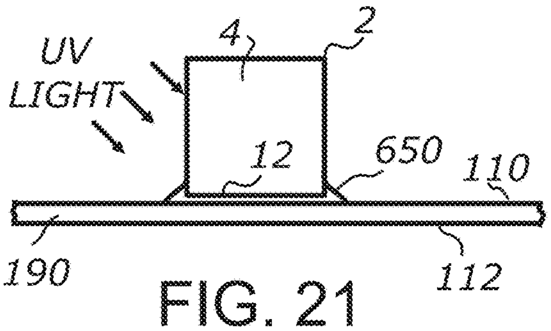
FIG. 21 is a schematic section view illustrating a step of a method of attaching light coupling optical element to a surface of a waveguiding substrate, showing curing a liquid adhesive material using UV light, according to at least one embodiment of the present invention.

FIG. 20 and FIG. 21 illustrate an exemplary method of attaching an individual light coupling element 2 to surface 110 of waveguiding substrate 190. According to this method, a drop of liquid UV-curable adhesive 650 is deposited to surface 110. When deposited to surface 110, such drop may have an extended shape having a length approximating the length L of light coupling element 2. It may be preferred that the viscosity of liquid adhesive 650 is sufficient to prevent excessive spreading of the material when it is deposited to surface 110.

Light coupling element 2 is then pressed against surface 110 along a direction 652 (FIG. 20) so that bottom face 12 comes into contact with adhesive 650 and forces the adhesive to form a thin layer between face 12 and surface 110. The liquid adhesive material 650 is then illuminated by UV light and cured so that light coupling element 2 becomes permanently attached to surface 110 with a good optical contact. According to one embodiment, adhesive material 650 has a refractive index matched with either one or both of the materials of waveguiding substrate 190 and light coupling element 2.

Figure 22:
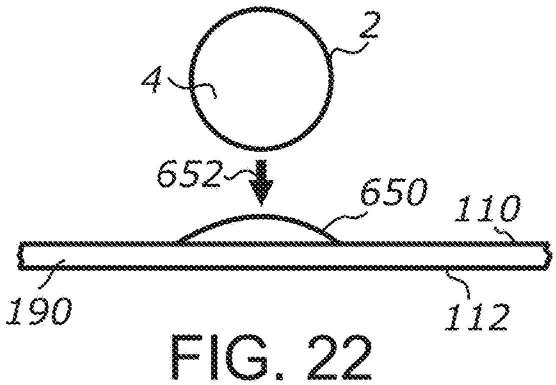
FIG. 22 is a schematic section view illustrating a step of a method of attaching a round or conical light coupling optical element to a surface of a waveguiding substrate, showing uncured liquid adhesive material deposited on the waveguide surface, according to at least one embodiment of the present invention.
Figure 23:
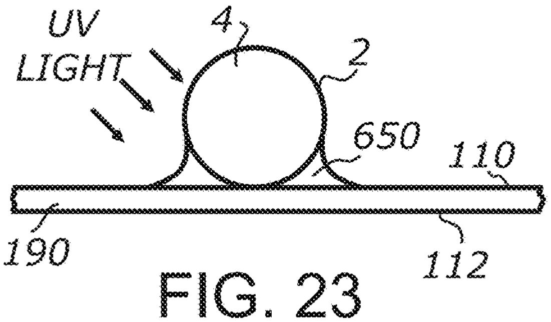
FIG. 23 is a schematic section view illustrating a step of a method of attaching a round or conical light coupling optical element to a surface of a waveguiding substrate, showing curing a liquid adhesive material using UV light, according to at least one embodiment of the present invention.

It is noted that such method can be adapted without limitations to attach light coupling elements 2 having many other configurations, including but not limited to those shown in FIG. 9. Furthermore, such method can be adapted for attaching light coupling elements 2 that have non-planar bottom surfaces. This is illustrated in FIG. 22 and FIG. 23 in which a larger drop of UV-curable adhesive 650 is used to attach a round or conical light coupling element 2 to surface 110 of waveguiding substrate 190. In FIG. 22, a larger volume of liquid-form adhesive 650 is used compared to the case of FIG. 20 in order to fill the gaps between the round cross-sectional shape of light coupling element 2 and planar surface 110, after which the adhesive can be cured to a solid state (FIG. 23).

The above-described methods of attaching light coupling elements 2 to surface 110 of waveguiding substrate 190 may also be modified such that each light coupling element 2 is first placed onto surface 110 and liquid adhesive 650 is applied afterwards. In the latter case, the viscosity of adhesive material 650 can be made sufficiently low so that it could penetrate into tight spaces between light coupling elements 2 and surface 110 using capillary action.

Light coupling elements 2 may also be attached to surface 110 of waveguiding substrate 190 using a double-sided optically clear adhesive tape or any other suitable means that can provide sufficiently good optical contact for a generally unimpeded light propagation from light coupling elements 2 into the material of waveguiding substrate 190.

In a further alternative, light coupling elements 2 may be overmolded on surface 110. For example, light coupling elements may be formed on surface 110 from a liquid-form silicone material using one or more cavity molds. The silicone material may be subsequently cured to a solid form using UV light, moisture, or heat. It is preferred that the silicone material has a refractive index which approximates the refractive index of waveguiding substrate 190, with a refractive index difference being preferably less than 0.1, and more preferably less than 0.05.

Figure 24:
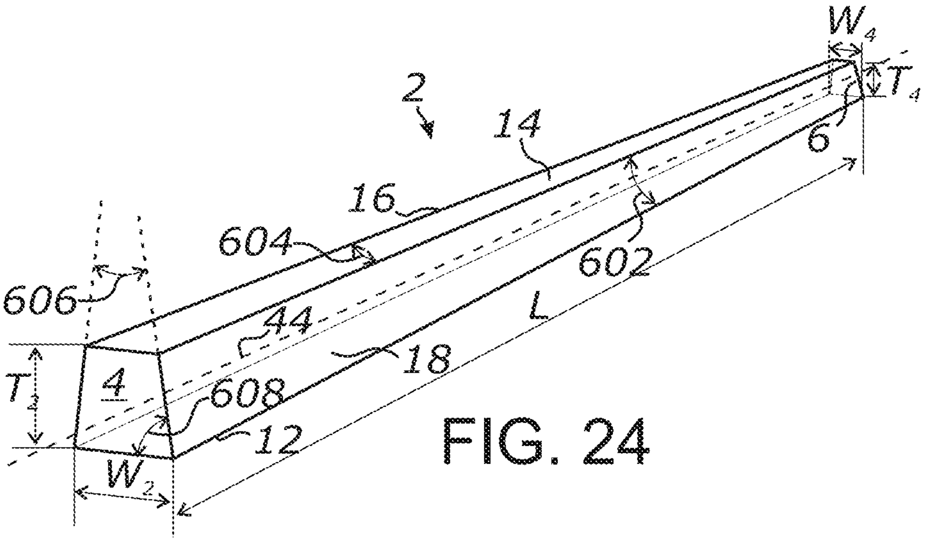
FIG. 24 is a schematic perspective view of a tapered light coupling optical element having a trapezoidal light input face, according to at least one embodiment of the present invention.
Figure 25:
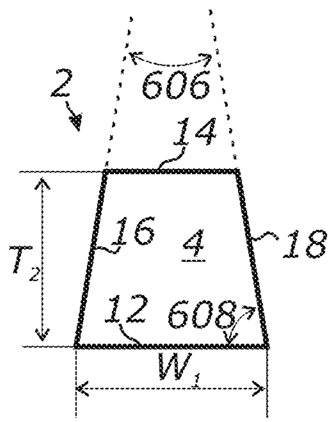
FIG. 25 is a schematic front view of a tapered light coupling optical element, showing an isosceles trapezoidal light input face, according to at least one embodiment of the present invention.

FIG. 24 schematically shows an embodiment of optical element 2 which is tapered in three orthogonal dimensions or planes: a first plane that is parallel to bottom face 12 (longitudinal width taper), a second plane that is perpendicular to bottom face 12 and parallel to longitudinal axis 44 (longitudinal height taper), and a third plane that is perpendicular to longitudinal axis 44 (transversal width taper). Side faces 16 and 18 each form a dihedral angle 608 (draft angle) with bottom face 12 so that light input face 4 has a trapezoidal shape tapered towards the top portion (away from bottom face 12) at an angle 606 (FIG. 25). In the illustrated case, width $W_1$ may be defined as a width of the base of the respective trapezoid and thickness $T_2$ may be defined as a height of the trapezoid.

According to various embodiments, angle 608 is preferably between 0° and 10°, more preferably between 0° and 6°, even more preferably between 0° and 4° and still even more preferably between 1° and 3°. Angles 608, 602 and 604 can all be the same or different from each other. Accordingly, according to at least one embodiment, light coupling element 2 can have different tapers in three orthogonal dimensions (longitudinal width taper, longitudinal height taper, and transversal width taper).

Any one, any two, any three or all of faces 6, 14, 16, and 18 may be mirrored to prevent light escape from light coupling element 2 to unwanted directions. Alternatively, light coupling element 2 may be encased into an opaque housing that has reflective or light absorbing walls. According to one embodiment, at least top face 14 is mirrored or covered with a reflective surface. According to one embodiment, at least longitudinal side faces 16 and 18 are mirrored or covered with reflective surfaces. According to one embodiment, at least end face 6 is mirrored or covered with a reflective surface. According to one embodiment, a reflector is formed around light coupling element 2 to reflect light that may emerge from any one or all of faces 6, 14, 16, and 18.

Figure 26:
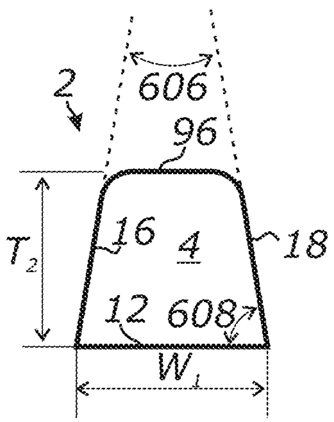
FIG. 26 is a schematic front view of a tapered light coupling optical element, showing an isosceles trapezoidal light input face having rounded corners, according to at least one embodiment of the present invention.

FIG. 26 shows light input face similar to that of FIG. 25 except that the respective trapezoid has rounded corners at the top portion. The radius of curvature of the rounded corners can be selected from various considerations, including, for example, material flow properties in a mold used to produce light coupling element 2.

Figure 27:
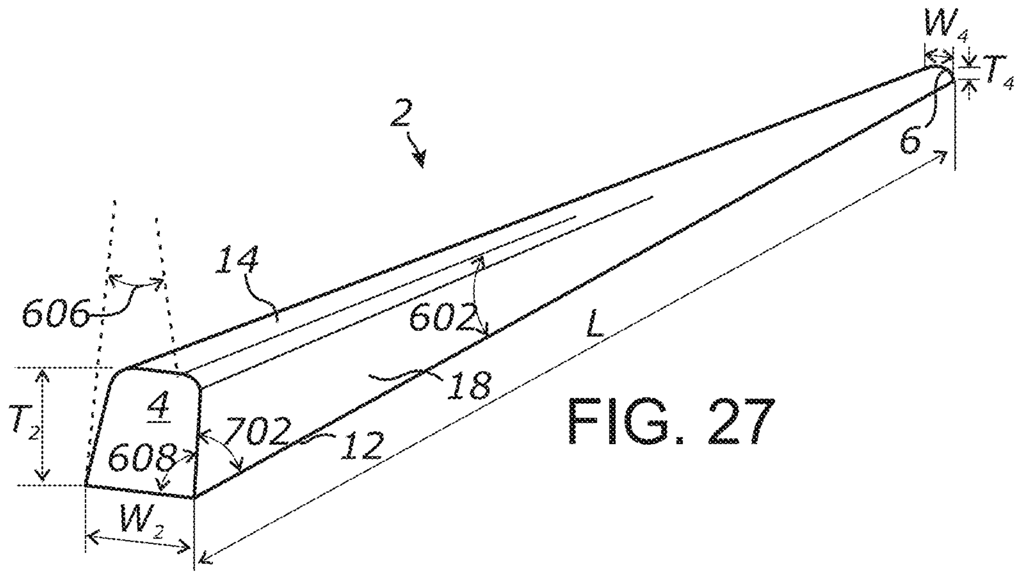
FIG. 27 is a schematic perspective view of a tapered light coupling optical element, showing a light input face that is non-perpendicular to a light output face, according to at least one embodiment of the present invention.
Figure 28:
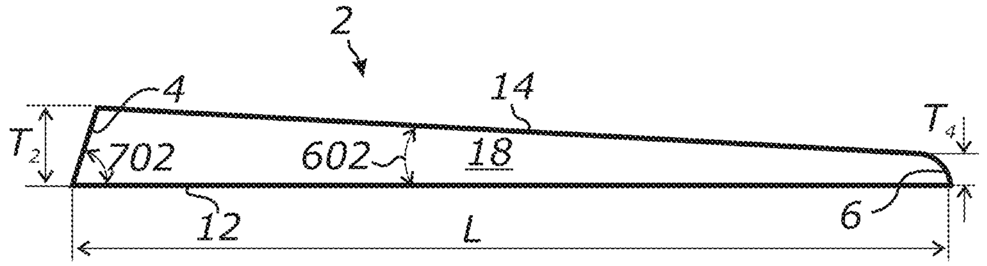
FIG. 28 is a schematic side view of a tapered light coupling optical element, showing a light input face disposed at an angle with respect perpendicular to a light output face, according to at least one embodiment of the present invention.

FIG. 27 shows an embodiment of light coupling element 2 in which light input face 4 in not perpendicular to light output face 12 and forms a less-than-90° dihedral angle 702 with face 12. FIG. 28 shows a side view of such embodiment of light coupling element 2 which has sloped light input face 12. Dihedral angle 702 may be selected based on various considerations. It is generally preferred that dihedral angle 702 is no less than 70°. According to one embodiment, dihedral angle 702 is greater than 70° and less than 90°. In one embodiment, dihedral angle 702 may be selected within a range between 85° and 89° (1°-6° draft angle), for example, to assist in removal of light coupling element 2 from an injection or casting mold. In one embodiment, dihedral angle 702 may be selected within a range of 70° and 85°, for example, for enhancing the light coupling efficiency. It can be shown that at least some configurations of light coupling element 2 exist in which sloping the light input face 4 with respect to light output face 12 at an angle may increase the amount of light injected into waveguiding substrate 190, particularly when the light emitting aperture of LED source 32 is also tilted with respect to face 12 at the same angle.

Figure 29:
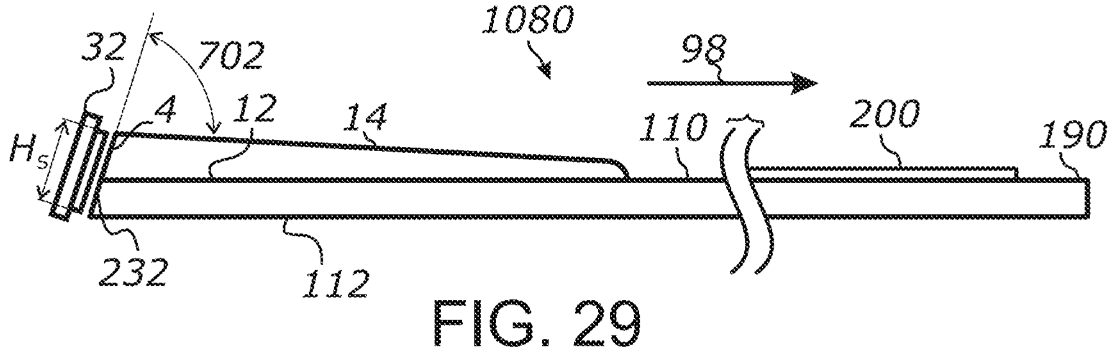
FIG. 29 is a schematic side view of a face-lit waveguide illumination system in which a light input face of a light coupling element and a light emitting aperture of an LED light source are tilted with respect to a normal to a prevailing plane of a planar waveguiding substrate, according to at least one embodiment of the present invention.

FIG. 29 schematically illustrates an embodiment of a face-lit waveguide illumination system 1080 in which light input face 4 of light coupling element 2 and a light emitting aperture of LED source 32 are both tilted at angle 702 with respect to a normal to a prevailing plane of planar waveguiding substrate 190. As further shown in FIG. 29, when waveguiding substrate 190 is configured to receive at least a portion of light emitted by LED source 32 on its edge, such edge may be beveled so that the respective side surface 232 also forms the same dihedral angle 702 with the plane of the substrate. It can be shown that such configuration of waveguide illumination system 1080 with sloped light input faces may be particularly efficient when used with light sources providing at least partially collimated beam.

According to further exemplary embodiments, LED sources 32 may be positioned at various angles so that their light emitting apertures are not parallel to respective light input faces 4 and form same or different tilt angles β with such light input faces. Such tilt angles β may vary between 0° and 45°. According to one embodiment, at least one of the light emitting apertures of LED sources 32 is tilted with respect to respective light input face 4 at non-zero angle β in a plane that is perpendicular to a prevailing plane of waveguiding substrate 190. According to one embodiment, at least one of the light emitting apertures of LED sources 32 is tilted with respect to respective light input face 4 at non-zero angle β in a plane that is parallel to a prevailing plane of waveguiding substrate 190.

It is noted that determining optimal or minimum spacing between adjacent light coupling elements 2 and/or LEDs 32 is not limited to the cases discussed above (e.g., in reference to FIG. 6). In order to even further increase the packing density of light sources or further reduce the interference between adjacent light coupling elements 2 and LEDs 32 in the array, waveguide illumination systems of the present invention may include additional features to limit the angular divergence of the light beam injected into waveguiding substrate 190.

Figure 30:
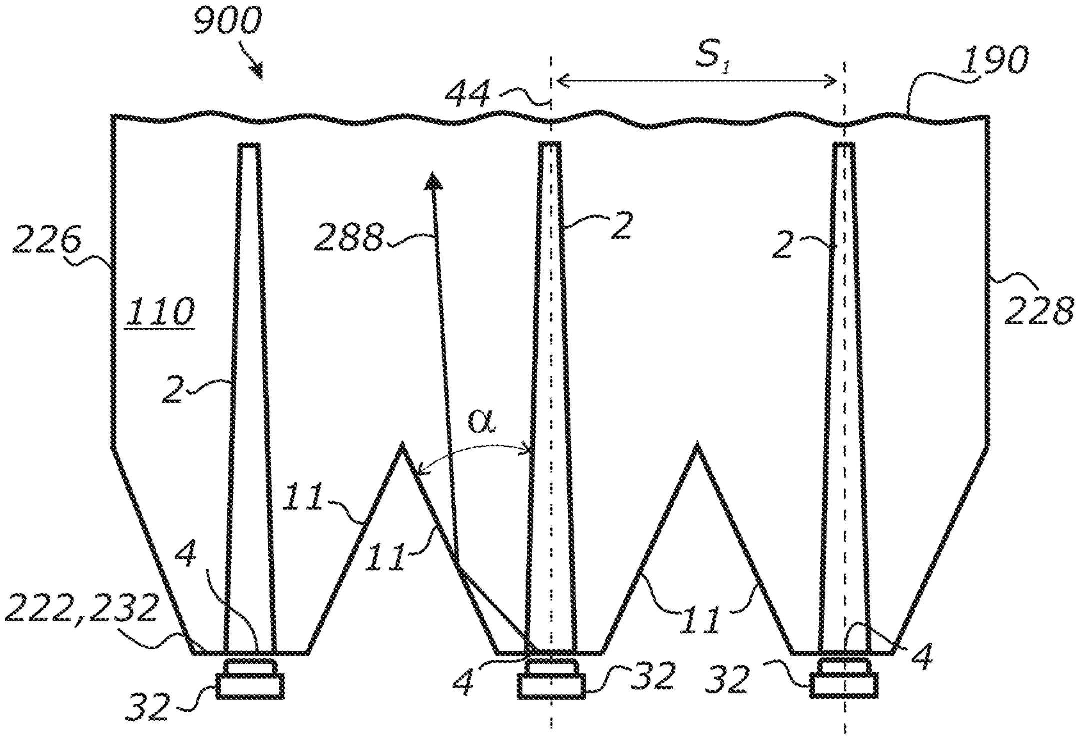
FIG. 30 is a schematic plan view and raytracing of a face-lit waveguide illumination system portion, showing a shaped edge portion of a waveguiding substrate, according to at least one embodiment of the present invention.

This is illustrated in FIG. 30 which schematically shows a portion of face-lit waveguide illumination system 900 in which edge 222 of waveguiding substrate 190 is shaped by forming deep triangular (V-shaped) notches in the respective side surface 232 of generally rectangular waveguiding substrate 190. The resulting shaped edge 222 has surface portions that extend parallel to the respective dimension of the rectangular waveguide 190 and also have surface portions that are sloped at angles α with respect to a normal to such dimension.

Tapered light coupling elements 2 are attached to top surface 110 of waveguiding substrate 190 in spaces formed between the notches so that light input faces 4 are aligned with the parallel portions of edge 222. Light emitted by LED sources 32 may be input into waveguiding substrate 190 through faces 4 only or through both faces 4 and respective adjacent portions of side surface 232.

Each V-shaped notch forms a pair of TIR surfaces 11 capable of reflecting light propagating within waveguiding substrate 190 by means of TIR. Each TIR surface 11 is disposed at angle a with respect to longitudinal axis 44 of the respective light coupling element 2.

Surfaces 11 should be sufficiently smooth and preferably have high polish to efficiently reflect light by means of TIR. By way of example, such surfaces 11 may be formed by CO2 laser cutting or trimming the respective edge of waveguiding substrate 190 made from acrylic. While laser cutting may provide sufficient polish for TIR operation, surfaces 11 may also be further polished by a flame, heat or a mechanical process to further enhance its reflective properties.

In operation, a ray 288 emanated by individual LED source 32 and injected into waveguiding substrate 190 through optical element 2 and broad-area top surface 110 is intercepted by adjacent TIR surface 11 and redirected towards longitudinal axis 44. Opposing pairs of TIR surfaces 11 may thus operate as a collimating element that reduces the divergence of the light beam injected into waveguiding substrate 190. In the illustrated embodiment, longitudinal axis 44 of individual light coupling element 2 may also be regarded as an optical axis of the collimating optical element formed by a pair of the opposing surfaces 11 flanking such element 2.

It may be appreciated that, in the embodiment of system 900 illustrated in FIG. 30 where waveguiding substrate has shaped edge 222, spacing distances S1 between adjacent light coupling element 2 may be reduced compared to the cases where edge 222 is one-dimensional (see, e.g., FIG. 6) due to the light collimating effect of such shaped edge. Accordingly, such or similar embodiments may be advantageously selected when it is desired to employ relatively dense arrays of LED sources 32.

Figure 31:
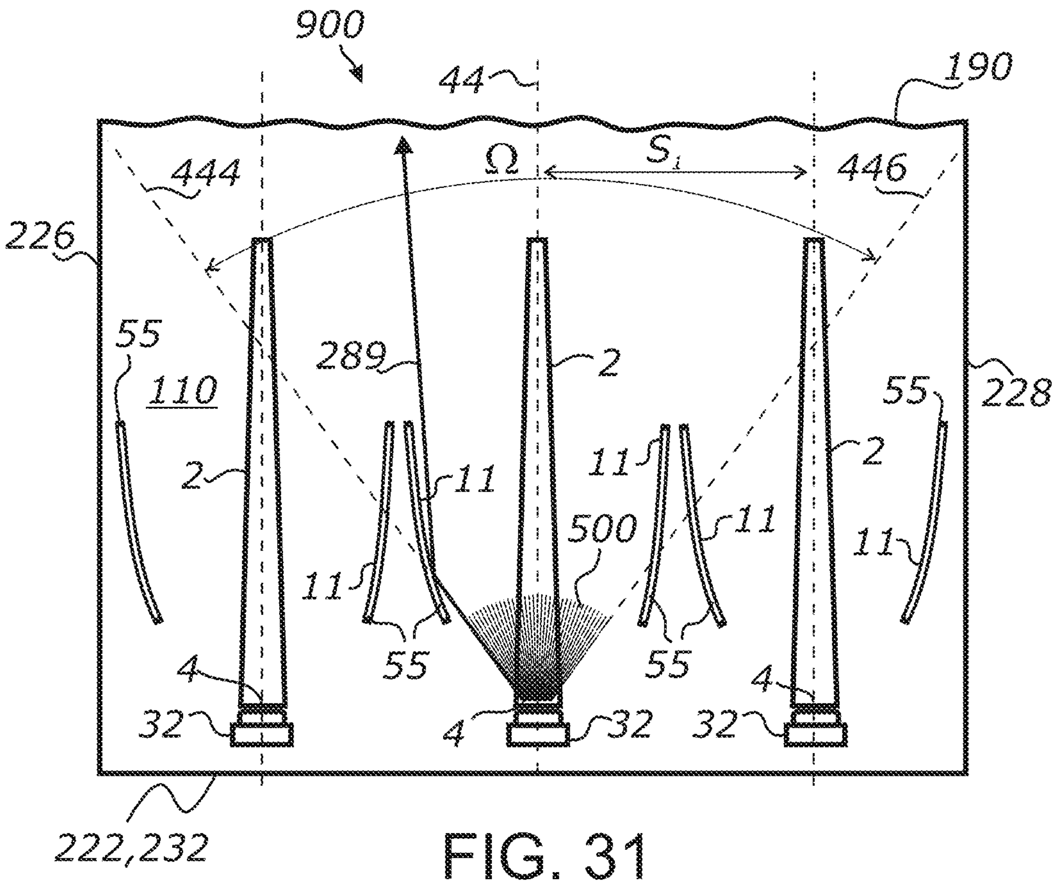
FIG. 31 is a schematic plan view and raytracing of a face-lit waveguide illumination system portion, showing a plurality of slits formed in a waveguiding substrate, according to at least one embodiment of the present invention.

TIR surfaces and collimating structures that allow for dense packaging of LED sources 32 and light coupling elements 2 on surface 110 may also be formed in waveguiding substrate 190 using other methods. FIG. 31 schematically illustrates an embodiment of waveguide illumination system 900 in which light coupling elements 2 are attached to surface 110 of waveguiding substrate 190 at a distance from plain edge 222. Light coupling elements 2 are also arranged into a dense ordered array with spacing $S_1$ being considerably less than that of the embodiment of system 900 shown in FIG. 6. A series of narrow slits 55 is formed in surface 110 in spaces between individual elements 2. Each slit 55 is cut all the way through the thickness of waveguiding substrate 190 and forms at least one TIR surface 11 by one of its smooth walls that is facing a nearest light coupling element 2. Such through cuts (slits 55) have a curvilinear shape and are configured to deflect at least the uttermost off-axis rays of ray bundle 500.

The location and orientation of each slit 55 are such that at least a portion of the uttermost off-axis rays of bundle of rays 500 is intercepted by the respective TIR surfaces 11 and deflected away from adjacent light coupling element 2 and towards the intended propagation direction of light in waveguiding substrate 190.

This is further illustrated by an example of an uttermost off-axis ray 289 of bundle of rays 500. Ray 289 initially propagates towards adjacent light coupling element 2 along line 444 and would have encountered such adjacent element 50 in the absence of slits 55. However, in the illustrated embodiment, ray 289 strikes concave TIR surface 11 disposed along the optical propagation path of the ray and is deflected from the original propagation path away from the adjacent light coupling element 2. Accordingly, the chance of decoupling of ray 289 from waveguiding substrate 190 due to the interaction with adjacent light coupling elements 2 is significantly reduced or may be even virtually eliminated.

Slits 55 may have any suitable shapes and orientations provided that they can efficiently shield light coupling elements 2 from light rays injected into waveguide 190 by other light coupling elements 2 in the array. On the other hand, the configuration of slits 55 should also preferably prevent or at least significantly minimize light redirection back to the same light coupling element 2. This can be achieved by carefully considering the spacing $S_1$ between light coupling elements 2 and the length L of each element 2. According to one embodiment, the respective pairs of TIR surfaces 11 flanking each light coupling elements 2 are shaped in the form of a 2-dimensional collimating optical element. Each TIR surface 11 may have any suitable light-collimating profile including, for example, concave or convex parabolic, circular or free-form profiles. According to one embodiment, at least one TIR surface 11 or at least a substantial part of it can be made straight and planar.

Figure 32:
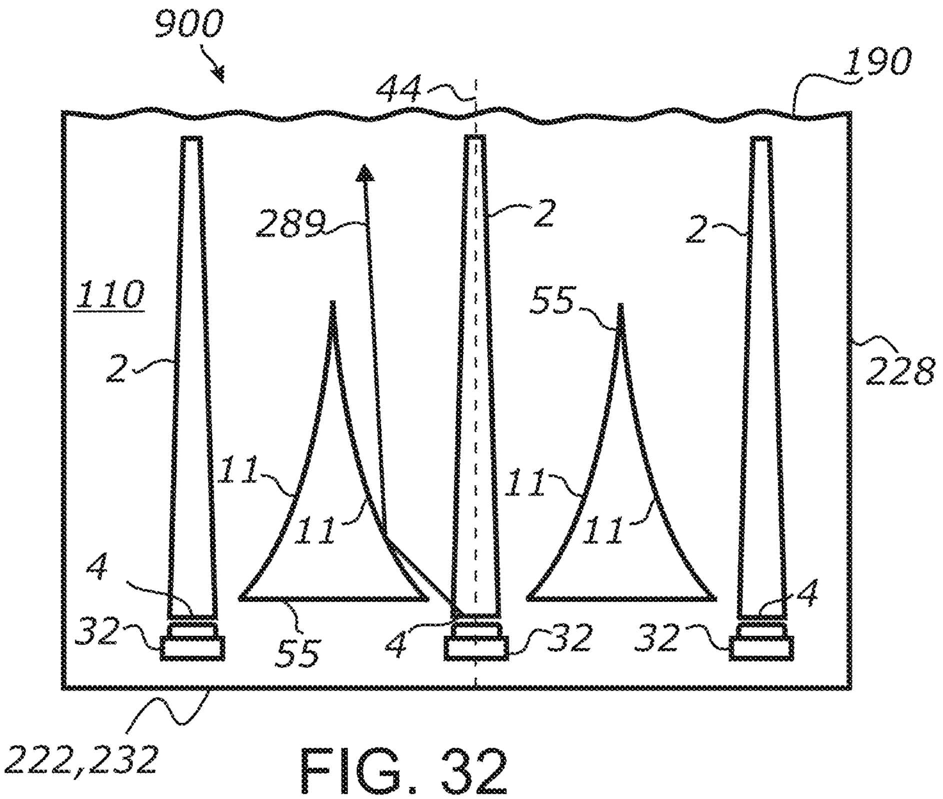
FIG. 32 is a schematic plan view and raytracing of a face-lit waveguide illumination system portion, showing a plurality of slots or cutouts formed in a waveguiding substrate surface, according to at least one embodiment of the present invention.

FIG. 32 shows a different configuration of cuts in surface 110 that form TIR surfaces. In this case, TIR surfaces 11 are formed by slots 59 which have a generally triangular shape. It is noted, however, that slots 59 may also have any other suitable configurations and shapes. Surfaces 11 may also be formed by two or more straight or curved segments of slots 59, or a combination thereof.

It is preferred that at least a portion of surface 11 that is closest to light input face 4 of the respective light coupling element 2 forms non-zero angle $\alpha$ with respect to longitudinal axis 44 of such light coupling element in a plane of waveguiding substrate 190. Angle $\alpha$ should be generally between 0° and 45° and can be defined based on the geometry of the light beam and/or geometry and spacing of light coupling elements 2 in the array. According to one embodiment, angle $\alpha$ is less than $\Omega/2$.

Angle $\alpha$ may also be variable along surface 11 between a minimum angle $\alpha_{min}$ and a maximum angle $\alpha_{max}$ that can be defined based on specific configurations of individual light coupling elements 2 and their spacing in the array. According to various embodiments, angle $\alpha_{min}$ can be 5°, 10°, 15°, and 20°. According to various embodiments, angle $\alpha_{max}$ can be 40°, 35°, and 30°. Depending on the configuration of waveguide illumination system 900, any combinations of the above $\alpha_{min}$ and $\alpha_{max}$ can be employed.

When sizing light coupling elements 2 relatively to the size of LED sources 32, various parameters of the elements of the waveguide illumination system as well as manufacturing tolerances should be considered. A width of the light input face 4 should normally generally be at least equal to or slightly larger than the width of the light emitting apertures of the LEDs to avoid or at least minimize light spillage.

Figure 33:
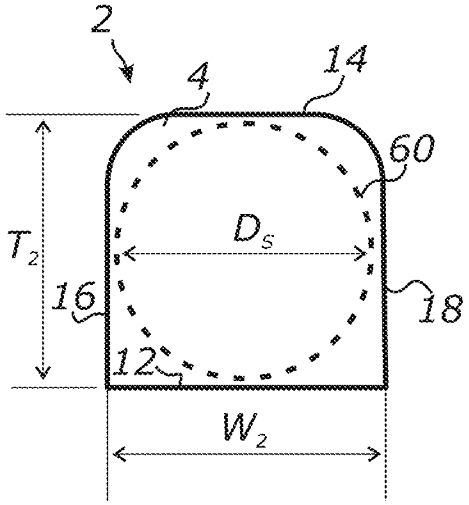
FIG. 33 is a schematic front view of a light coupling optical element, showing a light input aperture of the optical element circumscribed over a circular light emitting aperture of a light source, according to at least one embodiment of the present invention.
Figure 34:
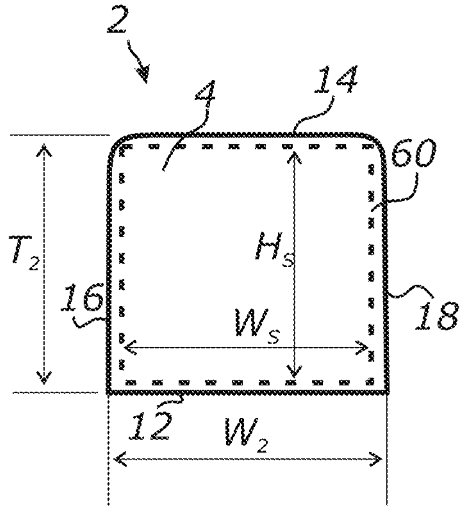
FIG. 34 is a schematic front view of a light coupling optical element, showing a light input aperture of the optical element circumscribed over a rectangular light emitting aperture of a light source, according to at least one embodiment of the present invention.

FIG. 33 and FIG. 34 schematically illustrate examples of relative sizing of the light input aperture of light coupling elements 2 with respect to light emitting aperture 60. Referring to FIG. 33, light emitting aperture 60 of LED source 32 (not shown) has a circular shape with a diameter $D_s$. Light input face 4 of light coupling elements 2 has a generally rectangular shape with rounded top corners. The $W_1$ and $T_2$ dimensions of light input face 4 are selected such that the light receiving aperture of face 4 is circumscribed over light emitting aperture 60. When light emitted by light emitting aperture 60 is input into light coupling element 2 only, it is preferred that both $W_1$ and $T_2$ are at least equal to $D_s$. According to various embodiments, $W_1$ and $T_2$ may also be slightly greater than $D_s$ and may include some size allowance to compensate any manufacturing imperfections of positioning errors. According to one embodiment, such size allowance should be generally less than 10-15%. When light is simultaneously input into light coupling element 2 and an edge of waveguiding substrate 190, $T_2$ can be less than $D_s$. On the other hand, the combined thickness ($T_1$+$T_2$) of the substrate and light coupling element should be at least equal to or greater than $D_s$.

Referring to FIG. 34, light emitting aperture 60 has a rectangular shape characterized by width $W_s$ and height $H_s$. Likewise, the light receiving aperture of face 4 is sized such that it circumscribes over light emitting aperture 60. In most cases, it is preferred that at least the width dimension $W_2$ of light input face 4 is at least equal to or slightly greater than $W_s$. When light from the respective light source 32 is intended to be injected into waveguiding substrate 190 only through light coupling element 2, both dimensions $W_2$and $T_2$ should be at least equal to or slightly greater than the respective dimensions $W_s$ and $H_s$. On the other hand, it is preferred that dimensions $W_2$and $T_2$ do not exceed $W_s$ and $T_s$, respectively, by more than a predefined percentage, e.g., 10-20%, in order to maximize the light coupling efficiency into waveguiding substrate 190.

While light input face 4 of light coupling element 2 may have a generally rectangular or round shape that approximates the dimensions and shape of light emitting aperture 60 of LEDs 32, a cross-section of the opposing tapered end can have any other suitable shape and relative proportions. For example, the opposing end's cross-section may have a shape that can be approximated by a rectangle having different height/to width ratio compared to light input face 4. In another example, such cross-section can be semi-round, triangular, trapezoidal (with sharp or rounded corners), or free-form. The surfaces of faces 14, 16, and 18 may be curved accordingly to accommodate the transition or blending of the cross-section of light coupling element 2 near light input face 4 into such different shape at the opposing end of the light coupling element.

Figure 35:
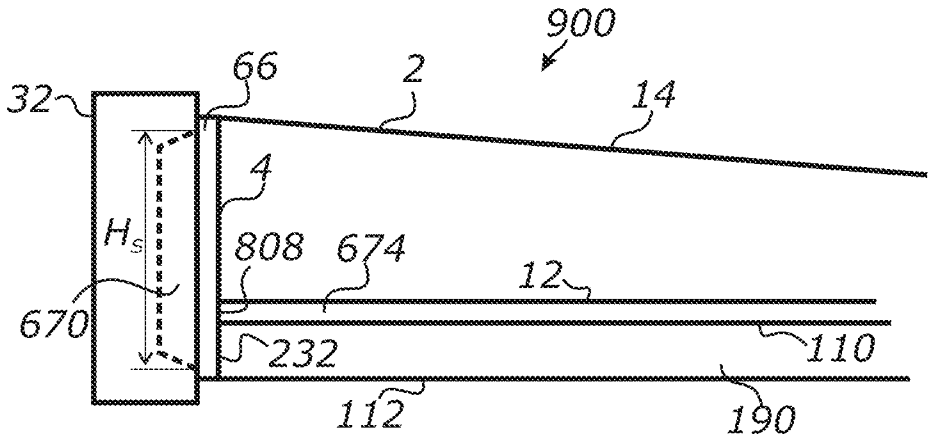
FIG. 35 is a schematic view of a portion of a face-lit waveguide illumination system, showing optical coupling of optical elements of the system using index-matched layers, according to at least one embodiment of the present invention.

FIG. 35 schematically illustrates an embodiment of face-lit illumination system 900 in which light coupling element 2 is coupled to waveguiding substrate 190 and LED source 32 using index-matched optical coupling layers 674 and 66, respectively. Optical coupling layer 674 is formed by an optically clear polymeric material having a refractive index that is closely matched to that of waveguiding substrate 190 and light coupling element 2. According to one embodiment, the refractive index of waveguiding substrate 190, light coupling element 2 and coupling layer 674 should be within 0.1 from each other, more preferably within 0.06, even more preferably within 0.02, and still even more preferably within 0.01. By way of non-limiting example, both waveguiding substrate 190 and light coupling element 2 may be made from acrylic (PMMA) having a refractive index of about 1.49 and coupling layer 674 can be an acrylic-based UV-curable adhesive having a refractive index in 1.48-1.49 range.

LED source 32 has an active light emitting layer or cavity 670 which defines light emitting aperture 60 of the source. Light emitting aperture 60 has an effective height dimension $H_s$ in a direction perpendicular to the prevailing plane of waveguiding substrate 190. $H_s$ is approximately equal or slightly less than a combined thickness of waveguiding substrate 190, optical coupling layer 674 and light coupling element 2 so that substantially all of the light emitted by LED source 32 can be utilized and at least a substantial fraction of such light can be coupled into waveguiding substrate 190. In the illustrated case, light injection into waveguiding substrate 190 occurs through light input face 4 of light coupling element 2, light input surface 232 of waveguiding substrate 190 and a light input edge 808 of coupling layer 674.

Optical coupling layer 66 is preferably index-matched to either one or both light coupling element 2 and waveguiding substrate 190. For example, it can be made from the same or similar UV-curable adhesive or encapsulant as layer 674. It may be appreciated that optical coupling of LED source 32 to the respective edges or light input surfaces of optical elements of system 900 may significantly enhance light extraction from light emitting layer or cavity 670 by suppressing TIR at the optical interface of formed by the boundary of such light emitting layer or cavity 670.

The distance between the light emitting surface of LED source 32 and the respective light input surfaces of light coupling element 2 and waveguiding substrate 190 should be sufficiently small to minimize light escape into the spacing. Accordingly, the thickness of optical layer 66 that fills the respective gap should normally be relatively low. It is preferred that such thickness is at least 5 times or even at least 10 times less than the size of light emitting aperture 60 of LED source 32.

It is noted that the embodiment of system 900 illustrated in FIG. 35 may also be adapted for the cases where light coupling element 2 is disposed at a distance from all edges of waveguiding substrate 190 and where LED source 32 illuminates only face 4. In such cases, the transversal thicknesses of light coupling element 2 and/or waveguide 190 may be modified accordingly to accommodate the size of light emitting aperture 60 of LED source 32. Light coupling elements 2 and LED sources 32 optically coupled to terminal ends of such light coupling elements may be arranged pairwise and distributed over surface 110 according to any suitable random or ordered pattern. For example, such pairs may be arranged into rows and columns within an ordered two-dimensional array. Such two-dimensional array may occupy essentially the entire area of surface 110 or one or more portions of the surface.

Illumination system 900 may be configured for a mixed light input into waveguiding substrate 190. For example, waveguiding substrate 190 may include regions where light is input from appropriately-sized LEDs into the substrate through one of more of broad-area faces (e.g., face 110 and/or 112) using light coupling elements 2 and may further include regions where light is input into the substrate through one or more of its edges (e.g., edge 222 and/or an opposing edge).

Figure 36:
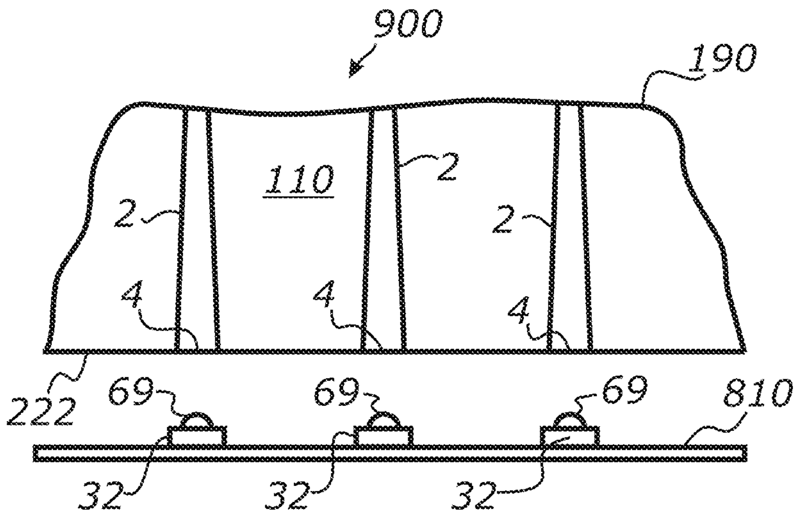
FIG. 36 is a schematic view of a portion of a face-lit waveguide illumination system, showing drops of a viscous UV-curable adhesive deposited onto light emitting surfaces of light sources, according to at least one embodiment of the present invention.
Figure 37:
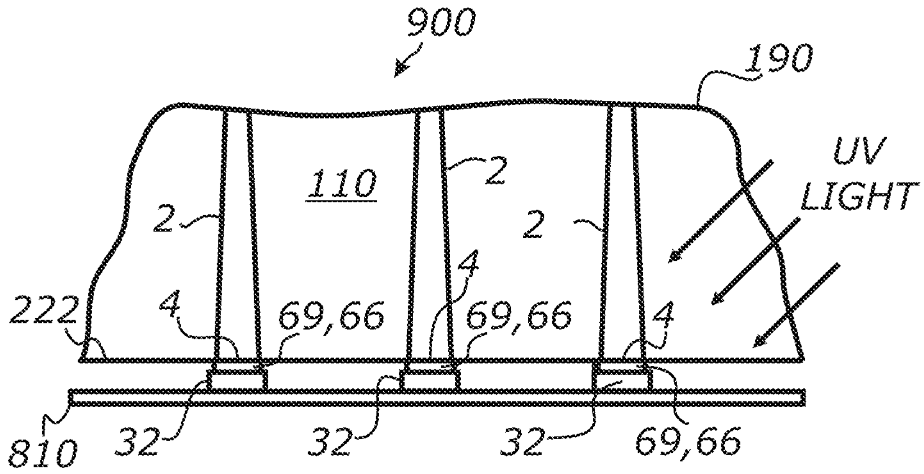
FIG. 37 is a schematic view of a portion of face-lit waveguide illumination system, showing a step of curing a layer of UV-curable adhesive between light sources and light coupling elements, according to at least one embodiment of the present invention.

FIG. 36 and FIG. 37 illustrate an embodiment of a method of attaching and optical coupling of LEDs 32 to light coupling elements 2 and/or waveguiding substrate 190. Referring to FIG. 36, a linear array of SMD LEDs mounted onto a rigid or flexible LED strip 810 while light coupling elements 2 are assembled on waveguiding substrate 190 with the same spacing of the LED array. Each LED 32 has a substantially planar light emitting surface although it may also have some surface irregularities or curvature that approximates a planar shape.

A drop 69 of viscous liquid UV-curable adhesive is dispensed onto the light emitting surface of each LED 32. Such selective dispensing of liquid adhesive onto the light emitting areas of LEDs 32 can be done manually or using an automated precision dispensing machine. The viscosity of the liquid adhesive can be adjusted to an appropriate value between 300 and 5000 Cp (centipoise) to ensure that drops 69 can form and remain on the surface of LEDs 32 until the following step.

Subsequently, the LED strip is accurately aligned with respect to faces 4 and/or edge 222 and pressed against the assembly of waveguiding substrate 190 and light coupling elements 2 so that drops 69 of liquid adhesive transform into thin optical coupling layers 66 (FIG. 37).

As further illustrated in FIG. 37, the areas of contact of LED sources 32 with waveguiding substrate 190 are illuminated by UV light at wavelengths that permit curing the liquid adhesive to a solid form. It is preferred that the hardness of cured layers 66 is greater than 65 Shore A, more preferably greater than 70 Shore A, and even more preferably greater than 75 Shore A.

The above method may be modified in numerous ways. For example, optical light coupling elements 2 may be first coupled to LEDs 32 and then mounted/bonded to waveguiding substrate 190. In another example, drops 69 can be dispensed onto faces 4 of the respective light coupling elements 2 and/or to edge 222 of waveguide 190. In a yet further exemplary modification, edge 222 may be coated with a continuous layer of a UV-curable clear liquid material. LEDs 32 can then be forced into such continuous UV-curable layer and the layer can be subsequently cured to a solid form, thus providing gapless optical coupling between the LED sources 32 and waveguiding substrate 190.

The materials suitable for layer 66 are not limited to UV-curable adhesives and may be replaced with other types of light-curable materials that are responsive to other wavelengths (e.g., visible light or infrared radiation). Furthermore, suitable materials may also include single- or multi-component adhesives or encapsulants, such as silicones, that can be polymerized by mixing the components together or can be cured in response to the exposure to heat, moisture or air.

It is preferred that optical coupling layers 66 create a strong bond between LEDs 32 and the light input surfaces of waveguiding substrate 190 and/or light coupling elements 2. The array of LEDs 32, waveguiding substrate 190 and light coupling elements 2 may thus form an integrally formed, single-piece illumination system. Such system can be characterized by a continuous optical light path, without any air gaps, from LEDs 32 to a light distribution area of waveguide 190. Moreover, the entire optical path may be index-matched to eliminate or at least minimize the Fresnel reflection and related energy losses at various optical interfaces of illumination system 900. Layer 66 can be made thermally conductive to assist in heat dissipation from LEDs 32. According to one embodiment, it is preferred that the thermal conductivity of layer 66 material is greater than 0.15 Watt/(m K).

Figure 38:
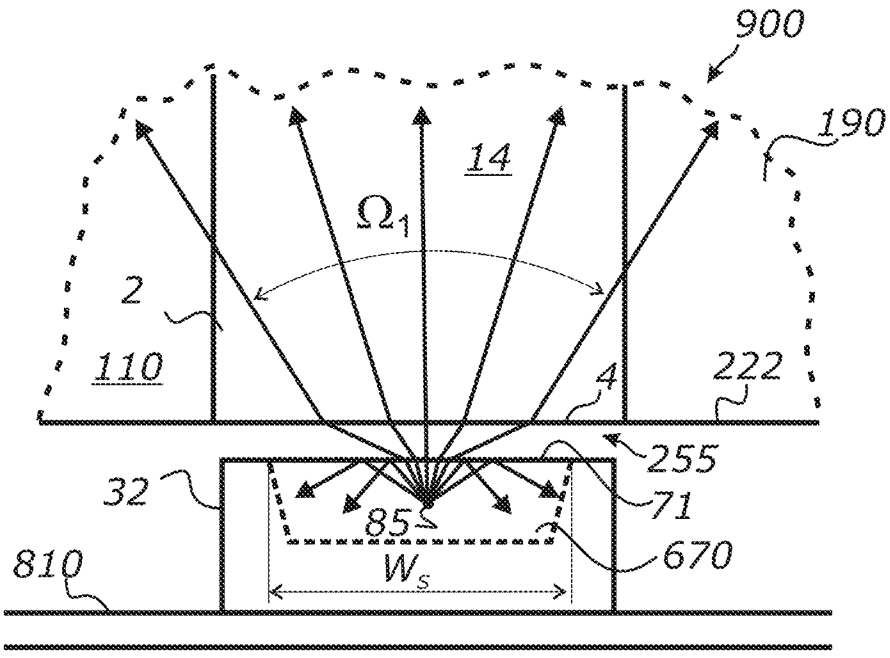
FIG. 38 is a schematic view and raytracing of a portion of a face-lit waveguide illumination system, showing an air gap between a LED source and a waveguide, according to at least one embodiment of the present invention.
Figure 39:
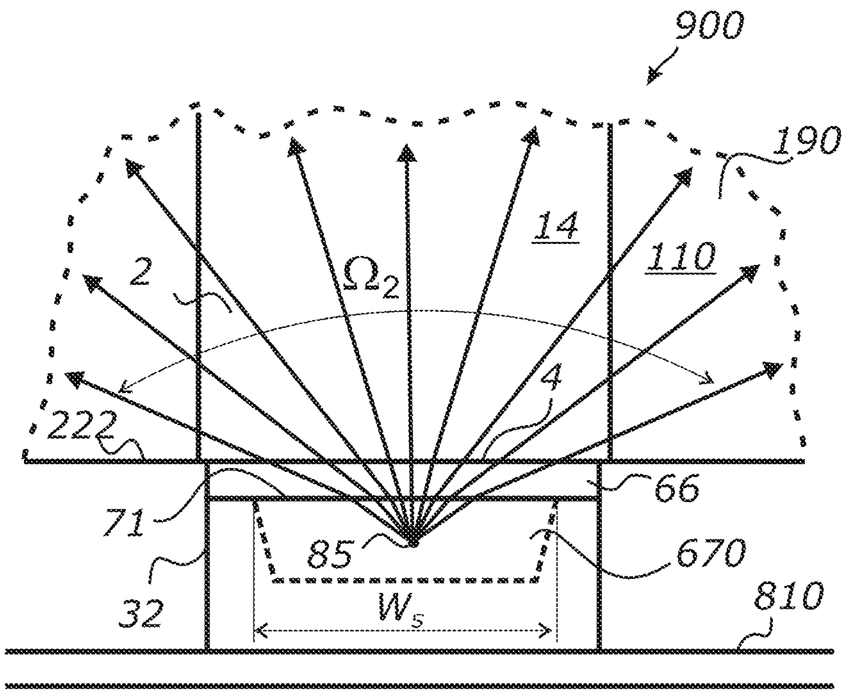
FIG. 39 is a schematic view and raytracing of a portion of a face-lit waveguide illumination system, showing an optical coupling layer between a LED source and a waveguide, according to at least one embodiment of the present invention.

FIG. 38 and FIG. 39 schematically illustrate different regimes of light outcoupling from LEDs 312 and light coupling into light coupling element 2 and/or waveguiding substrate 190. In FIG. 38, there is an air gap 255 between a light emitting surface 71 of LED 32 and the respective light receiving surfaces of waveguiding substrate 190 and light coupling element 2. In FIG. 39, air gap 255 is eliminated and replaced with index-matched optical coupling layer 66.

LEDs often employ GaN or similar types of light emitting materials that have relatively high refractive indices ($n \approx 2.5$ for GaN). At the same time, $n \approx 1$ for air, which creates a large refractive index step at the optical interface formed by surface 71. Accordingly, a significant fraction of light rays emitted at an emission point 55 within layer 670 at above-TIR angles with respect to a normal to surface 71 can be trapped within the light emitting layer due to the reflections from such surface.

Upon entering into waveguiding substrate 190 and/or light coupling element 2, the light beam can be characterized by a spread angle $\Omega_1$, which depends on the angular characteristics of the beam exiting surface 71 and the refractive index of the materials of waveguiding substrate 190 and/or light coupling element 2. It can be shown that spread angle $\Omega_1$ is about 95° for PMMA (n≈1.49) when air gap 255 is provided.

In contrast, the index-matched layer 66 (FIG. 39) provides for a generally unimpeded light passage from layer 670 to waveguiding substrate 190 and/or light coupling element 2 for a larger fraction of light rays by suppressing TIR at surface 71. For some applications, such index-matched light coupling may be advantageous due to the increased net light input into waveguiding substrate 190. Furthermore, a spread angle $\Omega_2$, which characterizes the respective injected beam in FIG. 39, can be significantly greater than 95° and may take values of up to 180°. This may be advantageous for application requiring, for example, improved light beam mixing in waveguiding substrate 190.

According to one embodiment, layer 66 includes particles of a phosphor (luminescent material) configured to change the spectrum of light emitted by LED source 32. Such phosphor material may be mixed with the optically clear material of layer 66 so that layer 66 provides several functions including index-matched optical coupling, bonding of LED source 32 to face 4 and/or surface 232, and light spectrum conversion.

The structure and operating principles of the above-described embodiments of face-lit illumination systems may be applied without limitations to any common glass or plastic objects which have the appropriate structure and sufficient optical clarity or transmissivity to act as planar waveguide. Examples include but are not limited to glass table tops, back-surface mirrors, glass or transparent-plastic doors or inserts of furniture articles, screens, light transmitting sheets employed in large-area lighting panels, backlights, light diffusing sheets, and the like. For instance, one or more light coupling elements 2 may be attached to a face of a glass table top, a vanity mirror, a light guiding plate (LGP) of a backlighting unit (BLU), a transparent information or advertising sign or display, an illuminated decorative panel, a glass or plastic window, and the like.

Each of the light coupling elements 2 may be provided with one or more LED sources 32 in order to insert light into the respective glass or plastic slab, panel or film and force its lateral propagation in a waveguide mode. A light extracting film may be attached to the face of such light-guiding glass or plastic slab, panel or film in another location to extract light towards an observer. Either one or all of the attached optical components of system 900 may be made removable from the light-guiding surface and may also be further made repositionable on the same or different surface. Additionally, different types of light coupling optical elements and light sources may be used within the same system thus providing even greater degree of control over system configuration and light emission.

This invention is not limited in application to the planar light guiding panels, sheetforms, films or slabs having strictly parallel broad surfaces, but can also be applied to the case where waveguiding substrate 190 has a wedge configuration and is tapered towards one of its edges. A tapered configuration of waveguiding substrate 190 may be advantageously selected, for example, for an improved light distribution or extraction. In one embodiment, light coupling elements 2 may be attached to surface 110 about a thicker edge of wedge-shaped waveguiding substrate 190 and oriented such that their tapered ends point to generally towards the tapered edge of such waveguiding substrate 190.

Waveguide illumination system 900 may incorporate any number of auxiliary layers serving various purposes, such as, for example, providing additional mechanical strength, environmental resistance, peel resistance, improved visual appearance, color, etc. Any optical interface between a layer formed by a lower refractive index transmissive medium and a layer formed by a higher refractive index transmissive medium may also be provided with an intermediate optically transmissive layer, for example, for promoting the optical contact or adhesion between the layers. The intermediate layer should preferably have a refractive index which is approximately equal to or greater than the lower of the two refractive indices at the given optical interface.

Figure 40:
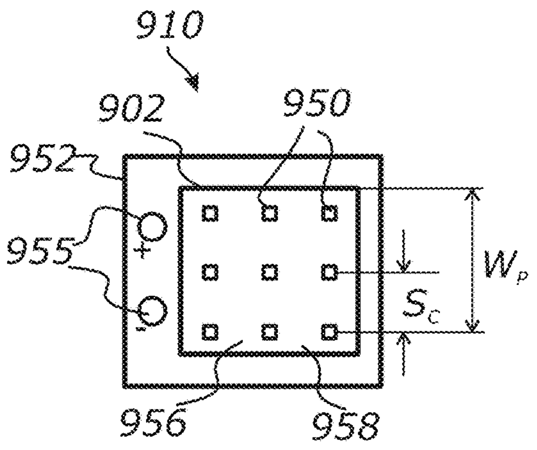
FIG. 40 is a schematic view of an LED package employing a two-dimensional array of light emitting diodes within a rectangular light emitting aperture, according to at least one embodiment of the present invention.

LED sources 32 employed in face-lit waveguide illumination system 900 are not limited to any particular design or structure of an LED light source. According to some embodiments, LED sources 32 may include a single LED or LED package. According to some embodiments, LED sources 32 may incorporate multiple LEDs or LED packages which may further be arranged into one-dimensional of two-dimensional arrays. According to an embodiment schematically illustrated in FIG. 40, LED source 32 is exemplified by an LED package 910 that includes a two-dimensional array of light emitting diodes (LEDs).

LED package 910 has a rigid broad-area substrate plate 952, an encapsulation layer 956 having a rectangular shape and covering a portion of the surface of plate 952, a plurality of LEDs attached to substrate plate 952 and distributed over an area covered by encapsulation layer 956, and a pair of electrical contacts 955. The plurality of LEDs is exemplified by a two-dimensional planar array of small-size LEDs chips 950 arranged in rows and columns and spaced apart from each other by a spacing distance $S_c$. Encapsulation layer 956 defines a light emitting aperture 902 of LED package 910 having an effective width $W_p$. Since each LED chip 950 represents an individual elementary light emitting diode, such LED chips 950 may thereinafter be also referred to as light emitting diodes 950 or LEDs 950. According to one embodiment, LED package 910 has a general structure of a multi-chip-on-board (MCOB) LED device. According to one embodiment, LED package 910 has a general structure of a surface mount (SMD) LED device.

LED package 910 is shown with nine LED chips 950 arranged in three rows and three columns, but it should be understood that fewer or more LED chips can be included into the package and that such LED chips may be arranged in fewer or more rows and/or columns. According to one embodiment, the two-dimensional LED array includes at least two linear arrays of LED chips 950. According to one embodiment, the two-dimensional LED array includes at least three linear arrays of LED chips 950. According to one embodiment, the two-dimensional LED array includes at least four linear arrays of LED chips 950.

According to various embodiments, width $W_p$ is greater than 0.5 mm, greater than 1 mm, greater than 2 mm, greater than 3 mm, greater than 4 mm, greater than 5 mm, and greater than 6 mm. According to one embodiment, width $W_p$ is greater than 1 mm and less than or approximately equal to 10 mm. According to one embodiment, width $W_p$ is greater than 3 mm and less or approximately equal to 15 mm. According to various embodiments, width $W_p$ is less than 1 mm, less than 0.5, less than 0.2 mm, and less than 0.1 mm. According to one embodiment, spacing distance $S_c$ is between 0.1 mm and 1 mm. According to one embodiment, spacing distance $S_c$ is between 0.5 mm and 5 mm.

Substrate plate 952 is made from one or more highly thermally conductive materials and has a reflective surface 958 at least in areas surrounding LED chips 950. It is preferred that the entire area portion of substrate plate 952 that is covered by encapsulation layer 956 is reflective. Surface 958 preferably has a high hemispherical reflectance (at least 50%, more preferably greater than 70%, even more preferably greater than 80%, and still even more preferably greater than 85%). In one embodiment, surface 958 is mirrored and configured for a primarily specular reflection. In one embodiment, surface 958 is configured for a primarily diffuse reflection. In one embodiment, surface 958 is configured to have a combination of specular reflection and diffuse reflectivity.

Figure 41:
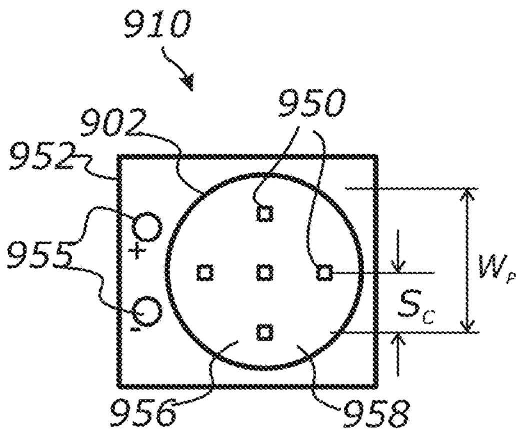
FIG. 41 is a schematic view of an LED package employing a two-dimensional array of light emitting diodes within a round light emitting aperture, according to at least one embodiment of the present invention.

FIG. 41 schematically shows an alternative exemplary configuration of LED package 910 having round light emitting aperture 902 and a two-dimensional array of five LED chips 950 inscribed into such round aperture. The number of LED chips 950 and their arrangement within such round aperture are exemplary and should not be construed as limiting possible configurations of LED package 910 in any way.

Figure 42:
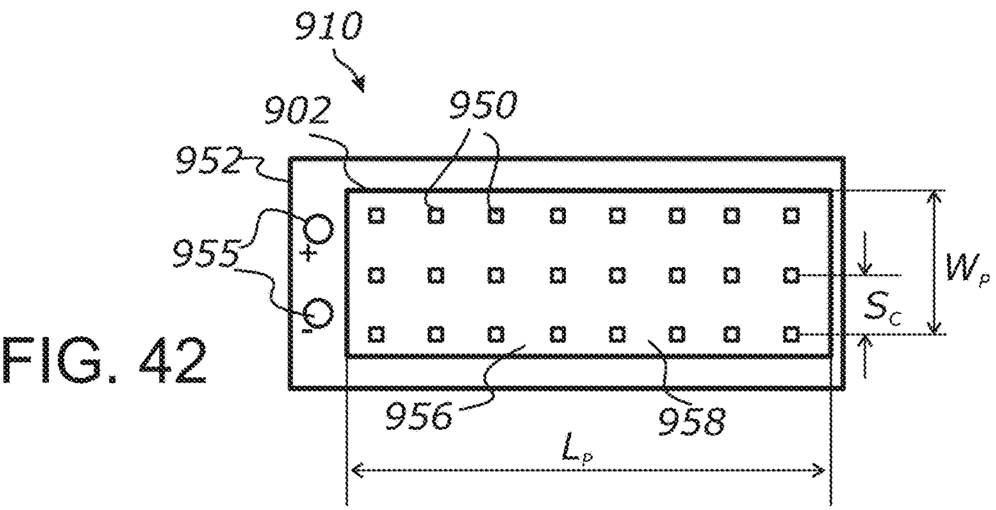
FIG. 42 is a schematic view of an LED package employing a two-dimensional array of light emitting diodes within a rectangular light emitting aperture having a length dimension substantially greater than a width dimension, according to at least one embodiment of the present invention.

FIG. 42 schematically shows yet another exemplary configuration of LED package 910 having rectangular dimensions of substrate 952 and encapsulation layer 956 in which a length dimension $L_p$ is substantially greater tha width dimension $W_p$.

Figure 43:
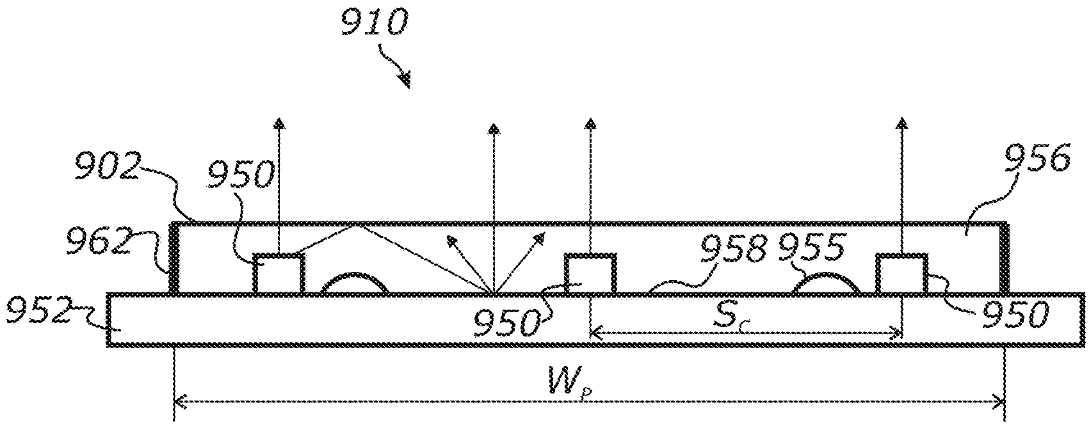
FIG. 43 is a schematic cross-section view and raytracing of an LED package employing a two-dimensional array of light emitting diodes, according to at least one embodiment of the present invention.

FIG. 43 shows a schematic cross-section view of LED package 910 in a plane parallel to width dimension $W_p$. Encapsulation layer 956 has a thickness that is greater than the height of individual LED chips 950 and is configured to encapsulate all of such LED chips assembled on the common substrate plate 952 by covering the exposed sides of the respective LED dies.

Encapsulation layer 956 encapsulates the entire array of LED chips 950. It is preferably made from a heat-resistant, optically transmissive dielectric material such as silicone, epoxy compound, or the like. Layer 956 may also include light scattering particles or a phosphor (luminescent material) used to change the light emission spectrum. For example, LED chips 950 may be configured to emit a blue light and a YAG phosphor may be employed to convert such blue light to a white light. The phosphor material may be mixed with silicone or other material that forms the encapsulation layer 956. Encapsulation layer 956 and/or the phosphor may be deposited directly over LED chips 950 in a liquid form, for example, by spraying, dispensing, or other suitable means. Encapsulation layer 956 and/or the phosphor may also be preformed as a molded piece or a sheet and then applied to surface 958 so as to cover and encapsulate LED chips 950. One or more individual LED chips 950 may be coated with a phosphor material configured to absorb at least some of light emitted by such LED chips and to re-emit at least a portion of the absorbed light in a different wavelength. LED package 910 may be further provided with one or more reflective surfaces 962 that are flanking encapsulation layer 956 and prevent light leakage through the sides of the layer.

Besides providing the encapsulation function and optionally wavelength conversion, encapsulation layer 956 may be configured to work cooperatively with reflective surface 958 to recycle light that is emitted by LED chips 950 at high angles with respect to a prevailing plane of the LED package 910. It may be appreciated that such high-angle off-axis rays may undergo TIR at an optical interface between layer 956 and a lower-n outside medium (e.g., air). Accordingly, as illustrated in FIG. 43, such light rays may be scattered and reflected by surface 958 back towards the light emitting surface thus minimizing optical losses.

The optical transmittance and light scattering properties of encapsulation layer 956 may be adjusted to allow for light propagation over a considerable distance horizontally through the layer in a waveguide mode before being emitted from light emitting aperture 902. In turn, this may cause at least some light emitted by a particular LED chip 950 to reach areas of one or more adjacent LED chips 950. In other words, two or more LED chips 950 may be disposed in optical communication with one another so that one LED chip 950 may receive at least some light emitted by another LED chip 950. Although in this case some of the light emitted by one LED chip may be absorbed by the adjacent LED chips, the respective light loss may be fairly small when the size of LED chips is much less than spacing distance $S_c$. According to one embodiment, the size of LED chips 950 is less than 0.3 times the spacing distance $S_c$, more preferably less than 0.2 times the spacing distance $S_c$, and may be less than 0.1 times the spacing distance $S_c$. LED chips 950 may be interconnected in series, in parallel or a combination thereof.

Substrate plate 952 may have a layered structure and include heat spreading layers, reflective layers, printed circuit boards (PCB), electrically insulating layers, electro conductive layers, structural layers, and any other types of layers.

The two-dimensional array of LED chips 950 may be formed by an ordered arrangement of one or more linear arrays of LED chips 950 disposed parallel or at an angle with respect to each other. However, other arrangements of LED chips 950 may be used for LED package 900. LED chips 950 may be distributed over a surface of the light emitting aperture according to any other suitable pattern. For example, they may be distributed according to a random pattern. If LED chips 950 have rectangular dimensions, they may also have random orientations relatively to each other in the two-dimensional array or arrangement.

Figure 44:
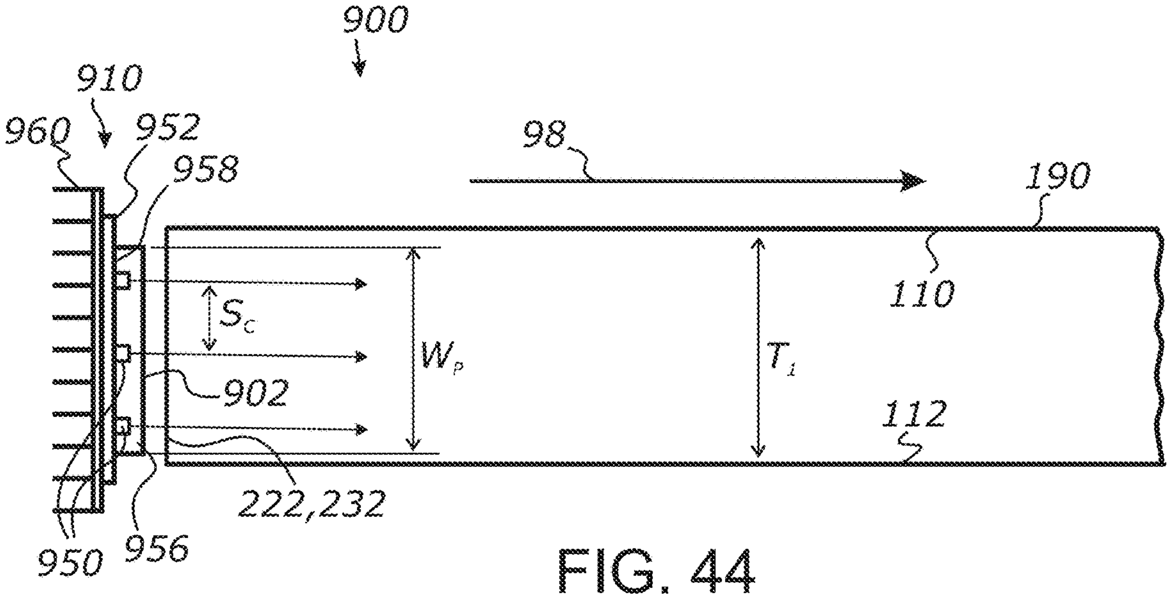
FIG. 44 is a schematic cross-section view and raytracing of an edge-lit waveguide illumination system, showing a multi-chip LED package optically coupled to an edge of a planar waveguide, according to at least one embodiment of the present invention.

Face-lit waveguide illumination system 900 may include one of more LED packages 910 which may have the same or different sizes and structures. At least one LED package 910 may be coupled directly to an edge of waveguiding substrate 190. This is illustrated in FIG. 44 which schematically shows an embodiment of waveguide illumination system 900 employing waveguiding substrate 190 and LED package 910 optically coupled to light input edge 222. The array of LEDs 950 represents a plurality of discrete miniature light sources distributed over an area of light input surface 232 of waveguiding substrate 190. On the other hand, the plurality of LEDs 950 together with reflective surface 958 and encapsulation layer 956 within LED package 910 cooperatively form a distributed light source having planar light emitting aperture 902. According to one embodiment, waveguide illumination system 900 may incorporate a single LED package 910 which covers a relatively small portion of surface 232, a relatively large area of the surface, or substantially the entire surface 232.

Waveguide illumination system 900 may have multiple packages 910 distributed over an area of surface 232 (edge 222). Providing additional LED packages 910 along the length of light input edge 222 may form a relatively large two-dimensional array of LEDs distributed over a surface of the light input edge, resulting in increased overall light input into waveguiding substrate 190 compared to the case of using a single LED package 910. Furthermore, other edges of waveguiding substrate 190 may be also provided with one or more LED packages 910. According to one embodiment, two opposing edges of waveguiding substrate 190 are provided with LED packages 910. In one embodiment, LED packages 910 may be arranged along the entire perimeter of waveguiding substrate 190 and may be optically and/or mechanically coupled to the respective edges in any suitable manner.

LED package 910 and waveguiding substrate 190 are dimensioned such that light input surface 232 intercepts at least a substantial portion of light emitted by the array of LED chips 950, and more preferably intercepts substantially all of the light emitted by the array of LED chips 950 and/or light emitting aperture 902. Portions of edges of waveguiding substrate 190 that are not covered by LED light emitting apertures 902 of LED packages 910 may be covered by a reflective material that reflects light emerging from the edges and returns such light back to the waveguiding substrate.

As illustrated further in FIG. 44, LED package 910 may be provided with a heat sink 960 used to dissipate heat generated by LED chips 950. Such heat sink may have any suitable configuration and may include protruding fins to increase its surface area. An air-circulating fan may also be provided in connection with heat sink 960 to enhance heat dissipation. In one embodiment, a heat sink is provided for each LED package 900. In one embodiment, multiple LED packages 910 are distributed over the entire extent of edge 222 (surface 232) in which case heat sink 960 may be represented by an extruded aluminum channel or a more complex extruded profile to which multiple LED packages 910 are attached.

According to one embodiment, spacing distance Sc between individual LED chips 950 is less than thickness $T_1$ of waveguiding substrate 190. According to one embodiment, width $W_p$ of light emitting aperture 902 is less than thickness $T_1$ of waveguiding substrate 190. According to one embodiment, the plurality of LED chips 950 is formed by one more linear arrays extending parallel to the light input edge of waveguiding substrate 190, wherein an average distance between such linear arrays is less than a thickness of the waveguide.

At least one encapsulated LED chip 950 of LED package 910 may be disposed in registration with an upper half portion of light input surface 232 and at least one encapsulated LED chip 950 may be disposed in registration with a lower half portion of light input surface 232. When LED package 910 has multiple LEDs 950 in each row, two or more LEDs 950 may be disposed in registration with an upper half portion of light input surface 232 and at two or more LEDs 950 may be disposed in registration with a lower half portion of light input surface 232. Light beams emitted by different LEDs 950 of LED package 910 and injected into waveguiding substrate 190 at different locations of light input surface 232 may be effectively mixed within the waveguide by overlapping on one another within the substrate. Multiple reflections of portions of such light beams within the waveguide by means of TIR may further enhance beam mixing and ensure that the resulting light beam propagating trough waveguiding substrate 190 is homogenous in terms of color and intensity even if there are some color and/or brightness variations between individual LEDs 950 within LED package 910.

As further illustrated in FIG. 44, a small air gap may be provided between the light emitting aperture or surface 902 and light input edge 222. This may be particularly useful for thermal isolation of LED package 910 from waveguiding substrate 190. For example, if the temperature of encapsulation layer 956 reaches values beyond the service range of the material of waveguiding substrate 190, such air gap may advantageously be utilized to minimize the heat transfer from LED package 910 to the substrate and thus limit heating of the substrate's material.

Light rays that are emitted by LEDs 950 and initially reflected by the outer surface of encapsulation layer 956 may be recycled using reflective surface 958, as discussed in reference to FIG. 43, and directed towards light input edge 592. Accordingly, light input surface 232 may be configured to receive both the direct light emitted by the array of LEDs 950 and indirect light reflected from surface 958.

Reflective surface 958 may occupy a significant fraction of the area of LED package 910. Such reflective surface 958 may also be configured to receive light emerging from waveguiding substrate 190 and reflect it back to the waveguide. Such light may be emitted, for example, by other LED packages 910 illuminating an opposing edge of waveguiding substrate 190. When multiple LED packages 910 are used, a plurality of reflective surfaces corresponding to such LED packages may be disposed in energy receiving relationship with respect to waveguiding substrate 190 and used to effectively recycle light within the substrate. According to various embodiments, the cumulative area of one or more LED packages 910 coupled to edge 222 is at least 10%, at least 20%, at least 30%, at least 50% or at least 70% of the total area of light input surface 232.

Direct light rays emitted by the array of LED chips 950 and indirect light rays reflected by surface 958 superimpose on one another and are emitted from light emitting aperture 902 of LED package 910. Light emitted from light emitting aperture 902 is received on the light input surface 232 of waveguiding substrate 190 and is guided towards an opposing edge in response to optical transmission and TIR.

Light beam emitted by an individual LED chip 950 may be characterized by a Full Width Half-Maximum (FWHM) angle being an angle of the emission cone at which the intensity of emitted light is half the peak intensity along the optical axis. According to one embodiment, the FWHM emission cones characterizing light beams of individual LED chips overlap or intersect with one another within the body of waveguiding substrate 190. According to one embodiment, spacing distance $S_c$ is substantially less than a distance from LED chips 950 to light input surface 232 so that the direct light beams emitted by adjacent LED chips 950 generally superimpose on one another within the body of waveguiding substrate 190.

Figure 45:
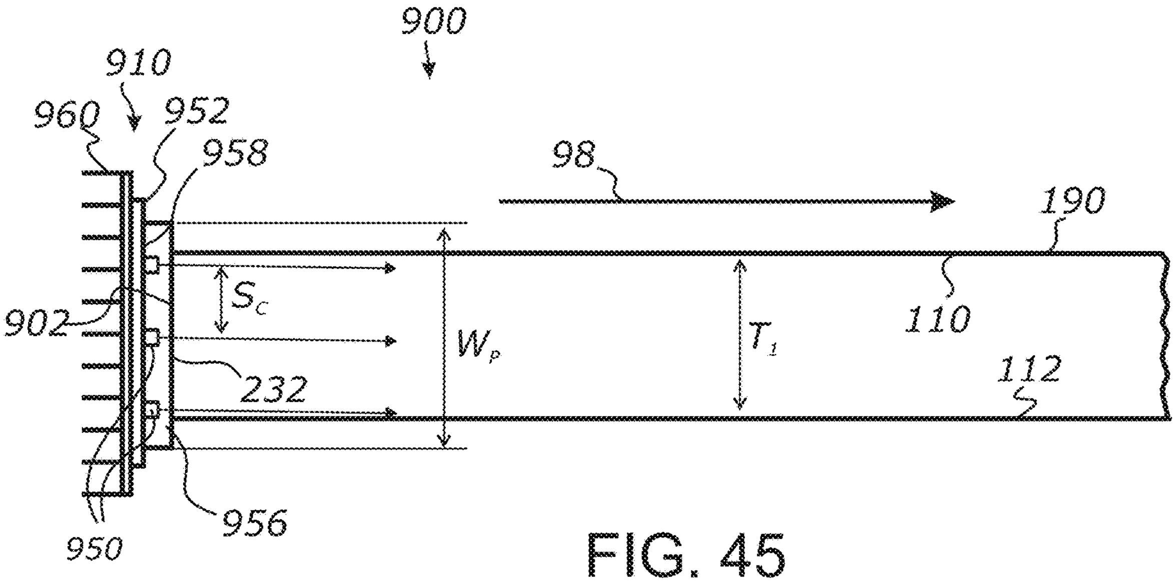
FIG. 45 is a schematic cross-section view and raytracing of an edge-lit waveguide illumination system, showing a multi-chip LED package having a light emitting aperture which size is greater than a thickness of a waveguide, according to at least one embodiment of the present invention.

When the material of waveguiding substrate 190 can tolerate elevated temperatures expected for the external surface of encapsulation layer 956, such encapsulation layer 956 may be disposed in an immediately adjacent position to surface 232 and may also be attached to such surface so as to form a good optical contact. Furthermore, encapsulation layer 956 may be bonded to light input surface 232 to completely eliminate the air gap and provide an enhanced optical coupling of LEDs 950 to waveguiding substrate 190 (FIG. 45). In one embodiment, encapsulation layer 956 itself may be used to provide a suitable bond between surface 232 and encapsulation layer 956. In one embodiment, an additional layer of optically transmissive adhesive or encapsulant may be provided between encapsulation layer 956 and surface 232 to form such bond and gapless optical coupling.

According to one embodiment, Width $W_p$ of light emitting aperture 902 is greater than thickness $T_1$ of waveguiding substrate 190 while a distance between the uttermost LED chips 950 in the array in a plane that is perpendicular to surfaces 110 and 232 is less than thickness $T_1$ (FIG. 45). Such arrangement may be advantageously selected for some exemplary cases when minimizing the thickness of waveguiding substrate 190 for a given size of LED package 910 is desired even if at the expense of some loss of peripheral rays emitted from light emitting aperture 902. In such cases, light input edge 222 may be positioned such that surface 232 of the edge covers only the portion of light emitting aperture 902 that includes LED chips 950 while leaving peripheral areas of the light emitting aperture 902 uncovered by the edge. Even though such arrangement may result in some light loss, such light loss may be fairly small considering that most light emitted by LED package 910 is emanated from the area occupied by the array of LED chips 950, as is further illustrated in FIG. 45.

According to at least some embodiments, LED chips 950 may be arranged into groups such that one group of LED chips 950 is disposed in registration and optically coupled to one optical element and another group of LED chips 950 is disposed in registration and optically coupled to another optical element. Each group may have one, two or more LED chips 950.

Figure 46:
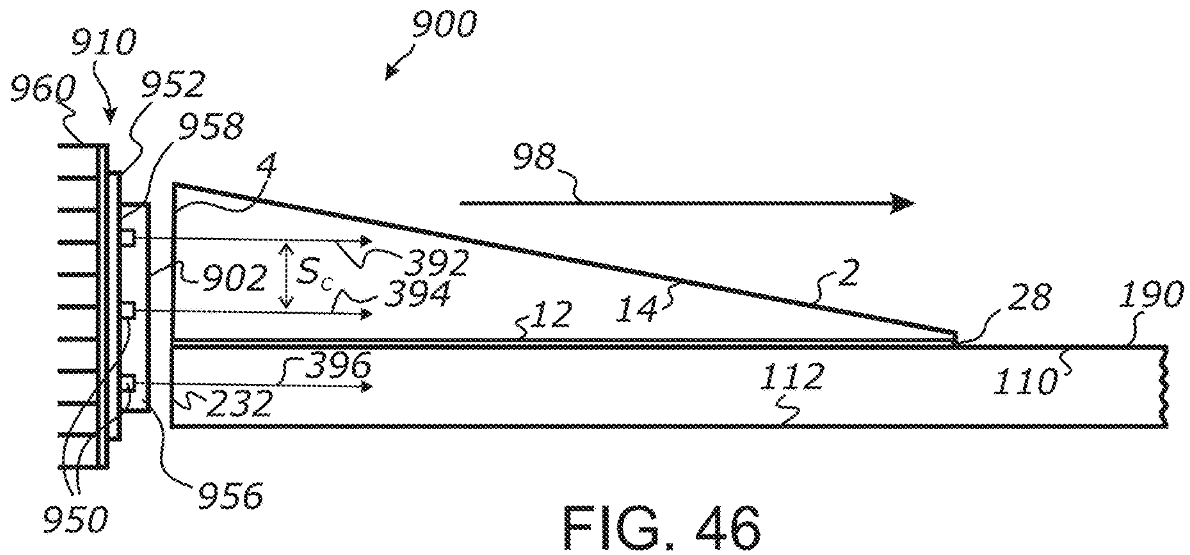
FIG. 46 is a schematic cross-section view and raytracing of a waveguide illumination system, showing a plurality of LEDs optically coupled to an edge of a planar waveguide and further showing a plurality of LEDs optically coupled to light input surface of a light guiding optical element attached to a surface of the planar waveguide, according to at least one embodiment of the present invention.

FIG. 46 illustrates an embodiment of waveguide illumination system 900 in which top two rows of a two-dimensional array of LED chips 950 are disposed in registration with and is optically coupled to light input face 4 of light coupling element 2 (a first optical element) while a bottom row of the same LED array is disposed in registration with and is optically coupled to light input surface 232 of waveguiding substrate 190 (a second optical element). According to an aspect of such embodiment, a first group of LED chips 950 (the top two rows) of LED package 910 is configured to illuminate only light input face 4 of light coupling element 2 and a second group of LED chips 950 (bottom row) of the same LED package is configured to illuminate only an edge of waveguiding substrate 190 (surface 232).

In operation, light beams emitted by different groups of light emitting diodes 950 in the array are mixed within the light guiding body formed by waveguiding substrate 190 and light coupling element 2 and are further propagated through waveguiding substrate 190 towards its opposing end or edge. It may be appreciated that such mixing of the respective light beams may effectively smooth out any color variations that may exist among LEDs 950 and provide an improved color uniformity for light emitted by system 900.

Depending on the relative thickness of waveguiding substrate 190 and light coupling element 2, different proportions between the numbers of LED chips 950 that illuminate light input faces 4 and 232 be realized. According to one embodiment, the number of LED chips 950 illuminating face 4 is greater than the number of LED chips 950 illuminating surface 232. Such arrangement may particularly be suitable for the cases where a thickness of light coupling element 2 at its base ($T_2$ parameter) is greater than thickness $T_1$ of waveguiding substrate 190. In one embodiment, the number of LED chips 950 illuminating face 4 is less than the number of LED chips 950 illuminating surface 232. Such arrangement may particularly be suitable for the cases where $T_2<T_1$. In one embodiment, the numbers of LED chips 950 illuminating face 4 and surface 232 are equal.

Figure 47:
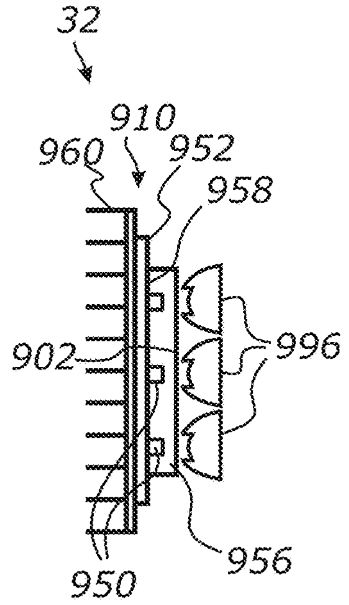
FIG. 47 is a schematic cross-section view of an illumination system, showing a plurality of encapsulated LEDs optically coupled to an array of optical elements, according to at least one embodiment of the present invention.

Further implementations of LED sources 32 employed in face-lit waveguide illumination systems 900 may include various chip-level collimating optics. FIG. 47 schematically shows an exemplary embodiment of LED source 32 employing LED package 910 of FIG. 46 and further having an array of light-collimating optical elements 996 disposed in energy receiving relationship with light emitting aperture 902 of the LED package 910. Optical elements 996 may be exemplified by many known types of optical elements employed in LED lighting devices and may include, for example, refractive lenses, TIR lenses, reflectors, lens arrays, prism arrays, and the like. Each optical element 996 is disposed in registration with a respective LED chip 950 and is configured to intercept at least a substantial portion of light emitted by the LED chip and redistribute light emitted by such LED chip. Optical elements 996 may also be provided for groups or clusters of LEDs in package 910 and may also include linear optical elements configured to receive light from multiple LEDs 950 arranged along a line or a narrow band.

Figure 48:
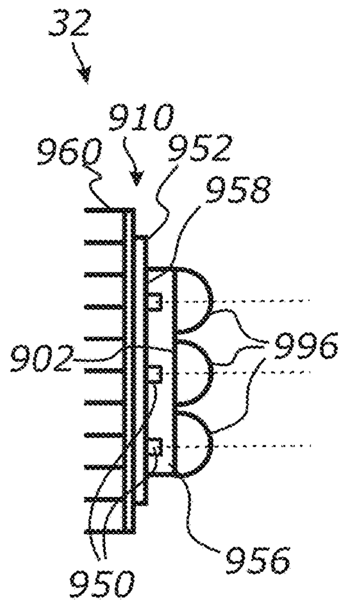
FIG. 48 is a schematic cross-section view of an illumination system, showing a plurality of encapsulated LEDs optically coupled to a lens array, according to at least one embodiment of the present invention.

FIG. 48 schematically shows a further exemplary embodiment of LED source 32 in which optical elements 996 are represented by spherically shaped refractive lenses incorporated into a lens array. Each lens is disposed in registration with individual LED 950 so that the centers of LEDs 950 and lenses 996 are disposed along lines perpendicular to a prevailing plane of light emitting aperture 902. In one embodiment, lenses 996 may be characterized by an optical axis that is aligned with respect to light emitting apertures of individual LEDs 950. In one embodiment, lenses 996 may be characterized by a focal area and LEDs 950 may be disposed within or in a close proximity to such focal area. In one embodiment, an array of lenses 996 may be formed as a separate layer disposed on top of encapsulation layer 956. In one embodiment, such lens array may be formed directly from the material of encapsulation layer 956 and may be an integral part of the encapsulation layer. Each lens 956 disposed in optical alignment with the respective LED 950 may be configured to intercept at least a substantial portion of the light beam emanated by the LED and collimate such beam by providing a narrower angular spread for it.

The applications of light coupling elements 2 of the present invention are not limited to planar surfaces or sheet-form substrates. According to various embodiments, one or more light coupling elements 2 may be attached to a surface of waveguiding substrates or bodies that have three-dimensional shapes.

Figure 49:
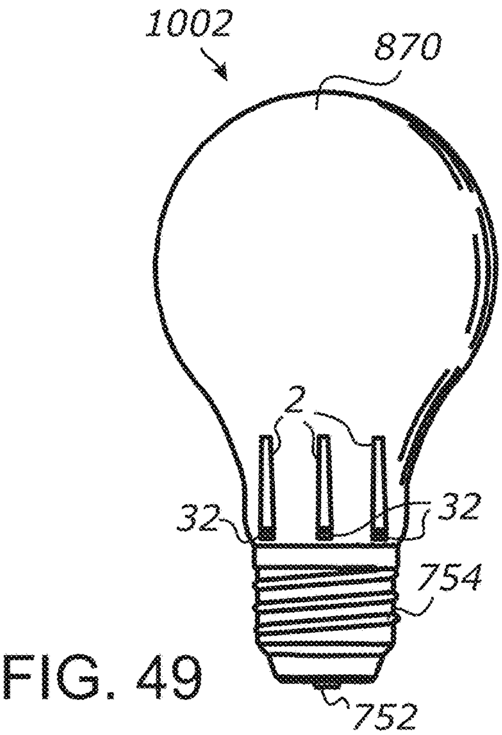
FIG. 49 is a schematic view of a face-lit waveguide illumination system having the form of a light bulb, according to at least one embodiment of the present invention.

FIG. 49 schematically shows an embodiment of a face-lit waveguide illumination system that is configured as a light bulb 1002 and can be used essentially in the same or similar way as conventional bulbs. Light bulb 1002 includes an enclosure 870 representing a bulb-shaped hollow body of an optically transmissive glass or plastic material. Light bulb 1002 also has a base configured to be used with conventional light bulb socket and having a threaded sleeve contact 754 and a bottom contact 752. It further has an array of LEDs 32 distributed over a perimeter of enclosure 870 near the base and a matching array of light coupling elements 2 shaped in the form of tapered rods or highly extended oblique truncated pyramids.

Light coupling elements 2 are configured to couple light emitted by LEDs 32 into the light-transmissive enclosure 870 which also acts as a waveguide distributing the coupled light over its 3D surface. Enclosure 870 is configured to provide a controlled light extraction from the waveguiding mode of light propagation and emit light into all directions from its surface. For this purpose, enclosure 870 can be provided with the appropriate surface microstructures or light scattering particles embedded into its material. Contacts 752 and 754 can be configured to energize the array of LEDs 32 when light bulb 1002 is screwed into the energized socket. Accordingly, the light guiding LED light bulb 1002 can be configured to illuminate space in the same manner as conventional incandescent, CFL or LED bulbs while providing the benefits of a waveguide-based bulb structure.

Similarly, light coupling elements 2 may be attached to waveguiding substrates having many other types of three-dimensional shapes formed by light-transmitting materials and can be used to inject light into such three-dimensional substrates. The above-described optical structures and principle of light injection through a surface of the transparent or translucent material can be adapted to illuminate 3D-surfaces of lighting luminaires and various common objects, including household goods. For example, one or more light coupling elements 2 may be attached to an external surface of a glass bottle and adapted to illuminate such bottle from the inside of the glass material using one or more LEDs 32 coupled to respective elements 2.

Furthermore, the same or similar principles as described above can be applied to illuminate various 2-dimentional or 3-dimentional objects using a thin light-guiding coating and appropriately designed light coupling elements 2 attached to a surface of such coating. This is illustrated further in reference to FIG. 50 which shows a conformal light guiding coating 99 over a solid object 1022.

Solid object 1022 may represent almost any common object that has a broad-area surface and which needs to be illuminated. In non-limiting examples, object 1022 may exemplify a surface portion of an advertising or information display, car dashboard or trim, furniture, appliances, electronic equipment, hand tools, toys, apparel, artistic shapes or sculptures, interior or exterior trim of buildings, decorative elements in a store, restaurant or bar, etc. Solid object 1022 may also represent various flexible items such as films or cloths.

Solid object 1022 can be opaque and have a textured surface 533. Surface 533 may be painted in various colors and may also contain various suitable indicia, images or patterns that can be illuminated. However, it is noted that such properties of object 1022 are not prescriptive and that the embodiment of FIG. 50 may be adapted for other cases, for example where object 1022 is transparent or translucent and/or where surface 533 is smooth. Surface 533 can be substantially planar or curved in one or more dimensions.

Coating 99 has a first cladding layer 542, a light guiding layer 544 and optionally a second cladding layer 546. Cladding layers 542 and 546 are formed by low-refractive-index material, preferably having n in the 1.33-1.42 range. Suitable materials for layers 542 and 546 include but are not limited to fluoropolymers and low-index silicones. Layer 544 is formed by a medium-to high-refractive index material which also has good optical clarity suitable for guiding light to distances that are at least 50-100 times greater than the prevailing thickness of the layer. Suitable materials for layer 544 include but are not limited to acrylic polymers ($n \approx 1.49$), polyesters ($n \approx 1.67$), polyurethanes ($n \approx 1.49$-$1.63$), PVC, as well as various optically clear lacquers and varnishes.

Layers 542, 544 and optionally 546 may be sequentially formed by coating surface 533 using any suitable technique, including but not limited to dip coating, spray coating, roller coating, spread coating, inkjet printing, and the like. The thickness and viscosity of layer 542 may be selected to at least partially smooth out the micro-scale roughness of surface 533. At the same time, layer 542 may be made conformal and configured to generally preserve macroscopic relief features of surface 533. Likewise, layers 544 and 546 may also be configured to at least partially preserve such macroscopic surface relief features.

Light coupling element 2 is attached to an outer surface of light guiding layer 544 with a good optical contact with refractive index matching. For this purpose, the respective surface portion of layer 544 should be left free from the top cladding layer 546 (if any). LED 32 is positioned in a close proximity to light input face 4 of light coupling element 2 and may also be optionally attached to such face and/or optically coupled to such face using an index matched adhesive.

Surface 533 may have a curved shape in which case it may be preferred that light coupling element 2 is attached to a portion of surface 533 that is planar or has the smallest curvature along the intended direction of light injection. Alternatively, light coupling element 2 may be curved to conform to the shape of surface 533. An opaque housing 536 may optionally be provided to block stray light that may emerge from light coupling element 2 and LED 32. Such opaque housing may have the shape of an enclosure that is attached to the surface of solid body 1022 and completely encloses light coupling element 2 and/or LED 32.

In operation, a light ray 1028 emitted by LED 32 is injected by light coupling element 2 into layer 544 causing it to propagate along surface 533 in response to optical transmission and TIR. Cladding layer 542 providing a stepped drop in refractive index outwardly from layer 44 ensures that ray 1028 does not prematurely contact surface 533. Optional cladding layer 546 protects the outer surface of light guiding layer 544 from contaminations or contacting other objects that may suppress TIR and result in premature decoupling ray 1028 from the light guiding layer.

Light guiding layer 544 is configured to progressively extract light from its body. For this purpose, various light extraction features may be provided. By way of example, light extraction may be enabled by surface texturing the surface of layer 544 or incorporating light scattering or light-deflecting particles into the material of layer 544. In another example, small dots of light-scattering paint may be sprayed, printed, or otherwise deposited onto the outer surface of layer 544.

A residual surface texture or light waviness of layer 544 resulting from the texture of underlying surface 533 may also contribute to progressive light decoupling and may even be sufficient for extracting substantially all of the injected light without any light extracting features. Furthermore, the material of layer 544 may be configured to have a sufficient natural haze resulting in light scattering along the propagation path and eventual decoupling from the layer. The residual surface texture and material haze may also work concurrently to progressively extract light from layer 544.

Figure 50:
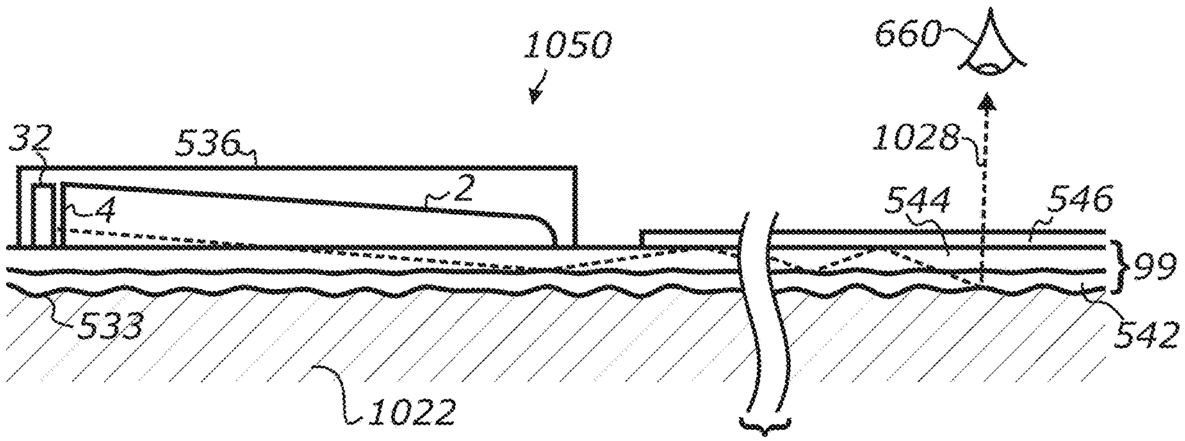
FIG. 50 is a schematic view of a face-lit waveguide illumination system, showing light injection into a light-guiding surface coating, according to at least one embodiment of the present invention.

Light extraction is further illustrated in FIG. 50 showing light ray 1028 exiting from layer 544 into layer 542 and striking surface 533. Ray 1028 is further reflected or scattered from surface 533 and is directed to a viewer's eye 660. Accordingly, system 1050 of FIG. 50 may be configured to illuminate surface 533 revealing its color, imagery and/or texture, as applicable, and may further provide space illumination, especially when surface 533 have a relatively high reflectance.

One or more light coupling elements 2 and respective LEDs 32 may be attached at any suitable locations of surface 533. Multiple pairs of light coupling elements 2 and LEDs 32 may be arranged into one-dimensional or two-dimensional arrays across the surface. Opaque housing 536 may be provided for each pair of light coupling elements 2 and LEDs 32 to block glare that may be emanated from such LED 32 and/or light coupling elements 2. Alternatively, a single opaque housing may be provided to cover multiple pairs of LEDs 32 and light coupling elements 2.

The overall thickness of conformal illumination coating 99 can be made fairly small. According to different embodiments, such thickness can be less than 0.5 mm, less than 0.25 μm, less than 100 μm, less than 50 μm, end even less than 25 μm. At such low thicknesses, coating 99 may be conformably applied to objects or surfaces having relatively delicate surface features or sharp bends. For example, surface-illuminating conformal coating 99 may be applied to a three-dimensional object and the entire surface of such object may be illuminated from a single location (e.g., one side of object) by one or more pairs of light coupling elements 2 and LEDs 32. In such a case, LEDs 32 and light coupling elements 2 may be hidden from the view by positioning the respective side away from the viewer, while producing glow for a surface portion of the object that is facing the viewer.

The present invention is not limited to the cases when light is coupled into plano-parallel waveguiding substrates of the preceding embodiments and may be applied to the cases where surfaces 110 and 112 of waveguiding substrate 190 are not parallel to each other. In one embodiment, waveguiding substrate 190 may have a variable thickness across its area. In one embodiment, waveguiding substrate 190 may be configured as a wedge having a first thickness at its one end and a different thickness an opposing end having a second thickness at the opposing end. According to such embodiments, one or more light coupling elements 2 may be attached to a broad area surface of such variable-thickness or wedge-type substrate do that light may be coupled into the substrate according to the principles described above.

Figure 51:
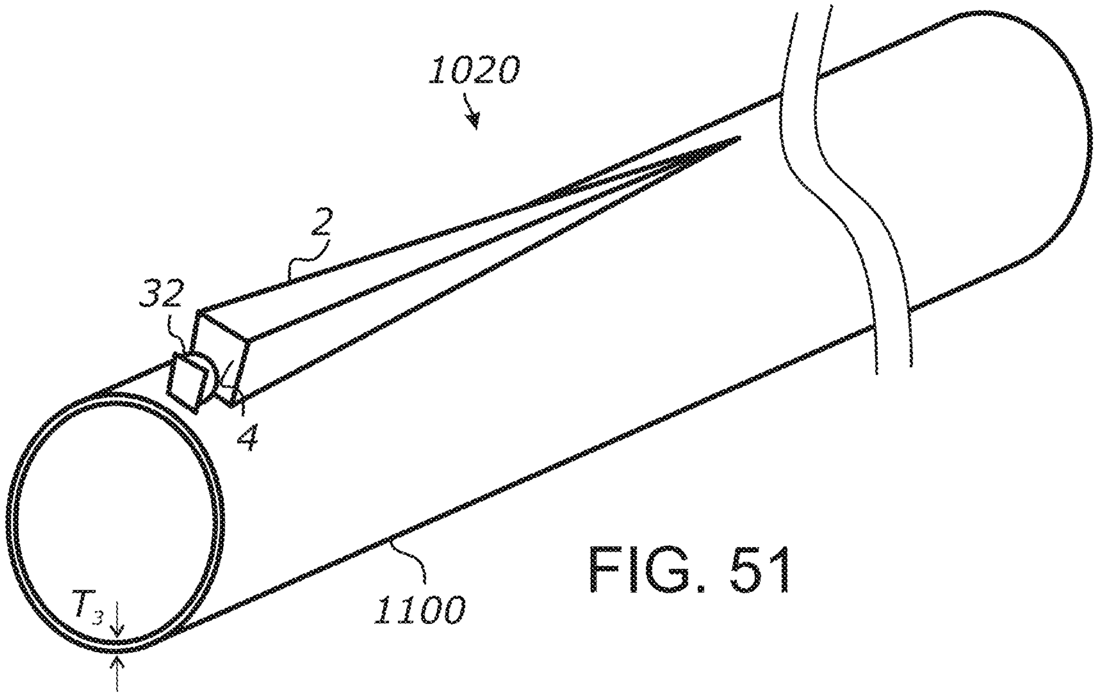
FIG. 51 is a schematic perspective view showing a light coupling element attached to a surface of a hollow cylindrical waveguide having a round cross-section, according to at least one embodiment of the present invention.

Furthermore, other types of waveguiding substrates of waveguides may be utilized such as, for example, waveguiding rods, hollow waveguides, tubular waveguides and liquid-core waveguides. An exemplary embodiment of a face-lit waveguide illumination system 1020 employing a tubular waveguide is schematically depicted in FIG. 51. A cylindrical (tubular) waveguide 1100 is formed by a thin-walled hollow cylindrical body or a pipe made from a highly transmissive optical material such as glass, acrylic, polycarbonate and the like. Tapered light coupling element 2 is attached to an outer surface of cylindrical waveguide 1100. Light coupling element 2 has a highly elongated rod-like body having a rectangular base and a taper towards the intended light propagation direction along a longitudinal axis of cylindrical waveguide 1100.

A thickness $T_3$ of cylindrical waveguide 1100 can be substantially less than the transversal dimensions (e.g., height and width) of light coupling element 2. At the same time, the length of light coupling element 2 should be sufficient to inject at least a substantial portion of light received onto its light input face 4 into the wall of waveguide 1100. Light coupling element 2 can be attached to the waveguide's surface using any suitable means provided that a good optical contact is maintained along the entire extent of the light coupling element. For example, the method described in reference to FIG. 20 and which uses a UV-curable adhesive can be adapted to attaching light coupling element 2 to a curved surface of waveguide 1100 with a good optical contact sufficient for a controlled injection of light into the waveguide.

Figure 52:
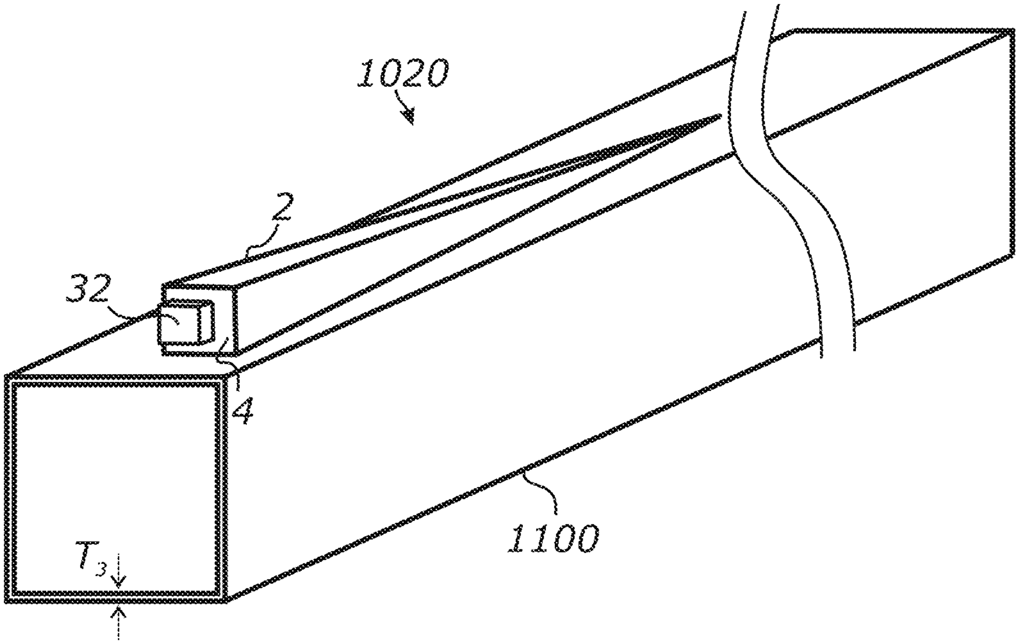
FIG. 52 is a schematic perspective view showing a light coupling element attached to a surface of a hollow cylindrical waveguide having a rectangular cross-section, according to at least one embodiment of the present invention.
Figure 53:
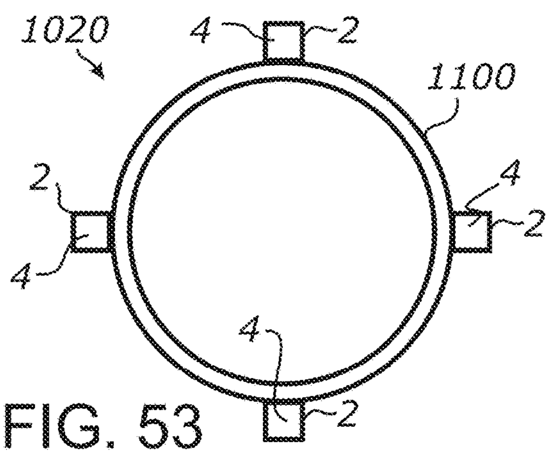
FIG. 53 is a schematic cross section view of a face-lit waveguide illumination system, showing a plurality of optical elements attached to an outer surface of a cylindrical waveguide, according to at least one embodiment of the present invention.
Figure 54:
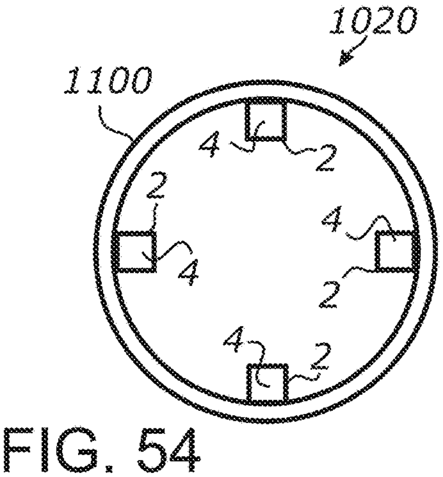
FIG. 54 is a schematic cross section view of a face-lit waveguide illumination system, showing a plurality of optical elements attached to an inner surface of a hollow cylindrical waveguide, according to at least one embodiment of the present invention.

FIG. 52 shows an alternative embodiment of tubular waveguide illumination system 1020 in which the cylindrical thin-walled waveguide 1100 has a rectangular transversal cross-section. Multiple light coupling element 2 may be attached to an outer surface of tubular waveguide 1100 (FIG. 53) or to an inner surface of the waveguide (FIG. 54).

The systems of FIG. 51-FIG. 54 may be used to transport light from one location to another. Such systems may also be used for redistributing and emitting light from a surface of the respective cylindrical body in which case light extracting elements (not shown) can be provided, for example, in the form of surface etching, micro-or nano-structuring, paint dots or patterns, light-extracting films attached to the waveguide's surface, or light-scattering particles embedded into the material of waveguide 1100. The material of tubular waveguide 1100 may also be provided with a suitable color or tint.

Face-lit waveguide illumination systems having tubular configurations of the waveguide may also be used for various applications that require illumination of the interior of a tube or pipe. One application example is a photobioreactor that employs transparent glass or plastic tubing exposed to a source of light to cultivate various phototrophic microorganisms such as algae or bacteria. Another application example is a water treatment reactor that uses UV light to disinfect or purify water or other liquids.

Figure 55:
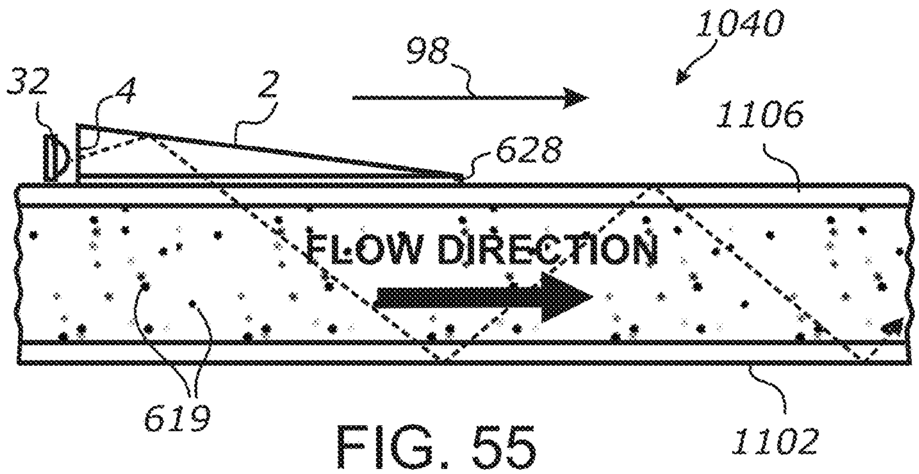
FIG. 55 is a schematic sectional view of a face-lit waveguide illumination system, showing a light coupling element attached to a surface of a fluid-carrying optically transparent pipe, according to at least one embodiment of the present invention.

FIG. 55 schematically shows an embodiment of face-lit waveguide illumination system 1040 which can be a part of such reactors. Referring to FIG. 55, light coupling element 2 is attached to a light-permeable wall of a water-carrying tube 1102. The water inside the tube has a plurality of light-absorbing centers 619 dispersed over its volume. Such light-absorption centers may be exemplified by algae or bacteria in a photobioreactor, contaminants in a waste-water treatment reactor or pathogens in a water sterilization reactor.

In operation, LED source 32 illuminates light input face 4 of light coupling element 2 with intense light. Light rays entering light coupling element 2 are initially propagated in light coupling element 2 and progressively injected into water-carrying tube 1102 while generally maintaining the prevailing propagation direction 98 which is parallel to a longitudinal axis of tapered element 2. Once such rays are injected, they can propagate within tube 1102 in response to optical transmission and TIR until fully absorbed by light absorbing centers 619.

It may be preferred that a wall 1106 of tube 1102 is sufficiently thin and optically transmissive to minimize light energy loss at each interaction of the guided light rays with such wall. If light absorbing centers 619 require to be illuminated by a specific spectral range, light coupling element 2 and tube 1102 should be made from materials that are highly transmissive in such spectral range. For example, water treatment often utilizes deep UV light with wavelengths between 200 and 300 nm which may require the use of materials such as quartz to ensure good transmission.

Multiple light coupling elements 2 may be distributed along the length of tube 1102 to obtain a cumulative irradiation effect. A plurality of light coupling elements 2 may also be distributed along tube 1102 with a predetermined spacing such that the light intensity profile along the length of the tube is relatively uniform. For this purpose, light coupling elements 2 may also be positioned such that they are facing towards one another or towards opposing directions.

Considering that water has a refractive index of about 1.33, system 1040 of FIG. 55 may be configured to minimize light trapping within the wall of tube 1102. Since tube 1102 can be made from materials such as glass or quartz having a greater refractive index than water, TIR at the interface between wall 1106 and water may potentially prevent a portion of light from entering the water-carrying interior of the tube. In order to alleviate this problem, a thin intermediate layer 628 formed by a low-index optical material can be provided between light coupling element 2 and tube 1102. Such layer 628 may also double as optical adhesive providing a secure attachment and optical contact between light coupling element 2 and tube 1102. Such low-index material should preferably have a refractive index which is approximately matched with that of water. According to one embodiment, the intermediate layer 628 has a refractive index less than 1.42 and more preferably in 0.33-0.39 range. It can be shown that such configuration may provide a controlled extraction of light from light coupling element 2 and yet further prevent light trapping in wall 1106 of tube 1102 due to TIR.

Figure 56:
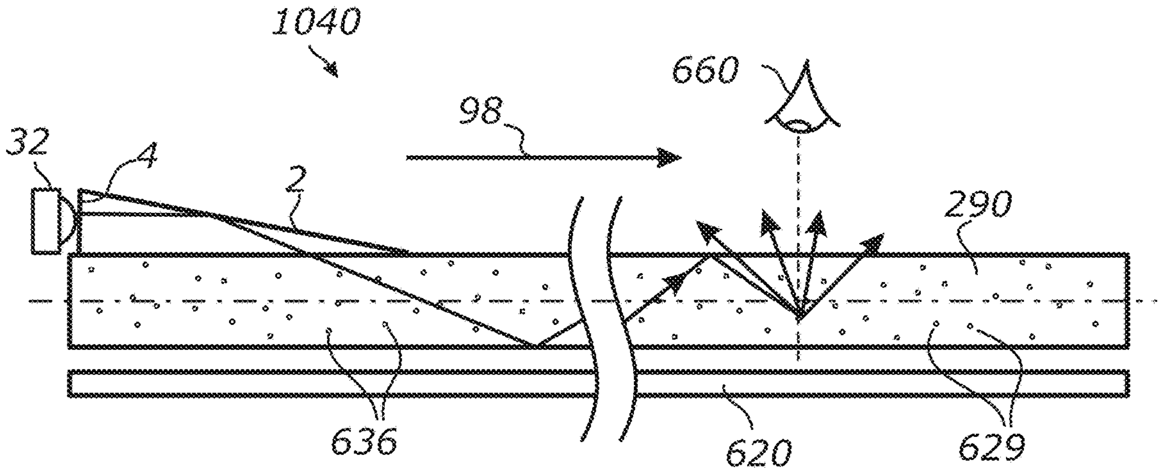
FIG. 56 is a schematic sectional view of a face-lit waveguide illumination system, showing a plurality of light scattering centers distributed through the volume of a waveguide and a reflector adjacent to a major surface of the waveguide, according to at least one embodiment of the present invention.

FIG. 56 shows an embodiment of face-lit waveguide illumination system 2 in which the optically transmissive material of waveguide 290 includes a large number of light-scattering centers 629 distributed throughout the waveguide's volume and configured to progressively extract light from the waveguide towards a viewer 660. A reflector 620 may be provided to reflect and recycle light exiting from waveguide 290 towards an unintended direction. Various other types of light extracting features can also be used for extracting light from waveguide 290. Examples of such light extracting features, structures and light extracting mechanisms can be found, for example, in co-pending patent application Ser. No. 13/682,004 (Pub. No. US-2014-0140091-A1), herein incorporated by reference in its entirety.

Figure 57:
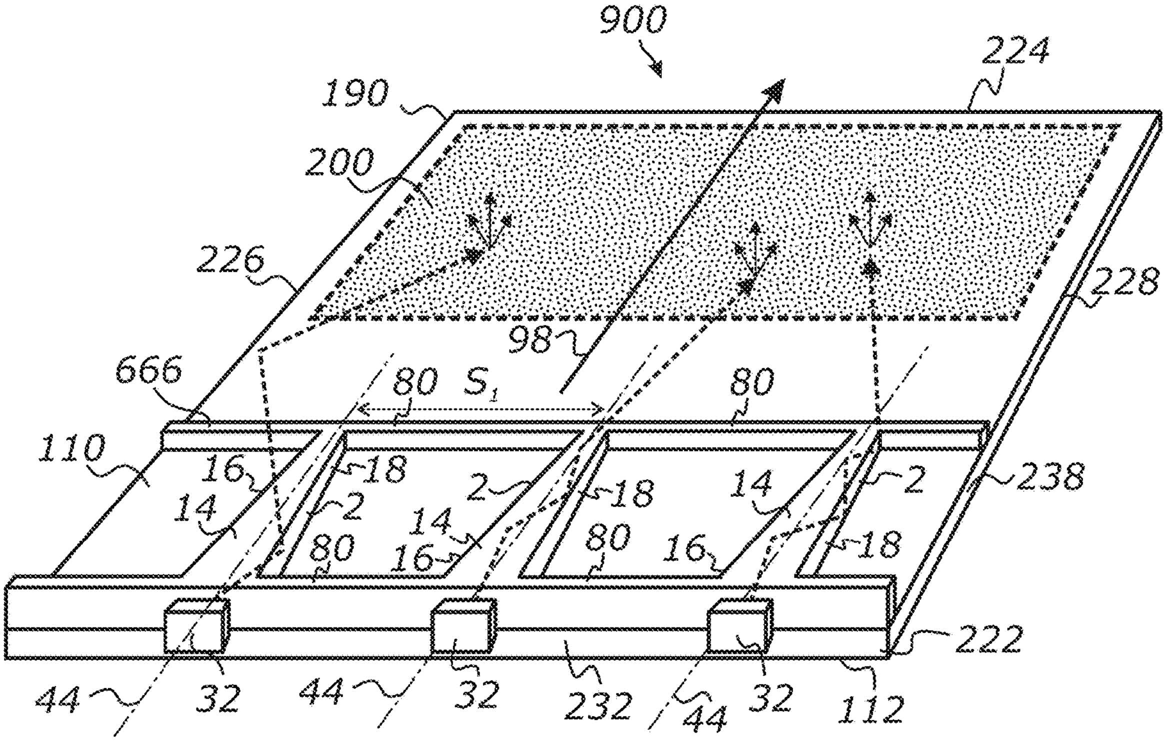
FIG. 57 is a schematic perspective view of a face-lit waveguide illumination system, showing a plurality of light coupling elements joined at their ends and attached to a broad-area surface of a waveguide, according to at least one embodiment of the present invention.

FIG. 57 schematically illustrates an embodiment of face-lit waveguide illumination system 900 in which light coupling elements 2 are joined at their terminal ends using transversal ribs 80 and form a surface-distributed light coupler 666 that is attached to surface 110 of waveguiding substrate 190. Such integrally formed light coupler 666 may be configured to operate according to the principles described above for separately formed light coupling elements 2. Transversal ribs 80 that join light coupling elements 2, may be formed from the same material as the light coupling elements. For example, light coupler 666 may be molded as a single piece or cut from a sheet of acrylic material using a $CO_2$ laser.

A matching array of LED sources 32 is optically coupled to the respective terminal ends of light coupling elements disposed between the transversal ribs 80. According to one embodiment, LED sources 32 may also be sized accordingly and positioned to illuminate surface 232 of edge 222 of waveguiding substrate 190 so that light can be input into waveguiding substrate 190 through both edge 222 and light coupling elements 2.

It may be preferred that a width of transversal ribs 80 is small enough to minimize unwanted light outcoupling through such ribs. Furthermore, for the same reasons, it may be preferred that ribs 80 are not attached to surface 110 in the same manner as light coupling elements 2 or even provided with a small air gap between the ribs and surface 110 which prevents or at least minimizes the optical contact between ribs 80 and waveguiding substrate 190. When light coupling elements 2 are attached to surface 110 with a good optical contact using an index-matched adhesive, such adhesive may be provided only for the areas occupied by light coupling elements 2 and not the areas occupied by ribs 80.

According to an aspect of the present invention, the array of light coupling elements 2 forming light coupler 666 also forms a grid of reflective surfaces (faces 16 and 18) extending parallel or near-parallel to direction 98 and perpendicular or near-perpendicular to the prevailing plane of waveguiding substrate 190. The array of light coupling elements 2 further forms a planar array of reflective surfaces (top faces 14) that are parallel to surface 110. Such reflective surfaces confine light within the respective light coupling elements 2 which are configured to receive light from an array of LED sources 32 and inject such light into waveguiding substrate 190 in response to multiple reflections of at least some light rays from at least surfaces 16 and 18 and optionally from faces 14 and surface 112.

According to one embodiment, light coupler 666 may be molded or otherwise formed from a curable transparent material (e.g., silicone or optical epoxy) directly on surface 110 of waveguiding substrate 190. According to one embodiment, light coupler 666 may formed from a slab or plate of an optically transmissive material, preferably acrylic or polycarbonate. In case of acrylic, such slab or plate may be cut by a $CO_2$ laser so as to form ribs 80 and vertical TIR surfaces 16 and 18. The cuts may be done such that light coupler 666 maintains an appearance the thickness, form factor and overall dimensions of the original plate or slab.

Figure 58:
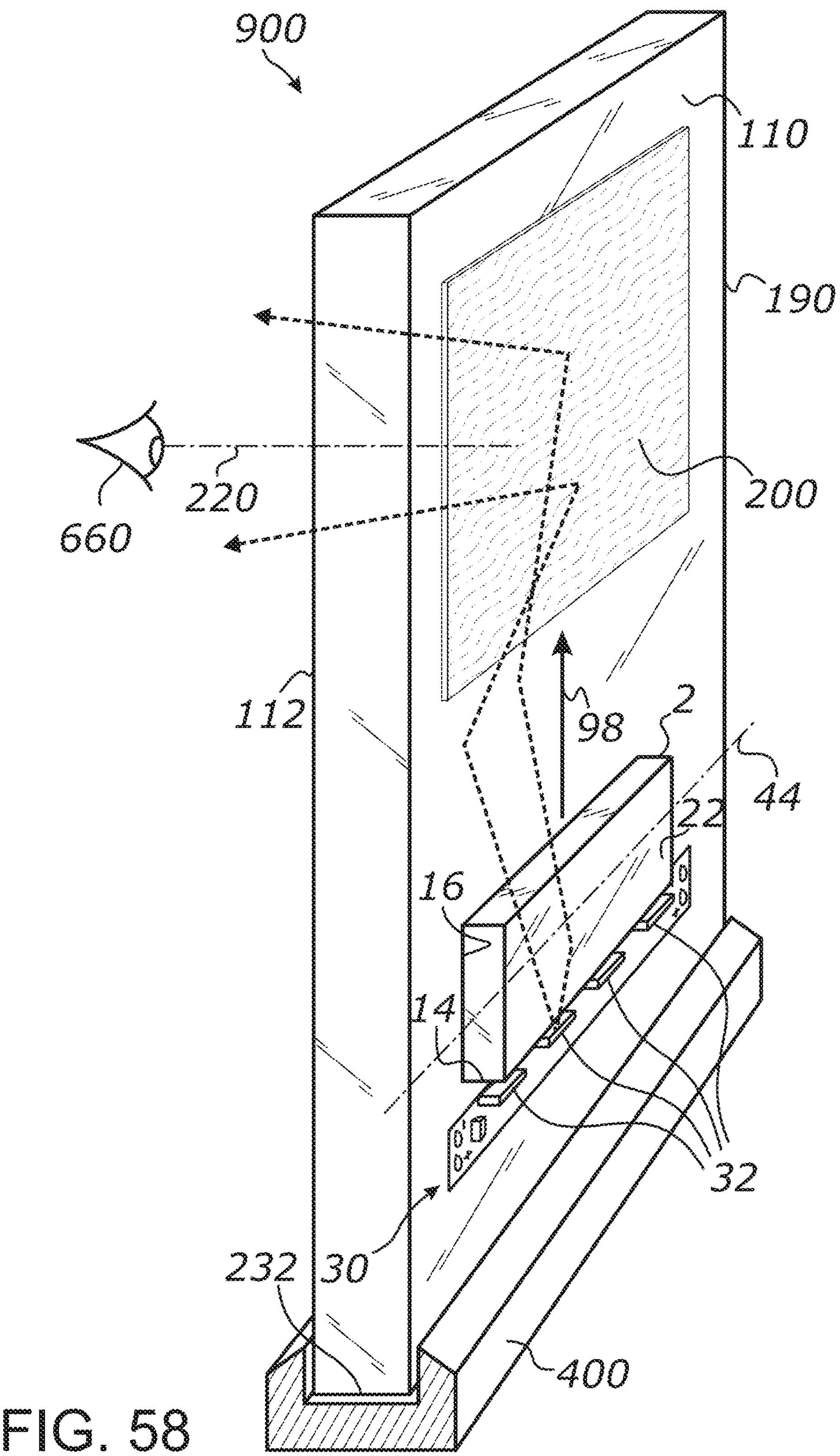
FIG. 58 is a perspective schematic view of a waveguide illumination system, showing a side-emitting LED strip attached to a major surface of a waveguide using adhesive and further showing an elongated light coupling element used for optically coupling the side-emitting LEDs to the waveguide, according to at least one embodiment of the present invention.

FIG. 58 shows a perspective schematic view of an embodiment of waveguide illumination system 900 in which a light source 30 is exemplified by a side emitting flexible LED strip having four individual LEDs 32. Each LED 32 each exemplified by a surface-mount LED device (SMD) which can be implemented as a fairly small side-emitting package being less than 2 mm in height and, as it illustrated in FIG. 58, which light emitting aperture is oriented perpendicular to the surface of the printed circuit substrate upon which the LED package is mounted, while still facing the light input face of light coupling element 2. The small size and design of side-emitting SMD LEDs makes them particularly suitable for coupling to face 14 of light coupling element 2. Such side-emitting flexible LED strips are available from various suppliers and may be based on a number of densely or sparsely packed SMD LEDs. For example, one type of side-emitting (also called side-view) LED strips is available from Elemental LED of Emeryville, Calif. (Stock number EL-IMGSDRIB12V). The side-emitting LED strip may be provided with an adhesive backing which can be used for attaching the strip to surface 110 of waveguiding substrate 190.

Figure 59:
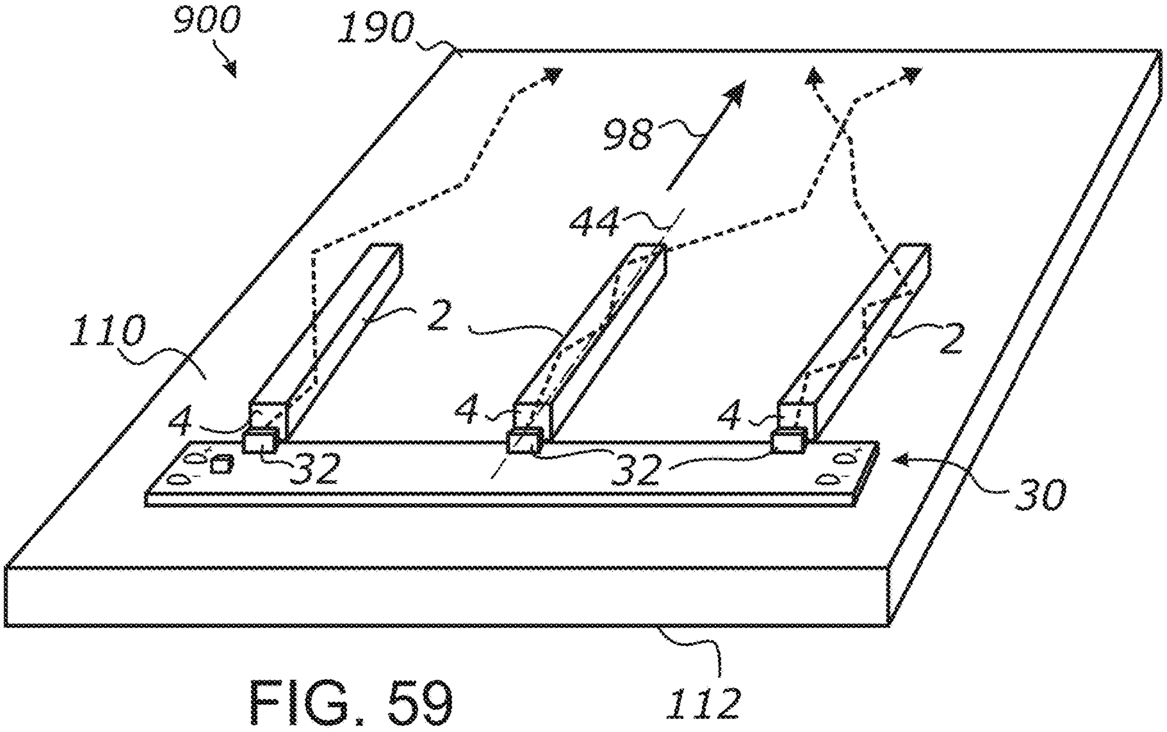
FIG. 59 is a perspective schematic view of a waveguide illumination system, showing a parallel array of linear light coupling elements disposed in registration with an array of side-emitting LEDs and used for optical coupling the side-emitting LEDs to a waveguide, according to at least one embodiment of the present invention.

FIG. 59 schematically illustrates an embodiment of waveguide illumination system 900 which employs a plurality of elongated light coupling elements 2 and where each light coupling element 2 has alternative configuration and orientation with respect to direction 98 compared to light coupling element 2 illustrated in the FIG. 58. Referring to FIG. 59, there is provided a planar waveguide incorporating waveguiding substrate 190. The waveguiding substrate 190 is defined by opposing broad-area surfaces 110 and 112 and is made from a highly transmissive glass or plastic material. Light source 30 of FIG. 59 is exemplified by a side-emitting flexible LED strip similar to that of FIG. 58. Each of LEDs 32 is provided with an individual light coupling element 2 which has a form of a linear rod or bar which has a rectangular transversal cross-section and which longitudinal axis 44 extends parallel to the intended prevalent light propagation direction 98 and along the respective dimension of waveguiding substrate 190.

Further details of operation of illumination systems shown in the drawing figures as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A backlight unit for LCD displays, comprising:

a planar light transmissive sheet having a generally rectangular shape, a generally planar first broad-area surface, an opposing second broad-area surface, a first edge, and an opposing second edge which is parallel to the first edge, the planar light transmissive sheet configured to guide light along a direction from the first edge to the second edge using total internal reflection at each of the first and second broad-area surfaces;

a patterned light extraction area located at a distance from the first edge;

a light mixing area located between the first edge and the patterned light extraction area;

a plurality of light extraction microstructures formed in or on the first broad-area surface and distributed over the patterned light extraction area according to a two-dimensional pattern, each of the light extraction microstructures being a discrete surface relief feature formed at a predetermined location of the first broad-area surface;

a parallel array of elongated rounded ridges integrally formed in the second broad-area surface in a repeating pattern;

a reflector positioned adjacent to the first broad-area surface; and a side-emitting LED strip positioned adjacent and optically coupled to the first edge of the planar light transmissive sheet, the side-emitting LED strip comprising:

a flexible printed circuit having a major surface, a linear array of side-emitting LED packages arranged along a length dimension of the flexible printed circuit with a regular spacing and mounted to the major surface, and a plurality of electrical contacts configured for electrically connecting the side-emitting LED strip to a power supply, wherein the first broad-area surface is substantially smooth and free of the light extraction microstructures within the light mixing area, wherein at least a portion of the elongated rounded ridges is located in the light mixing area, wherein the light extraction microstructures are configured to extract light from the planar light transmissive sheet through both the first broad-area surface and the second broad-area surface, wherein a light-emitting surface of each of the side-emitting LED packages is oriented perpendicular to the major surface and has at least one dimension which is greater than a thickness of the planar light transmissive sheet, and wherein the major surface of the flexible printed circuit is oriented parallel to the planar light transmissive sheet, and wherein the major surface of the flexible printed circuit is positioned directly or indirectly in contact with and bonded to one of the first or second broad-area surfaces using adhesive.

2. A backlight unit for LCD displays as recited in claim 1, wherein the planar light transmissive sheet is retained in a curved shape.

3. A backlight unit for LCD displays as recited in claim 1, wherein the light extraction microstructures are distributed over the patterned light extraction area in a random or quasi-random pattern, and wherein a longitudinal dimension of each of the elongated rounded ridges is oriented substantially perpendicular to a longitudinal dimension of the first edge.

4. A backlight unit for LCD displays as recited in claim 1, wherein a longitudinal axis of each of the elongated rounded ridges is oriented substantially perpendicular to the first edge, and wherein a length dimension of each of the elongated rounded ridges is greater than 50 mm and greater than a width dimension of each of the elongated rounded ridges by at least 10 times.

5. A backlight unit for LCD displays as recited in claim 1, wherein the light extraction microstructures are distributed over the patterned light extraction area in a non-ordered pattern, wherein each of the elongated rounded ridges in the parallel array longitudinally extends in a direction transverse to the first edge, and wherein a length dimension of each of the elongated rounded ridges is greater than a width dimension of each of the elongated rounded ridges by at least 5 times.

6. A backlight unit for LCD displays as recited in claim 1, wherein the thickness of the planar light transmissive sheet is less than 1 mm, and wherein said at least one dimension is at least 4 times greater than the thickness of the planar light transmissive sheet.

7. A backlight unit for LCD displays as recited in claim 1, wherein the thickness of the planar light transmissive sheet is approximately 0.5 mm, and wherein said at least one dimension is greater than 2 mm.

8. A backlight unit for LCD displays as recited in claim 1, further comprising an opaque housing which covers at least one side of the side-emitting LED strip and at least a portion of the light mixing area, wherein the opaque housing comprises a metallic heat conductive element.

9. A backlight unit for LCD displays as recited in claim 1, wherein each of the side-emitting LED packages comprises a light-recycling cavity having a reflective surface, one or more LED chips disposed within the light-recycling cavity, and an optically transmissive encapsulant comprising a luminescent material and forming an optically transmissive layer over the one or more LED chips and at least a portion of the light-recycling cavity.

10. A backlight unit for LCD displays as recited in claim 1, wherein the repeating pattern is characterized by a regular spacing between adjacent ridges in the parallel array.

11. A backlight unit for LCD displays as recited in claim 1, wherein adjacent ridges in the parallel array are separated from one another by generally smooth and planar surface portions.

12. A backlight unit for LCD displays as recited in claim 1, comprising a plurality of notches formed in the first edge.

13. A backlight unit for LCD displays as recited in claim 1, wherein a surface of the first edge comprises a repeating pattern of light coupling structures.

14. A backlight unit for LCD displays as recited in claim 1, wherein a surface of the first edge comprises a repeating pattern of light coupling structures having curved walls.

15. A backlight unit for LCD displays as recited in claim 1, wherein the light mixing area comprises a repeating pattern of light coupling structures.

16. A backlight unit for LCD displays as recited in claim 1, wherein the light mixing area comprises a repeating pattern of optical structures configured to alter light propagation in the planar light transmissive sheet.

17. A backlight unit for LCD displays as recited in claim 1, wherein the light mixing area comprises a repeating pattern of optical structures disposed in energy exchange relationship with respect to the planar light transmissive sheet.

18. A backlight unit for LCD displays as recited in claim 1, wherein the light mixing area comprises one or more regions covered with an optically transmissive adhesive material.

19. A backlight unit for LCD displays, comprising:

a planar light transmissive sheet having a generally rectangular shape, a generally planar first broad-area surface, an opposing second broad-area surface, a first edge, and an opposing second edge which is parallel to the first edge, the planar light transmissive sheet configured to guide light along a direction from the first edge to the second edge using total internal reflection at each of the first and second broad-area surfaces;

a patterned light extraction area located at a distance from the first edge;

a light mixing area located between the first edge and the patterned light extraction area;

a plurality of light extraction microstructures formed in or on the first broad-area surface and distributed over the patterned light extraction area according to a two-dimensional pattern;

a plurality of notches formed in the first edge;

a reflector positioned adjacent to one of the first or second broad-area surfaces; and a side-emitting LED strip positioned adjacent and optically coupled to the first edge of the planar light transmissive sheet, the side-emitting LED strip comprising:

a flexible printed circuit having a major surface, and a linear array of side-emitting LED packages arranged along a length dimension of the flexible printed circuit with a regular spacing and mounted to the major surface, wherein the light extraction microstructures are configured to extract light from the planar light transmissive sheet through both the first broad-area surface and the second broad-area surface, wherein a light-emitting surface of each of the side-emitting LED packages is oriented perpendicular to the major surface and has at least one dimension which is greater than a thickness of the planar light transmissive sheet, and wherein the major surface of the flexible printed circuit is oriented parallel to the planar light transmissive sheet and positioned directly or indirectly in contact with one of the first or second broad-area surfaces.

20. A backlight unit for LCD displays, comprising:

a light transmissive sheet having a generally rectangular shape, a planar first broad-area surface, an opposing second broad-area surface, a first edge, and an opposing second edge, the light transmissive sheet configured to guide light along a direction from the first edge to the second edge using total internal reflection at the first and second broad-area surfaces;

a patterned light extraction area located at a distance from the first edge;

a generally rectangular light mixing area located between the first edge and the patterned light extraction area;

a plurality of light extraction microstructures formed in or on at least one of the first and second broad-area surfaces and distributed over the patterned light extraction area according to a two-dimensional pattern;

a linear array of discrete optical elements distributed along a length dimension of the first edge with a regular spacing, each of the discrete optical elements being formed from an optically transmissive material and attached to the first broad-area surface or the second broad-area surface;

a reflector positioned adjacent to one of the first or second broad-area surfaces; and a side-emitting LED strip positioned adjacent and optically coupled to the first edge of the light transmissive sheet, the side-emitting LED strip comprising:

a flexible printed circuit having a generally planar major surface, and a linear array of side-emitting LED packages arranged along a length dimension of the flexible printed circuit with a regular spacing and mounted to the generally planar major surface, wherein the light extraction microstructures are configured to extract light from the light transmissive sheet through both the first broad-area surface and the second broad-area surface, wherein a light-emitting surface of each of the side-emitting LED packages is oriented perpendicular to the generally planar major surface and has at least one dimension which is greater than a thickness of the light transmissive sheet, and wherein the generally planar major surface is oriented parallel to the light transmissive sheet and positioned directly or indirectly in contact with the first or second broad-area surfaces.

* * * * *